United States Patent
Mori et al.

(10) Patent No.: US 10,720,996 B2
(45) Date of Patent: Jul. 21, 2020

(54) FREQUENCY CHARACTERISTIC ADJUSTMENT CIRCUIT, OPTICAL TRANSMISSION MODULE USING THE SAME, AND OPTICAL TRANSCEIVER

(71) Applicant: FUJITSU LIMITED, Kawasaki-shi, Kanagawa (JP)

(72) Inventors: Toshihiko Mori, Isehara (JP); Yuuki Ogata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 206 days.

(21) Appl. No.: 15/649,689

(22) Filed: Jul. 14, 2017

(65) Prior Publication Data
US 2018/0054258 A1 Feb. 22, 2018

(30) Foreign Application Priority Data

Aug. 19, 2016 (JP) ................. 2016-161501
Nov. 17, 2016 (JP) ................. 2016-223938
Feb. 21, 2017 (JP) ................. 2017-030312

(51) Int. Cl.
*H04B 10/548* (2013.01)
*H04B 10/61* (2013.01)
(Continued)

(52) U.S. Cl.
CPC .......... *H04B 10/548* (2013.01); *H04B 10/40* (2013.01); *H04B 10/504* (2013.01); *H04B 10/588* (2013.01); *H04B 10/6164* (2013.01)

(58) Field of Classification Search
CPC .... H04B 10/548; H04B 10/40; H04B 10/504; H04B 10/588; H04B 10/6164; H04B 10/564; H04B 10/516; H04B 10/505; H04B 10/50; H01S 3/02; H01S 5/0427; H01S 5/06213; H01S 5/06226; H01S 3/00;
(Continued)

(56) References Cited

U.S. PATENT DOCUMENTS 4,133,986 A * 1/1979 Picandet ............... H04M 3/005
                                              379/405
6,043,606 A * 3/2000 Arts ....................... H05B 41/28
                                              315/94
(Continued)

FOREIGN PATENT DOCUMENTS

JP     2006-081116     3/2006
JP     2012-040779     3/2012
(Continued)

OTHER PUBLICATIONS

T. Usuki, "Robust Optical Data Transfer on Silicon Photonic Chip", Journal of Lightwave Technology, vol. 30, No. 18, pp. 2933-2940 (8 pages), Sep. 15, 2012.

*Primary Examiner* — Abbas H Alagheband
(74) *Attorney, Agent, or Firm* — Fujitsu Patent Center

(57) ABSTRACT

A frequency characteristic adjustment circuit is disclosed. The frequency characteristic adjustment circuit is disposed between an optical circuit element and a drive circuit for driving the optical circuit element. A capacitor is connected to an output of the drive circuit. A current supply circuit is controlled by a voltage generated by the drive circuit. The current supply circuit supplies a different current value depending on a voltage received from the drive circuit to the optical circuit element.

16 Claims, 51 Drawing Sheets

(51) Int. Cl.
  *H04B 10/40* (2013.01)
  *H04B 10/588* (2013.01)
  *H04B 10/50* (2013.01)

(58) Field of Classification Search
  CPC ....... H01S 5/042; H03K 17/16; G02F 1/0121; G02F 2001/0157; G02F 2001/0155; G02F 1/01
  USPC ................ 398/135, 183, 182, 186, 192–198; 372/29.01, 32, 34, 38, 36
  See application file for complete search history.

(56) References Cited

U.S. PATENT DOCUMENTS

| | | | | |
|---|---|---|---|---|
| 6,353,337 | B2* | 3/2002 | Nasu | G01R 27/2605 324/676 |
| 6,791,418 | B2* | 9/2004 | Luo | H03F 1/0266 330/136 |
| 7,054,344 | B1* | 5/2006 | Nguyen | H01S 5/042 372/38.02 |
| 7,078,953 | B2* | 7/2006 | Kondou | H03K 19/00346 326/68 |
| 7,079,443 | B2* | 7/2006 | Takita | G11C 5/147 365/189.11 |
| 7,099,596 | B2* | 8/2006 | Watanabe | H04B 10/504 372/29.01 |
| 7,680,164 | B1* | 3/2010 | Draper | H01S 5/042 372/29.02 |
| 8,121,161 | B2* | 2/2012 | Tanaka | H01S 5/06213 372/29.015 |
| 8,773,203 | B2* | 7/2014 | Baumgartner | H05B 33/0809 330/263 |
| 9,419,410 | B2* | 8/2016 | Usuki | H01S 5/042 |
| 9,991,965 | B2* | 6/2018 | Christensen | H04B 10/505 |
| 2003/0180054 | A1* | 9/2003 | Watanabe | H04B 10/505 398/182 |
| 2004/0202214 | A1* | 10/2004 | Aronson | H01S 5/0427 372/38.02 |
| 2006/0002720 | A1* | 1/2006 | Nishiyama | H04B 10/85 398/202 |
| 2006/0203863 | A1* | 9/2006 | Hayashi | H01S 5/042 372/38.02 |
| 2006/0204168 | A1* | 9/2006 | Douma | H01S 5/042 385/14 |
| 2008/0031634 | A1* | 2/2008 | Nguyen | H04B 10/504 398/160 |
| 2009/0268767 | A1* | 10/2009 | Nelson | H01S 5/042 372/38.02 |
| 2013/0094530 | A1* | 4/2013 | Nakashima | H01S 5/0427 372/38.02 |
| 2014/0023374 | A1* | 1/2014 | Yuda | H01S 5/0427 398/98 |
| 2014/0376582 | A1* | 12/2014 | Kao | H01S 5/0427 372/38.01 |
| 2016/0119062 | A1* | 4/2016 | Christensen | H04B 10/505 398/183 |
| 2016/0128163 | A1* | 5/2016 | Chang | H05B 45/22 315/151 |

FOREIGN PATENT DOCUMENTS

| | | |
|---|---|---|
| JP | 2013-084839 | 5/2013 |
| JP | 2013-183147 | 9/2013 |

* cited by examiner

51
CMOS DRIVER MODEL

53
EQUIVALENT CIRCUIT MODEL

51
CMOS DRIVER MODEL

52
EQUALIZING CIRCUIT

53
EQUIVALENT CIRCUIT MODEL $$V_{MOD} = \frac{R_M}{R_L + R_S + R_M + R_F} \cdot \frac{1}{1 + j\omega \frac{C_M R_M (R_L + R_S)}{R_L + R_S + R_M + R_F}} \cdot V_{DD} \quad \cdots (3)$$

$$\eta = \frac{R_L + R_S + R_M}{R_L + R_S + R_M + R_F}$$

FIG.21A  $I_1' = I_1$ AND $I_2' = I_2$
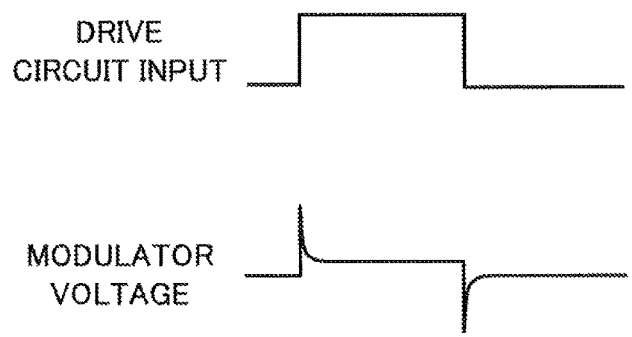
FIG.21B  $I_1' < I_1$ OR $I_2' > I_2$
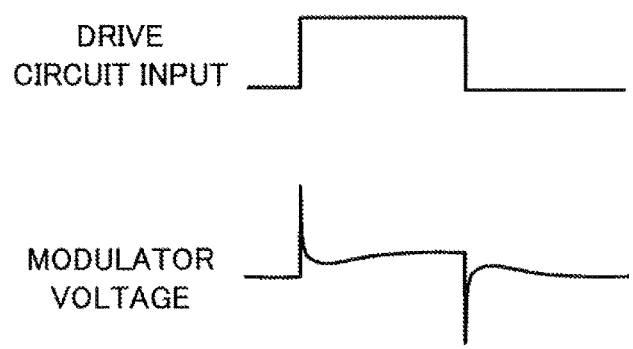
FIG.21C  $I_1' > I_1$ OR $I_2' < I_2$
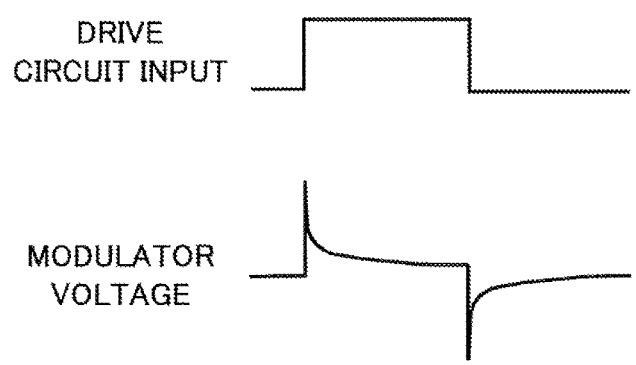

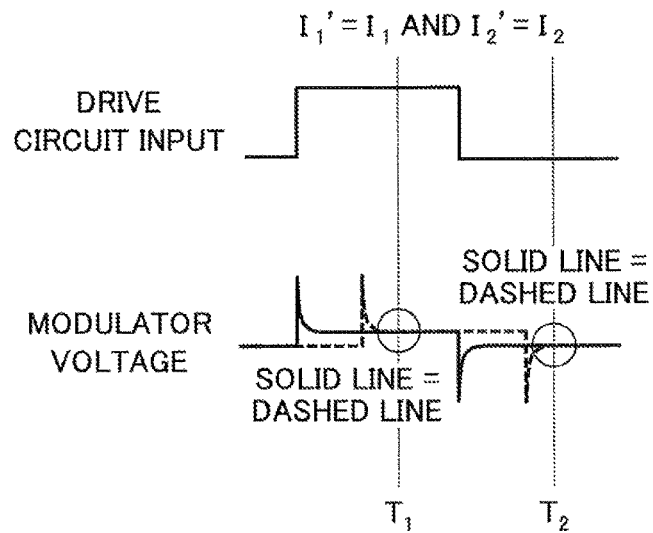

6a REFERENCE SIGNAL  6b SHIFT SIGNAL

7a INVERTED REFERENCE SIGNAL  7b INVERTED SHIFT SIGNAL

6c DIFFERENTIAL AMPLIFICATION WAVEFORM

7c DIFFERENTIAL AMPLIFICATION WAVEFORM

FREQUENCY CHARACTERISTIC ADJUSTMENT CIRCUIT, OPTICAL TRANSMISSION MODULE USING THE SAME, AND OPTICAL TRANSCEIVER

CROSS-REFERENCE TO RELATED APPLICATIONS

This application is based upon and claims the benefit of priority of the prior Japanese Patent Applications No. 2016-161501, filed on Aug. 19, 2016, No. 2016-223938, filed on Nov. 17, 2016, and No. 2017-030312, filed on Feb. 21, 2017, the entire contents of which are incorporated herein by reference.

FIELD

The embodiments discussed herein are related to a frequency characteristic adjustment circuit, an optical transmission module using the same, and an optical transceiver.

BACKGROUND

Along with the increase in data traffic, high-speed communications such as 40 Gbps (gigabit per second), 100 Gbps, and the like per wavelength are being put to practical use in order to increase a capacity of an optical communication network. As a technique for realizing the high-speed optical communication, a technique of fabricating a fine optical waveguide structure with a silicon photonics technology has been drawing a attention. In the optical modulator of silicon photonics, a voltage to a PN junction formed at a center of the waveguide is applied, and an optical path length is varied by utilizing a change in a carrier density, that is, a change in a refractive index (carrier plasma dispersion). Since the change in the refractive index is proportional to the change in carrier density, it is desired to change the carrier density with a voltage change as small as possible. In the PN junction, when the bias voltage is applied in a forward direction, the change in the carrier density is larger and a modulation efficiency is better. However, there is a problem in that bandwidth is narrow. From a view at a driver side, a junction capacitance of an optical modulator acts as a load capacitance. A high frequency component signal attenuates and the band is degraded. In a case in which a pin diode is used, since the junction capacitance is larger, characteristics in a high frequency band become worse.

As a method of preventing band degradation by an optical modulator driven at high speed, a method of inserting a matching circuit formed by a capacitor (C) and a resistor (R) between a drive circuit and an optical modulator has been proposed (for instance, refer to Non-Patent Document 1). By inserting the matching circuit electrically equivalent to the PN junction of the optical modulator, the junction capacitance of the pin diode is reduced to a design capacity of the optical modulator.

Non-Patent Document

Non-Patent Document 1

T. Usuki, "Robust Optical Data Transfer on Silicon Photonic Chip", Journal of Lightwave Technology, Vol. 30, No. 18, pp. 2933-2940, Sep. 15, 2012

SUMMARY

According to one aspect of the embodiments, a frequency characteristic adjustment circuit is disposed between an optical circuit element and a drive circuit for driving the optical circuit element, and the frequency characteristic adjustment circuit includes a capacitor connected to an output of the drive circuit; and a current supply circuit controlled by a voltage generated by the drive circuit; wherein the current supply circuit supplies a different current value depending on a voltage received from the drive circuit to the optical circuit element.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 21A through FIG. 21C are diagrams for explaining a phenomenon in a case in which a current setting value of the frequency characteristic adjustment circuit deviates;

FIG. 22A through FIG. 22C are diagrams for explaining a principle of detecting a deviation of the current setting value;

DESCRIPTION OF EMBODIMENTS

First, a configuration, which is applied in which an equalizing circuit is inserted between a drive circuit and an optical modulator or an optical circuit element such as a surface emitting laser to expand a band to a high frequency region, is considered. In this configuration, in order to obtain an optical circuit output corresponding to an input data pattern ("1" or "0"), a large driving voltage is applied. For instance, at a practical voltage value ($V_{DD}$) for driving the optical modulator formed by the silicon photonics, it is difficult to obtain a modulator output corresponding to the input data pattern by driving an optical modulator circuit inserted with the equalizing circuit at high speed.

Accordingly, it is an object of embodiments to provide a configuration capable of driving the optical circuit element at high speed with a low voltage and of obtaining an optical output with preferable response characteristics.

In the embodiments, a frequency characteristic adjustment circuit including a capacitor and a current source is inserted between a driver (drive circuit) and an optical circuit element such as an optical modulator. By inserting the frequency characteristic adjustment circuit, the optical output according to the input data pattern is obtained at high speed drive, instead of extending the band, increasing the driving voltage, or adding a high voltage source or a negative voltage source. The frequency characteristic adjustment circuit adjusts an amount of current supplied from a current source to the optical circuit element according to an output voltage from the driver. With this configuration, it is possible to drive the optical circuit element at the high speed with the low voltage and to stabilize response characteristics of the optical circuit element. Since frequency characteristics are stabilized in a range from a medium frequency to a high frequency, it is possible to control intersymbol interference as a secondary effect. Before describing details of each configuration of the embodiments, an extension of the band by inserting an equalizing circuit, to which the configuration of a matching circuit of a document known to a public is applied as it is, and problems thereof will be explained.

Figure 1A:
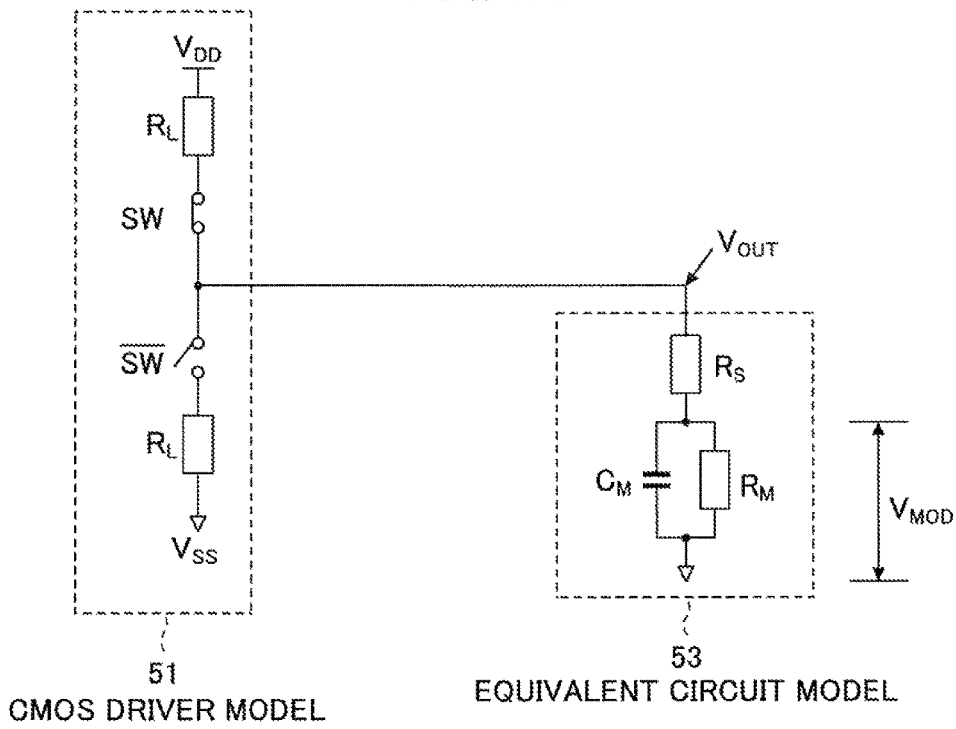
FIG. 1A and FIG. 1B are diagrams for explaining an expansion of a high frequency band by inserting an equalizing circuit.
Figure 1B:
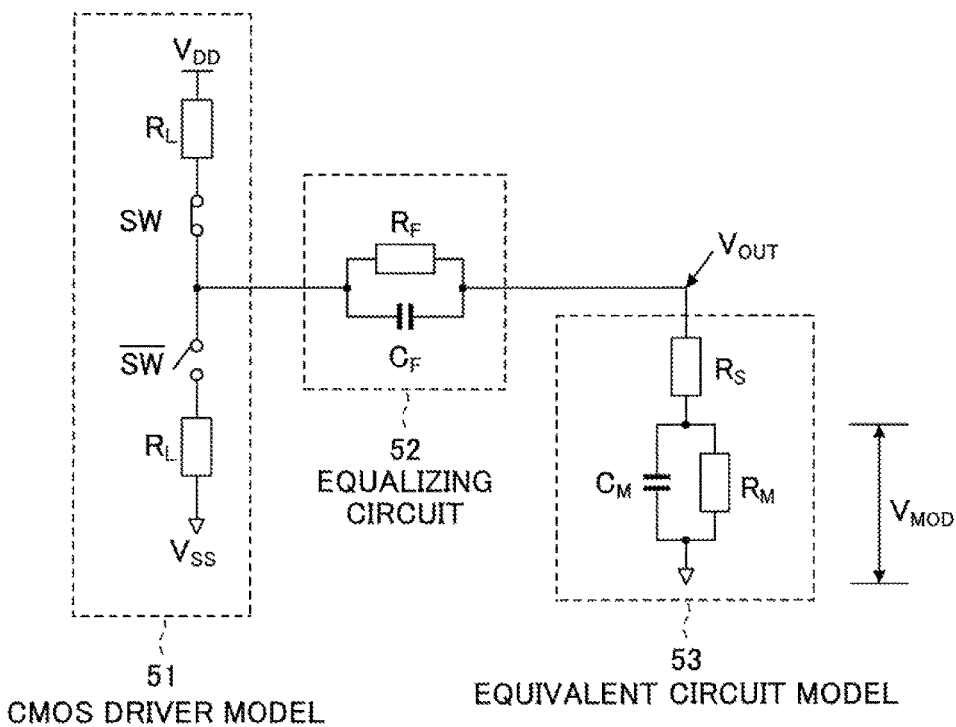
Figure 2:
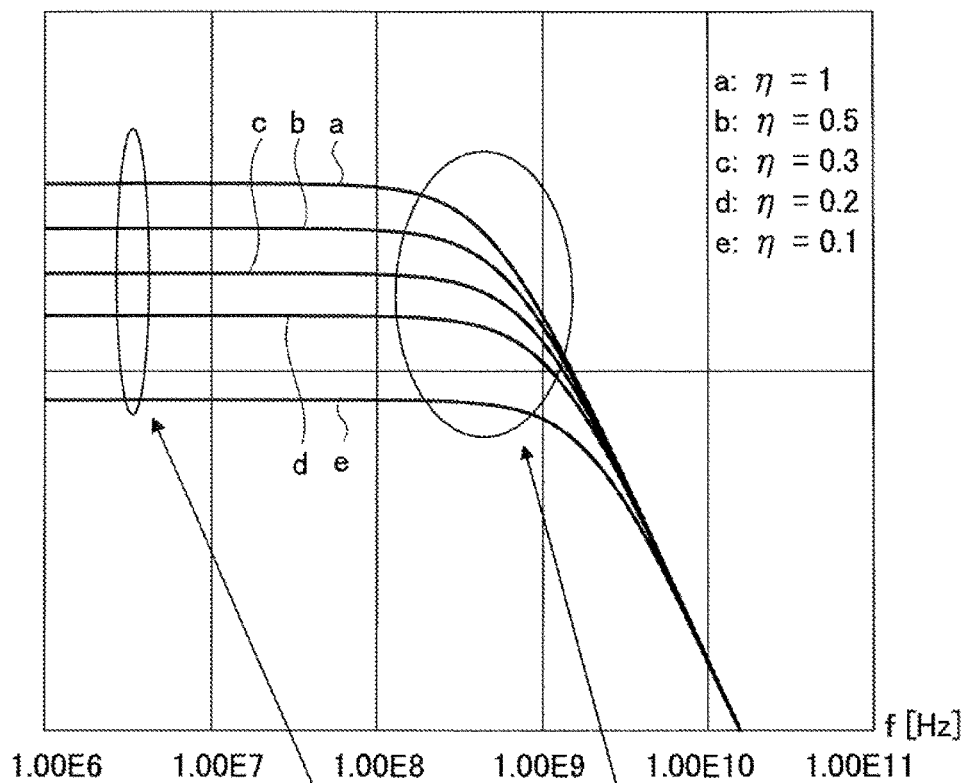
FIG. 2 is a diagram for explaining an expansion of the high frequency band by inserting the equalizing circuit.

FIG. 1A, FIG. 1B, and FIG. 2 are diagrams for explaining an expansion of the band by inserting the equalizing circuit 52. FIG. 1A depicts an equivalent circuit 53 of a drive circuit without an optical equalizer and an optical modulator. FIG. 1B is a diagram of the equivalent circuit 53 in which the equalizing circuit 52 is inserted.

Each of MOS transistors of a complementary metal oxide semiconductor (CMOS) driver (represented by a CMOS driver model 51), which drives an optical modulator (represented by an equivalent circuit model 53), is represented by a switch (SW) and an internal resistance ($R_L$), and the MOS transistors are connected in series between and $V_{DD}$ and $V_{SS}$. The equalizing circuit 52 is represented by a resistance $R_F$ and a capacitance $C_F$ in a parallel connection. The optical modulator (the equivalent circuit model 53) is represented by a junction capacitance $C_M$ and junction resistance $R_M$, which are connected in parallel, and a parasitic resistance $R_s$ in series. $V_{MOD}$ is a voltage applied to a capacitance portion of the optical modulator.

In FIG. 1A, in a case in which there is no equalizing circuit, a voltage $V_{MOD}$ (accurately, an amount of a charge at the voltage $V_{MOD}$) applied to the capacitance portion of the optical modulator (the equivalent circuit model 53) is proportional to the phase change amount. The frequency dependency of the voltage $V_{MOD}$ represents the frequency dependency of the optical modulator. In the configuration illustrated in FIG. 1A, the frequency dependence of the voltage $V_{MOD}$ is expressed by an equation (1).

$$V_{MOD} = \frac{R_M}{R_L + R_S + R_M} \cdot \frac{1}{1 + \frac{j\omega C_M R_M (R_L + R_S)}{R_L + R_S + R_M}} \cdot V_{DD} \quad (1)$$

In a case of inserting the equalizing circuit 52, the resistance $R_F$ and the capacitance $C_F$ of the equalizing circuit 52 are added. Hence, a voltage condition is expressed by an equation (2).

$$V_{MOD} = \frac{R_M}{(R_L + R_S + R_M) + j\omega C_M R_M (R_L + R_S) + \frac{1 + j\omega C_M R_M}{1 + j\omega C_F R_F} R_F} \cdot V_{DD} \quad (2)$$

When $C_M R_M = C_F R_F$ holds, the equation (2) becomes an equation (3), and becomes the same form as the equation (1).

$$V_{MOD} = \frac{R_M}{R_L + R_S + R_M + R_F} \cdot \frac{1}{1 + \frac{j\omega C_M R_M (R_L + R_S)}{R_L + R_S + R_M + R_F}} \cdot V_{DD} \quad (3)$$

The equation (3) represents that a charge volume at a node of $V_{out}$, that is, (the charge volume of $C_M$–the charge volume of $C_F$) is not dependent on the value of $V_{DD}$.

FIG. 2 is a diagram illustrating a relationship between the frequency characteristic and the resistance $R_F$ of the equalizing circuit 52. A horizontal axis of a graph is a frequency [Hz], and a vertical axis is a gain or a voltage applied to the optical modulator. A parameter η is defined as

η=($R_L$+$R_S$+$R_M$)/($R_L$+$R_S$+$R_M$+$R_F$)

($R_F$=0, that is, η=1) when the equalizing circuit 52 is not implemented and (η<1) when equalizing circuit 52 is inserted are compared.

$R_M$/($R_L$+$R_S$+$R_M$+$R_F$) of a first term multiplied at a right side of the equation (3) is a term for determining the gain of a low frequency region, and $C_M R_M$($R_L$+$R_S$)/($R_L$+$R_S$+$R_M$+$R_F$) is a term for determining the bandwidth.

By inserting the equalizing circuit 52, the gain in a medium frequency region decreases depending on a value of "η" while maintaining a flat characteristic. Conversely, the bandwidth is expanded to 1/η times. Also, in a case of $C_M R_M = C_F R_F$, the gain and the bandwidth are controlled in the low frequency region by adjusting the $R_F$ alone.

The explanations with reference to FIG. 1A, FIG. 1B, and FIG. 2 are not limited to a case in which an object to be driven is the optical modulator, and may be also applied to a case of directly driving a drive type laser diode, for instance.

Figure 3A:
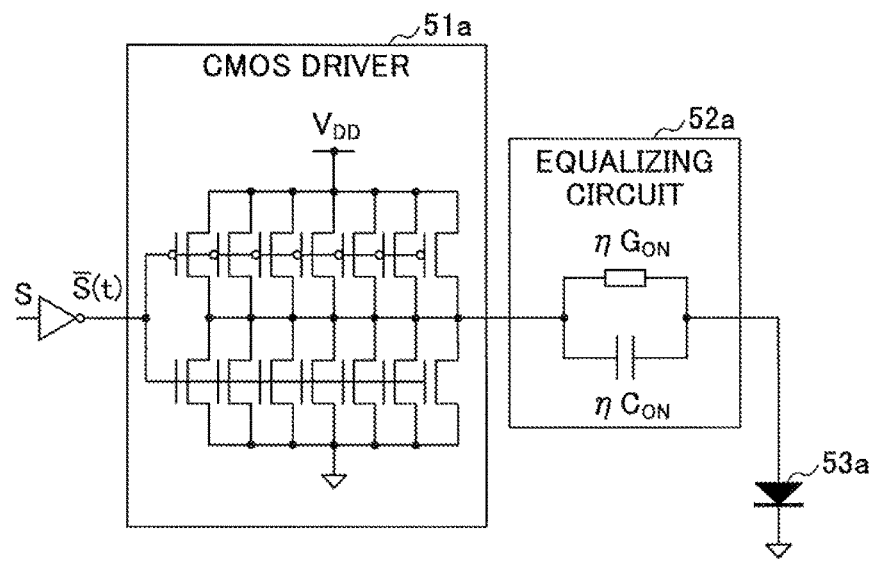
FIG. 3A through FIG. 3C are diagrams for explaining a problem in the case of using the equalizing circuit.
Figure 3B:
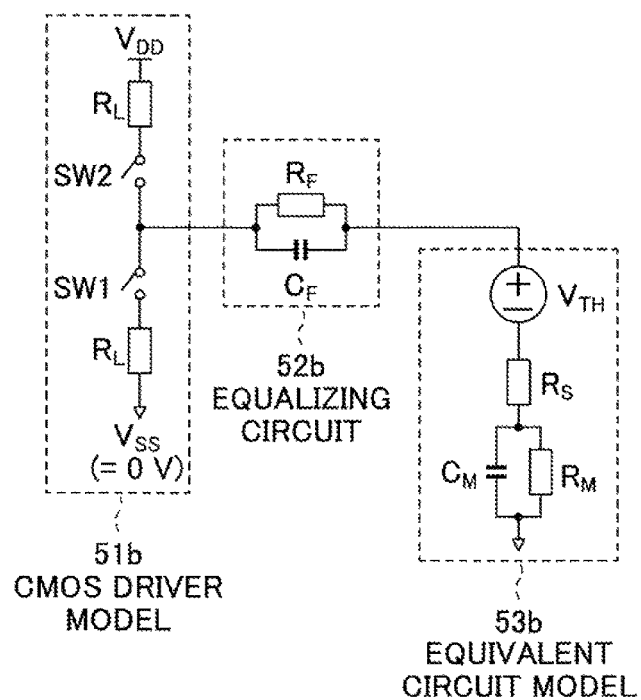
Figure 3C:
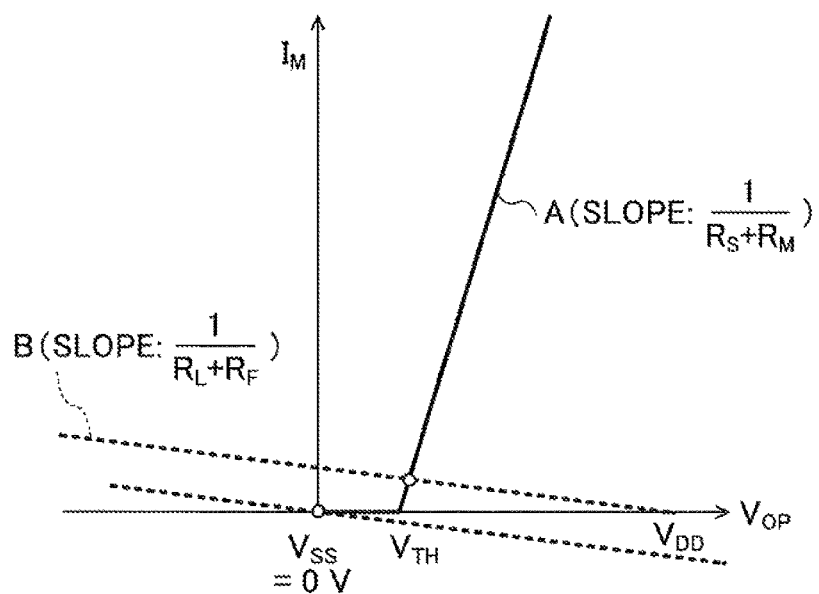

FIG. 3A through FIG. 3C are diagrams for explaining a problem in the case of using the equalizing circuit. FIG. 3A illustrates a diagram in which a drive circuit is formed by a CMOS driver 51a, and an equalizing circuit 52a is inserted between the CMOS driver 51a and a diode 53a. $\eta C_{ON}$ denotes the conductance of the capacitance of the equalizing circuit 52a and $\eta G_{ON}$ denotes the conductance of a resistor. From the driver side, a total capacitance is $\eta G_{ON}$/(1+η). If η is made to be sufficiently smaller than 1, the capacitance becomes smaller, and a frequency dependence becomes smaller even at a high speed operation. This is also depicted in FIG. 2.

FIG. 3B depicts an equalization circuit model corresponding to a configuration depicted in FIG. 3A. The equalization circuit model in FIG. 3B is represented by a CMOS driver model 51b for driving the modulator, an equivalent circuit model 53b for the modulator, and an equalizing circuit 52b inserted between the CMOS driver model 51b and the equivalent circuit model 53b. The transistors of the CMOS driver (represented by CMOS driver model 51b) are simplified with switches SW1 and SW2 and the internal resistance $R_L$.

In FIG. 3C, the horizontal axis of a graph is an operating voltage $V_{OP}$ and the vertical axis is a current $I_M$ flowing through the optical modulator. A solid line A indicates a current-voltage characteristic of the optical modulator, and broken lines B indicate a load line. For instance, in order for the modulator to output a "1" state when the driver outputs a high-potential (H) voltage, it is preferable to provide an appropriate resistance $R_L$ or an appropriate power supply voltage $V_{DD}$. A threshold voltage $V_{TH}$ is 0.6V, an intersection of the current-voltage characteristic and the load line is 0.9V (the overdriver voltage is 0.3V), and η=0.1 (bandwidth expansion by a factor of 10). In this case, even if $R_L$ is infinite and $R_S$ is approximated to 0, $V_{DD}$ is 3.6V. Even if a drive circuit is manufactured with CMOS capable of such a voltage, the drive circuit does not operate at a high speed of 10 Gbps or more.

As one solution, as illustrated in FIG. 4A through FIG. 4C, and FIG. 5A through FIG. 5C, it is conceivable to control the voltage $V_{DD}$ to be a low voltage of 1.0V or less by using additional power supply voltages $V_{DDP}$ and $V_{DDN}$ for bias application to the optical modulator.

Figure 4A:
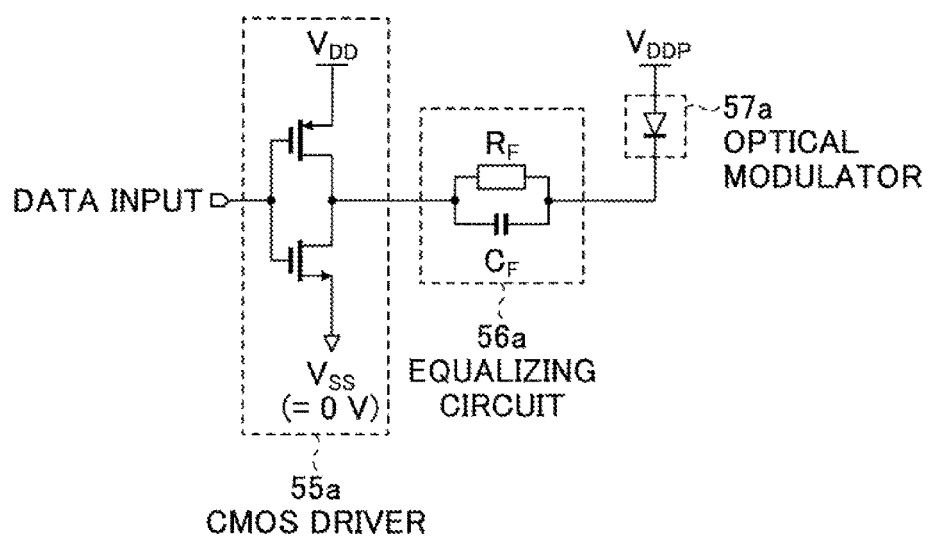
FIG. 4A through FIG. 4C are diagrams for explaining a problem in the case of using the equalizing circuit.
Figure 4B:
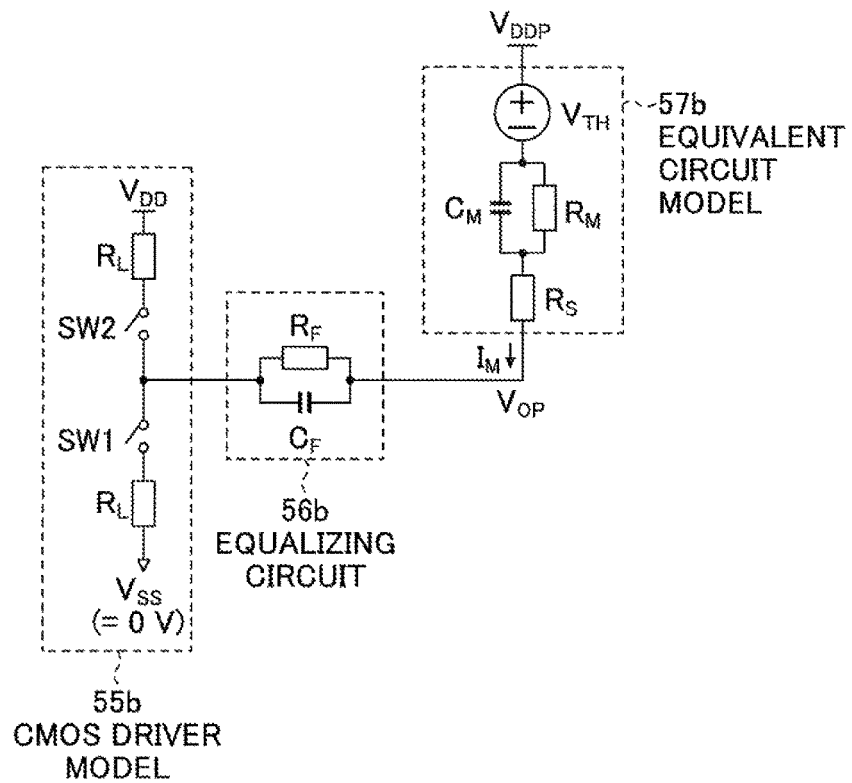
Figure 4C:
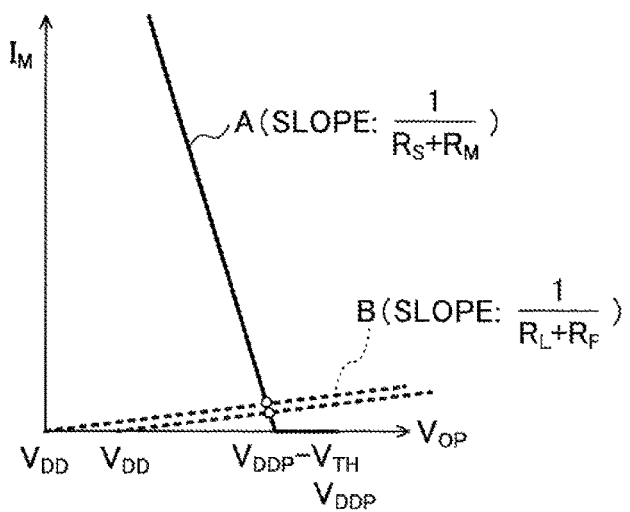

FIG. 4A, FIG. 4B, and FIG. 4C illustrate a configuration example in which a positive DC bias ($V_{DDP}$) higher than $V_{DD}$ is applied to the optical modulator. In FIG. 4A, an equalizing circuit 56a is inserted between a CMOS driver 55a and an optical modulator 57a to which the positive DC bias ($V_{DDP}$) higher than $V_{DD}$ is applied. In FIG. 4B, an equivalent circuit model corresponding to a circuit configuration depicted in FIG. 4A is represented. A CMOS driver model 55b corresponds to the CMOS driver 55a, an equalizing circuit 56b corresponds to the equalizing circuit 56a, and an equivalent circuit model 57b corresponds to the equivalent circuit 57a. The equalizing circuit 56b is inserted between the CMOS driver model 55b and the equivalent circuit model 57b.

Figure 5A:
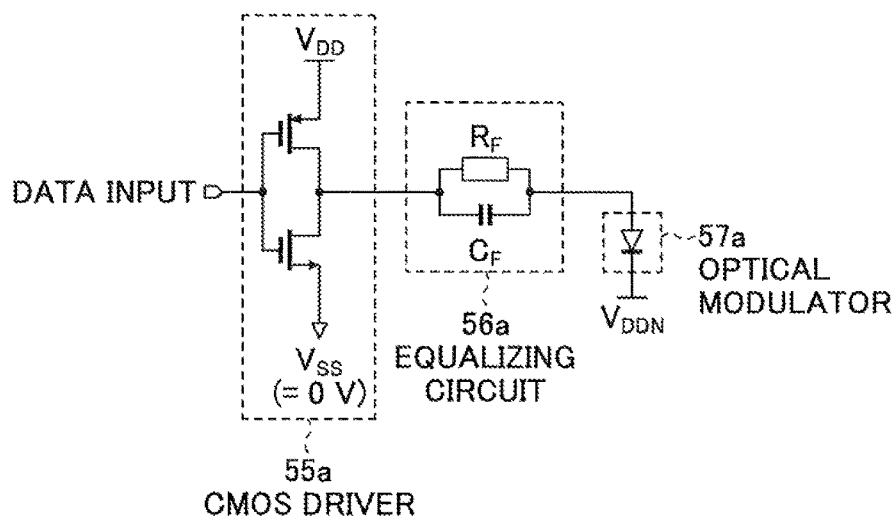
FIG. 5A through FIG. 5C are diagrams for explaining a problem in the case of using the equalizing circuit.
Figure 5B:
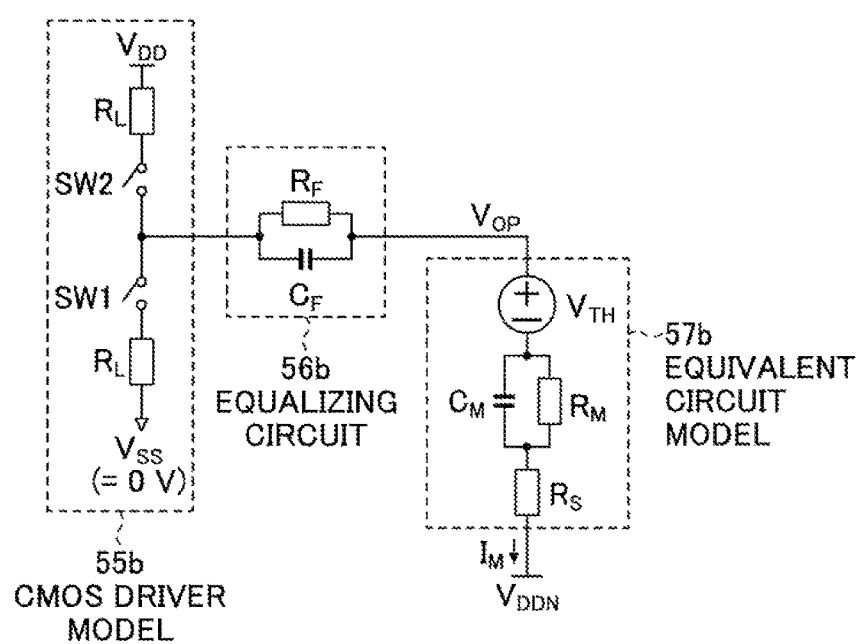
Figure 5C:
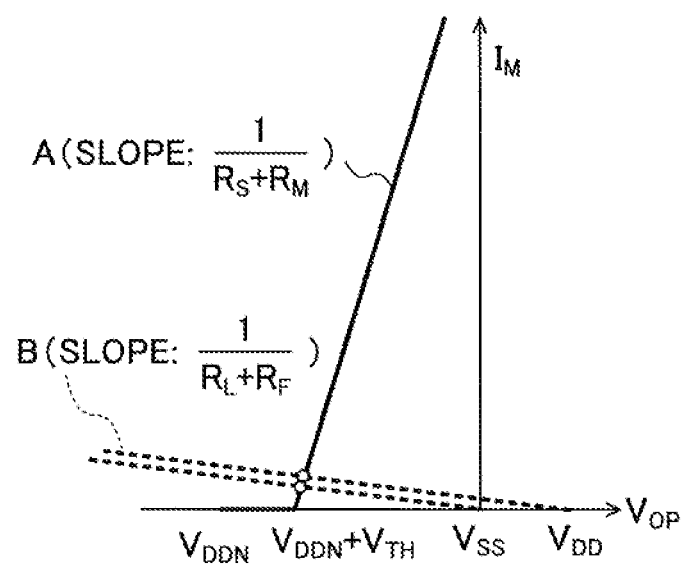

FIG. 5A, FIG. 5B, and FIG. 5C illustrate a configuration example in which a bias ($V_{DDN}$) lower than a ground potential of the CMOS driver 55a is applied to the optical modulator 57*a*. In FIG. 5A, the bias ($V_{DDN}$) lower than $V_{DD}$ is applied to the optical modulator 57*a* (the equivalent circuit model 57*b* in FIG. 5B). In FIG. 4A (FIG. 4B), in a case of $V_{DD}$=0.9V and $V_{SS}$=0V, in order to operate the optical modulator 57*a* (the equivalent circuit model 57*b*), it is preferable to apply a high voltage (FIG. 4C) such as $V_{DDP}$=3.6V. In FIG. 5A (FIG. 5B), in this case, in order to operate the optical modulator 57*a* (the equivalent circuit model 57*b*), it is preferable to apply a low voltage (FIG. 5C) such as $V_{DDN}$=−2.7V. The general voltage supplied to the optical module is 3.3V. Thus, a circuit becomes complicated and a size of the circuit becomes larger in order to generate the high voltage or a negative voltage from this supply voltage.

There is another problem as follows. It is assumed that the equalizing circuit is based on a premise that $C_M R_M = C_F R_F$ is satisfied; however, the junction capacitance $C_M$ and a junction resistance $R_M$ of the optical modulator and the laser diode are nonlinear with respect to the voltage. $C_M R_M = C_F R_F$ is not always satisfied due to a change in driver output which is switched depending on input data "1" or "0". Accordingly, it is desired to present a configuration for matching a characteristic of a filter (the equalizing circuit) to a characteristic of optical circuit elements (including the optical modulator, the laser diode, and the like).

In view of the above problem, in the embodiments, a frequency characteristic adjustment circuit having a capacitor and a current source is disposed between the drive circuit and the optical circuit element, and the amount of current supplied from the current source to the optical circuit element is adjusted depending on the output voltage of the drive circuit. As a result, the optical circuit element is driven at the high speed with a low driving voltage, and the optical output with the preferable response characteristics is realized.

Figure 6:
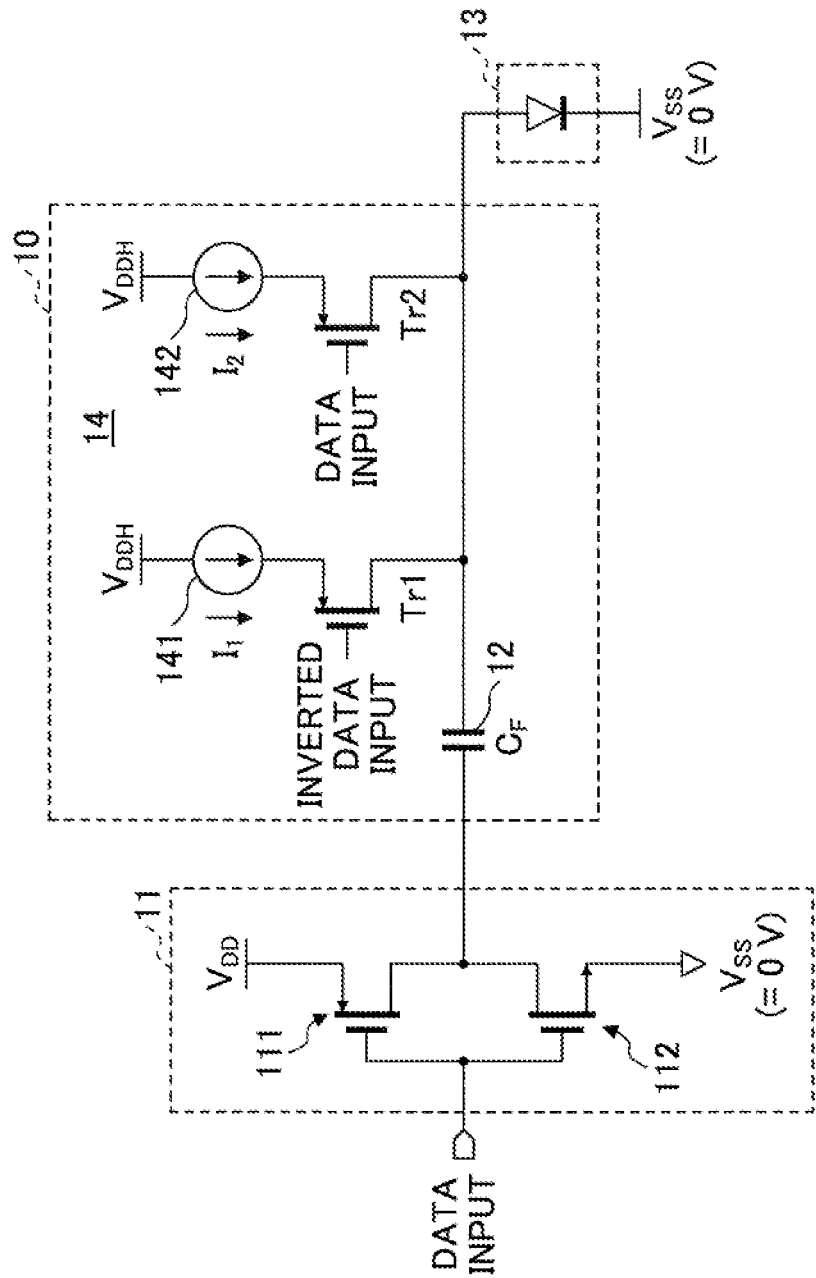
FIG. 6 is a diagram illustrating a basic configuration in embodiments.

FIG. 6 is a diagram illustrating a basic configuration of a frequency characteristic adjustment circuit 10 and a configuration of an optical transmission front end using the basic configuration. Instead of an equalizing circuit 52*a* composed of $R_F$ and $C_F$ depicted in FIG. 3A, the frequency characteristic adjustment circuit 10 is disposed between a drive circuit 11 and an optical modulator 13. The optical modulator 13 is an example of an optical circuit element, and a surface emitting laser such as a Vertical Cavity Surface Emitting Laser (VCSEL) may be used. The drive circuit 11 is, for instance, a CMOS driver, and outputs $V_{DD}$(H) or $V_{SS}$(L) according to the input data. The frequency characteristic adjustment circuit 10 includes a capacitor 12 having a capacitance $C_F$ and a current supply circuit 14. The capacitance $C_F$ is the same as that of the equalizing circuit 52*b* in FIG. 3B. Instead of $R_F$, a first current source 141 and a second current source 142 of the current supply circuit 14 are used to supply a current $I_1$ or a current $I_2$ according to the output of the drive circuit 11. The current $I_2$ may be output when a p-type metal-oxide-semiconductor (PMOS) 111 is ON, and the current $I_1$ may be output when a n-type metal-oxide-semiconductor (NMOS) 112 is ON.

In the configuration depicted in FIG. 4A, it is assumed that the current is $I_2$ when a PMOS is ON, and the current is $I_1$ when a NMOS is ON. In this case, it is possible for a circuit depicted in FIG. 6 to operate similarly to that depicted in FIG. 4A, and a voltage $V_{DDH}$ is lower than a voltage $V_{DDP}$. Also, a negative power supply as depicted in FIG. 5A and FIG. 5B is not applied. It is possible to realize an operation similar to the circuits depicted in FIG. 4A and FIG. 4B with a further lower voltage and a simple circuit configuration.

Figure 7:
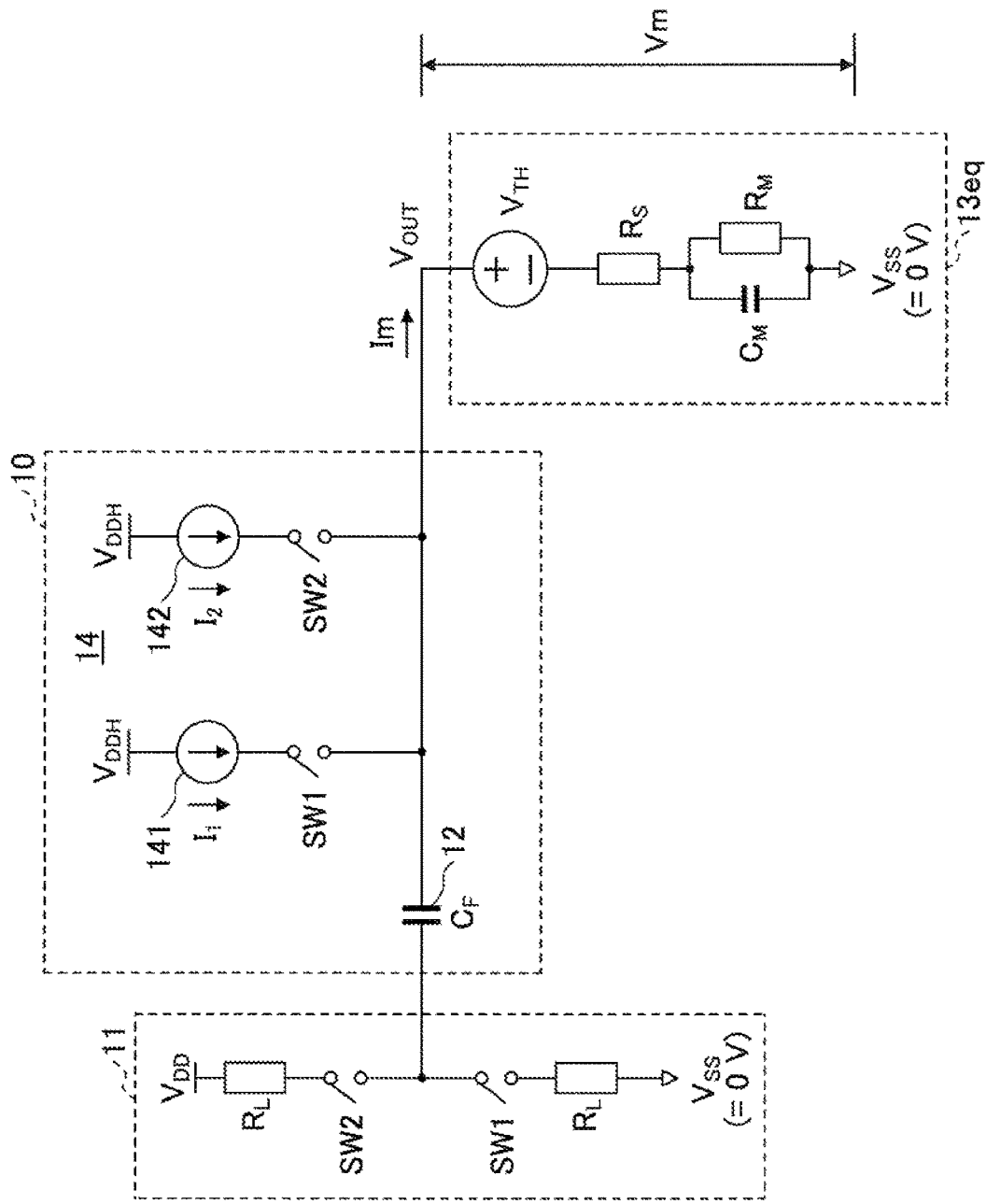
FIG. 7 is a diagram illustrating an equivalent circuit configuration corresponding to a circuit configuration in FIG. 6.

FIG. 7 illustrates an equivalent circuit configuration corresponding to a circuit configuration in FIG. 6. The switches SW1 and SW2 of the drive circuit 11 are switched according to the input data, and the current $I_1$ or the current $I_2$ flows through the frequency characteristic adjustment circuit 10. The current Im flows from the node $V_{out}$ to the equivalent circuit 13*eq* of the optical modulator. In the equivalent circuit 13*eq*, a potential difference Vm between the node $V_{out}$ and a ground potential $V_{SS}$ of the optical modulator is a voltage applied to the optical modulator 13. Values of the currents $I_1$ and $I_2$ supplied from the current sources 141 and 142 are set so as to satisfy a predetermined condition so that a stable response characteristic is obtained by the optical modulator 13 even if the output of the drive circuit 11 is switched at high speed.

Figure 8:
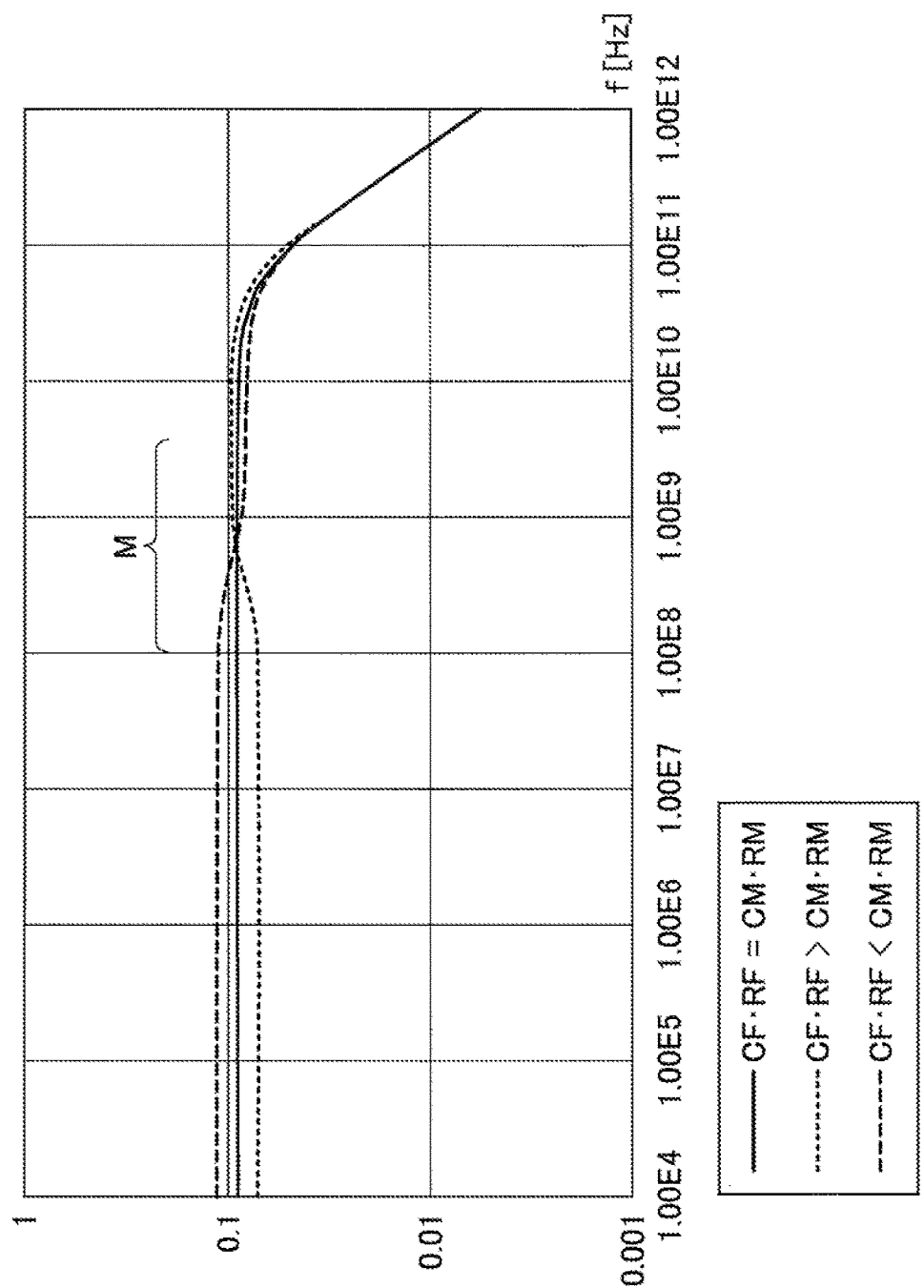
FIG. 8 a diagram for explaining a setting of a current value in circuits depicted in FIG. 6 and FIG. 7.

Referring to FIG. 8 and FIG. 9, setting of current values used at the current supply circuit 14 will be described. FIG. 8 illustrates the frequency characteristic in a case of using the equalizing circuit of an existing configuration. A horizontal axis represents a frequency, and a vertical axis represents a gain by a log scale (voltage applied to the optical modulator). By inserting the equalizing circuit and setting 11=0.1, the bandwidth is expanded to the high frequency region.

A solid line in FIG. 8 plots a condition in which $C_F R_F = C_M R_M$ is satisfied in the equation (2), that is, a small signal characteristic represented by the above equation (3). Even if the bandwidth is expanded, the flat characteristic is maintained. However, $C_F R_F = C_M R_M$ is not always satisfied, when $C_F$, $R_F$, $C_M$, and $R_M$ deviate from design values due to a process variation or when an element of highly nonlinear voltage dependence on the junction capacitance and the junction resistance is included.

Therefore, a frequency characteristic (fine broken line) under a condition of $C_F R_F > C_M R_M C_F R_F$ and a frequency characteristic (coarse broken line) under a condition of $C_F R_F < C_M R_M$ are depicted together. When $C_F R_F = C_M R_M$ is not satisfied, especially, when the capacitance $C_F$ or $C_M$ is changed, the frequency characteristic is not flat in a medium frequency region M of 100 MHz to several GHz.

Accordingly, a fact that a current-voltage characteristic or a capacitance-voltage characteristic of the optical modulator is nonlinear indicates that a voltage dependence of the current or a capacitance value changes. In this case, a characteristic fluctuation occurs in a medium frequency bandwidth as illustrated in FIG. 8. Particularly, in the PN junction in a forward direction, the change in the junction capacitance with respect to the voltage is nonlinear, and the frequency characteristic tends to fluctuate.

As one of the reasons in which the frequency characteristic fluctuates in the medium frequency region M. When the output level ("H" or "L") of the CMOS driver changes in accordance with the input data in FIG. 1B, an amount of an electric charge present at the node $V_{out}$ is changed. Thus, the gain varies depending on whether the signal change is earlier or later than a time constant ($\sim C_M R_M$) of the change in the charge volume. If the characteristic fluctuates in the medium frequency region M, the intersymbol interference (ISI), which represents jitter in a data dependence, occurs. Accordingly, in FIG. 7, it is desirable that the amount of the currents $I_1$ and $I_2$ supplied from the frequency characteristic adjustment circuit 10 is set to an appropriate value with respect to the characteristics of the optical modulator and the process variations of $C_F$ according to the output level of the drive circuit 11.

Figure 9B:
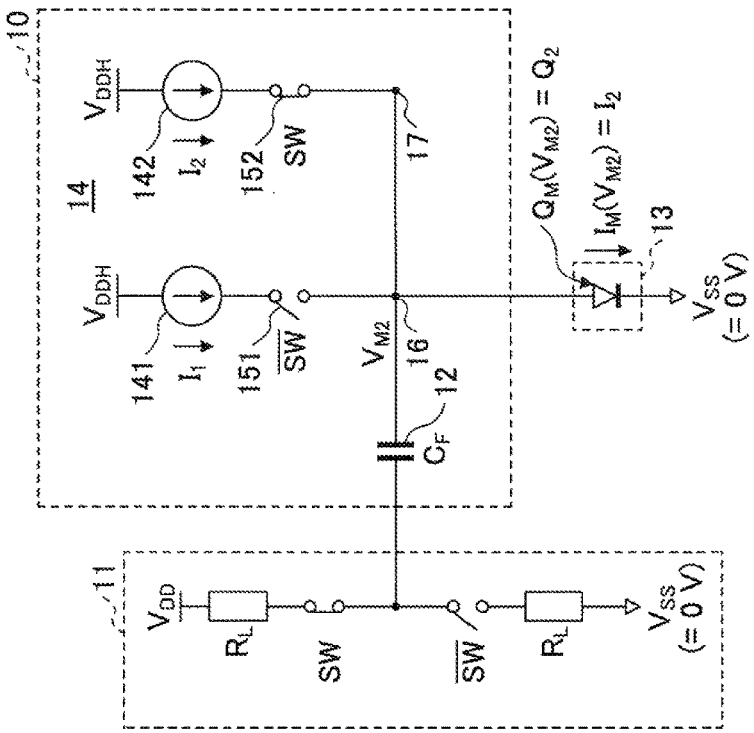
FIG. 9A and FIG. 9B are diagrams for explaining a setting of a current value in the circuits depicted in FIG. 6 and FIG. 7.
Figure 9A:
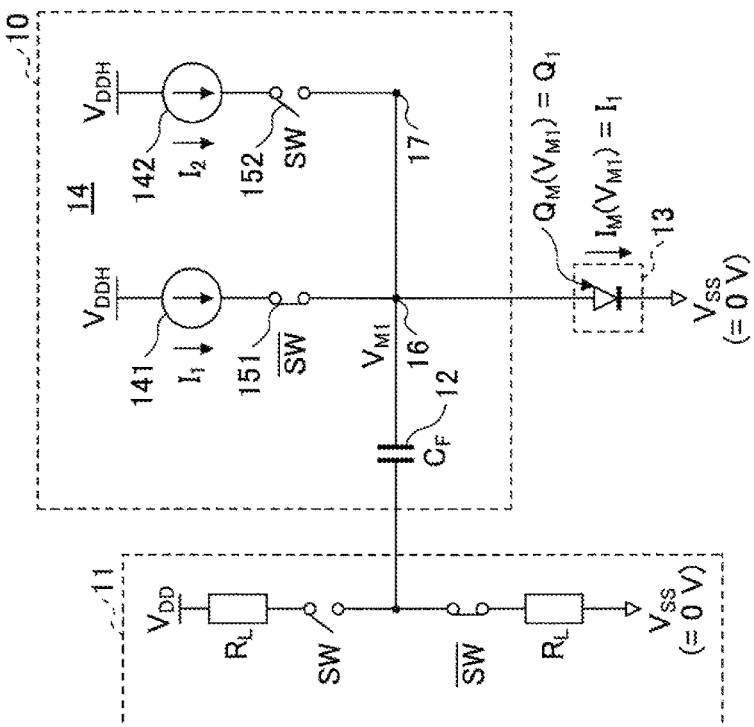

FIG. 9A and FIG. 9B are diagrams illustrating a current setting condition of the frequency characteristic adjustment circuit 10. FIG. 9A illustrates a state in which a low-potential voltage $V_{SS}$ is selected and the current $I_1$ flows through the optical modulator. FIG. 9B illustrates a state in which the high-level voltage $V_{DD}$ is selected and the current $I_2$ flows through the optical modulator 13. When $V_{SS}$ is selected in FIG. 9A, voltage $V_{M1}$ appears at a node 16. At this time, a switch 151 is turned on and the current $I_M(V_{M1})$ flows to the optical modulator 13. When $V_{DD}$ is selected in FIG. 9B, voltage $V_{M2}$ appears at node 16. At this time, a switch 152 is turned on and the current $I_M(V_{M2})$ flows from a node 17 to the optical modulator 13.

$C_F$ denotes the capacitance of the capacitor 12 of the frequency characteristic adjustment circuit 10, $I_M(V_M)$ denotes the current-voltage characteristic of the optical modulator 13, and $Q_M(V_M)$ denotes the charge-voltage characteristic of the optical modulator 13. A current condition for flattening the frequency characteristic is in equations (4), (5), and (6) as follows:

$$I_M(V_{M1}) = I_1 \quad (4)$$

$$I_M(V_{M2}) = I_2 \quad (5)$$

$$Q1 - C_F(V_{ss} - V_{M1}) = Q2 - C_F(V_{DD} - V_{M2}) \quad (6).$$

In this equation (6), Q1 represents the charge volume of the capacitance $C_M$ when the voltage $V_{M1}$ is applied to the optical modulator 13 ($Q1 = Q_M(V_{M1})$). Q2 represents the charge volume of the capacitance $C_M$ when the voltage $V_{M2}$ is applied to the optical modulator 13 ($Q2 = Q_M(V_{M2})$). $C_F(V_{ss} - V_{M1})$ represents the charge volume of the capacitor 12 when the voltage $V_{ss}$ is selected by the drive circuit 11, and $C_F(V_{DD} - V_{M1})$ represents the charge volume of the capacitor 12 when the voltage $V_{DD}$ is selected by the drive circuit 11.

By this current condition, the charge volume at the node 16 is maintained to be constant regardless of the change of the input data "0" or "1". As a result, the frequency characteristic becomes flattened in the optical modulator 13 in which the bandwidth is expanded. Hence, it is possible to realize a high-speed operation without generating data dependency jitter.

The current consumption is increased by adding the current sources 141 and 142. However, the power supply voltage itself of the drive circuit 11 is kept at low. Alternatively, no additional power supply voltage is required for bias application. Hence, it is possible to reduce the entire power consumption and cost.

First Embodiment

Figure 10:
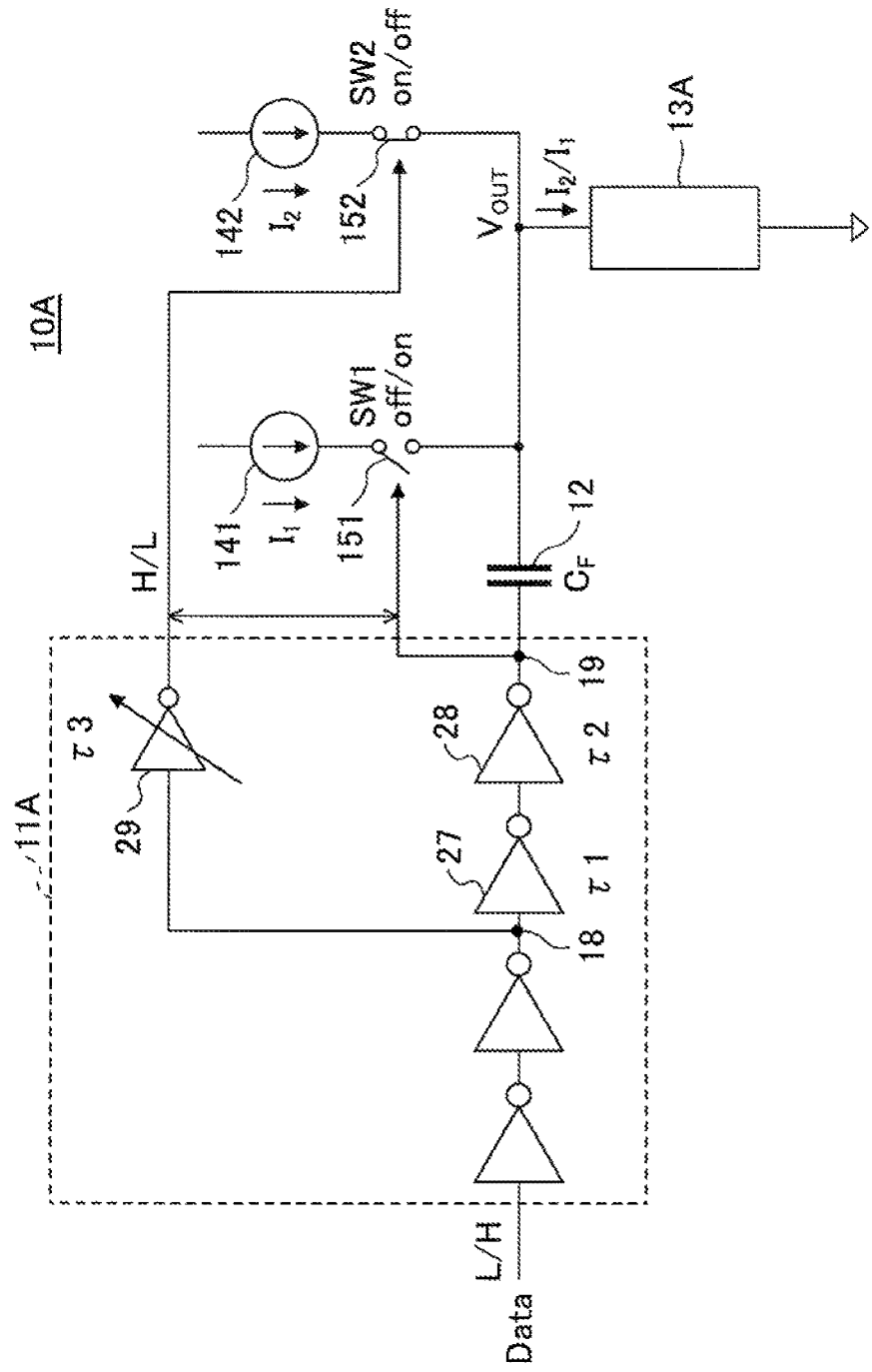
FIG. 10 is a diagram illustrating a configuration of a frequency characteristic adjustment circuit in a first embodiment.

FIG. 10 illustrates an adjustment operation of a laser diode 13A using a frequency characteristic adjustment circuit 10A in a first embodiment. The laser diode may be a surface emitting laser such as a VCSEL. When a data L is input to a drive circuit 11A, a node 18 becomes the output level "L". At the node 18, a drive signal is divided, one of signals is delayed by τ1+τ2 by delay circuits 27, 28 and becomes the output level "L" at the node 19. In this case, the output level "L" is outputted to the capacitor 12, the switch SW1 is turned OFF and the current $I_1$ does not flow. Another divided signal is delayed and adjusted by a delay circuit 29 and the level "H" is outputted. A delay amount τ3 of the delay circuit 29 is adjusted so as to satisfy τ3=τ1+τ2. At the same timing as cutting off the current $I_1$, the switch SW2 is turned ON by the output level "H" of the delay circuit 29, and the current $I_2$ flows to the laser diode 13A.

When the data H are input to the drive circuit 11A, an intermediate node 18 becomes the output level "H". At the intermediate node 18, the drive signal is divided, one of the signals is delayed by τ1+τ2 by the delay circuits 27 and 28 and becomes the output level "H" at the output node 19. In this case, the output level "H" is outputted to the capacitor 12, the switch SW1 of a frequency characteristic adjustment circuit 10A is turned ON, and the current $I_1$ flows through the laser diode 13A. The other divided signal is delayed by τ3 by the delay circuit 29 and the output level "L" is output from the drive circuit 11A. At the same timing as the current $I_1$ flows, the switch SW2 of the frequency characteristic adjustment circuit 10A is turned OFF by the output level "L" of the delay circuit 29, and the current $I_2$ is cut off.

With this configuration, the charge volume at the node Vout is always constant, and even when the laser diode 13A is driven by a high-speed drive signal, it is possible to preferably maintain a response characteristic corresponding to the input data.

Second Embodiment

Figure 11:
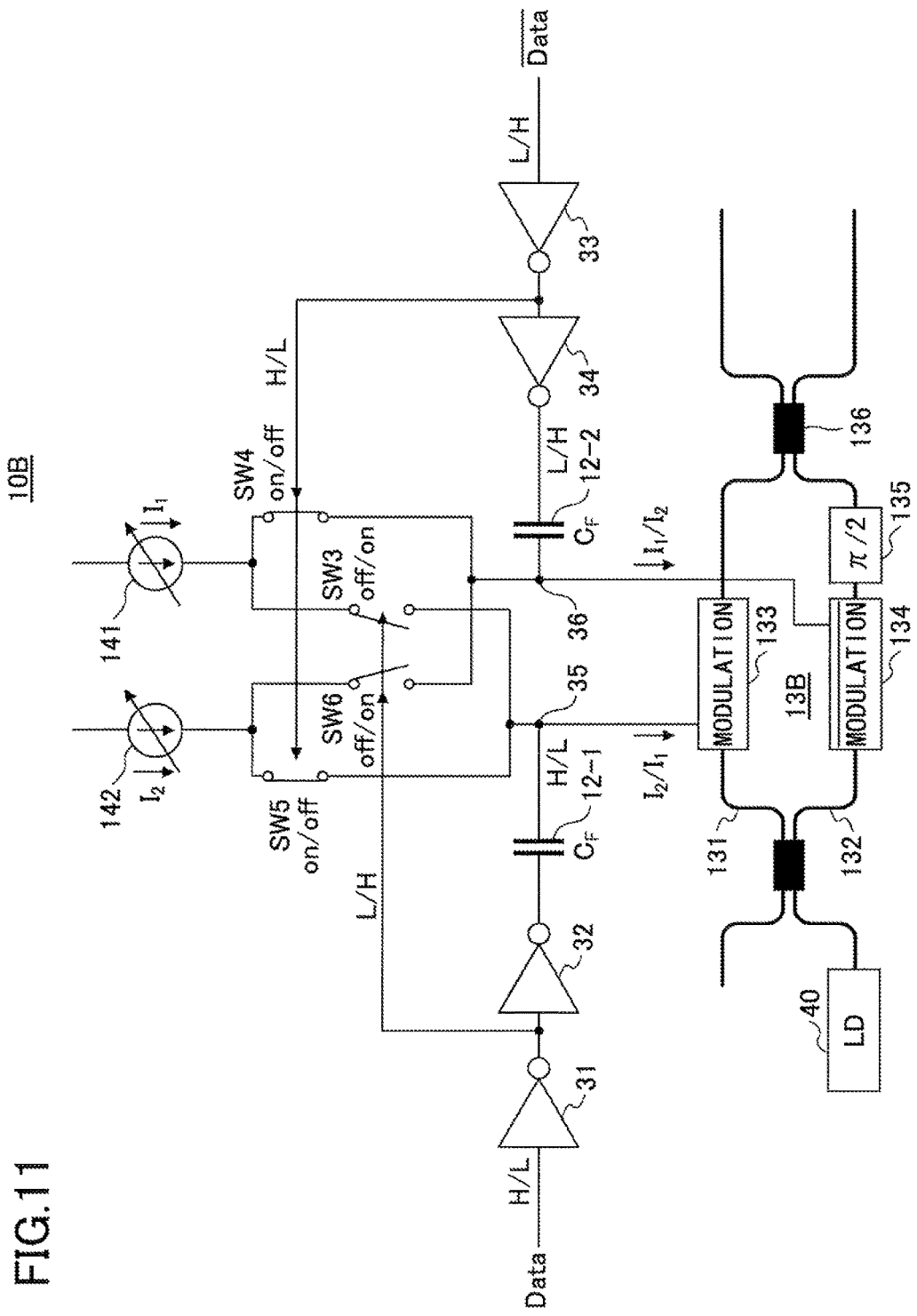
FIG. 11 is a diagram illustrating a configuration of a frequency characteristic adjustment circuit in a second embodiment.

FIG. 11 illustrates the adjustment operation of an optical modulator 13B using a frequency characteristic adjustment circuit 10B in a second embodiment. In the second embodiment, a Mach-Zehnder optical modulator 13B is driven. For instance, a differential drive circuit including inverters 31, 32, 33, and 34 are used.

Light output from a laser diode (LD) 40 as a light source branches into two beams, and the two beams are input to optical waveguides 131 and 132, respectively. By applying a voltage to electrodes 133 and 134, effective optical path lengths of the optical waveguides 131 and 132 are changed, and then, the two beams are multiplexed by a multiplexer 136. In the multiplexer 136, when there is no phase difference between the beam propagated through the optical waveguide 131 and the beam propagated through the optical waveguide 132, a maximum output is obtained. When an optical path length difference of half the wavelength is generated between the two beams, path lengths of the two beams cancel the optical path length difference by each other, and the output becomes small. As a result, an intensity modulation is performed.

When data of the output level "H" are input to an inverter 31, an "H" voltage is output to a capacitor 12-1 through the inverter 32. At this time, an "L" voltage is output from the inverter 31 to turn off the switches SW3 and SW6. Inverted data of the output level "L" are input to an inverter 33, and the "L" voltage is output from an inverter 34 to a capacitor 12-2. The "H" voltage being output from the inverter 33 turns on switches SW4 and SW5.

The switches SW3 and SW5 are connected to a node 35, and switches SW4 and SW6 are connected to a node 36. A composite current of an AC current and the current $I_2$ accompanying a change of data flows to the node 35 by the input data of the output level "H" and the inverted data of the output level "L". The composite current of the AC current and the current $I_2$ accompanying the change in data flows to the electrode 133 of one optical waveguide 131 of the Mach-Zehnder optical modulator 13B. At the same time, the combined current of an AC current and the current $I_1$ accompanying the change of data flows to the node 36, the composite current of the AC current and the current $I_1$ accompanying the change in data flows through the electrode 134 of the optical waveguide 132. The beam propagating through the optical waveguide 132 undergoes a phase adjustment according to the change in the refractive index, is subjected to a phase shift of π/2 by a phase shifter 135, and is combined with the beam propagating through the optical waveguide 131. At this time, the output of the optical modulator 13B is maximized.

In a case in which the data of the output level "L" are input to the inverter 31, and the inverted data of the output level "H" are input to the inverter 33, the operation is opposite to the above. The current $I_1$ flows through the electrode 133, and the current $I_2$ flows through the electrode 134. The beam propagating through the optical waveguide 132 undergoes the phase adjustment according to the change in the refractive index, undergoes the phase shift of π/2 by the phase shifter 135, and is combined with the beam propagating through the optical waveguide 131. The output of the optical modulator 13B is maximized.

Figure 12:
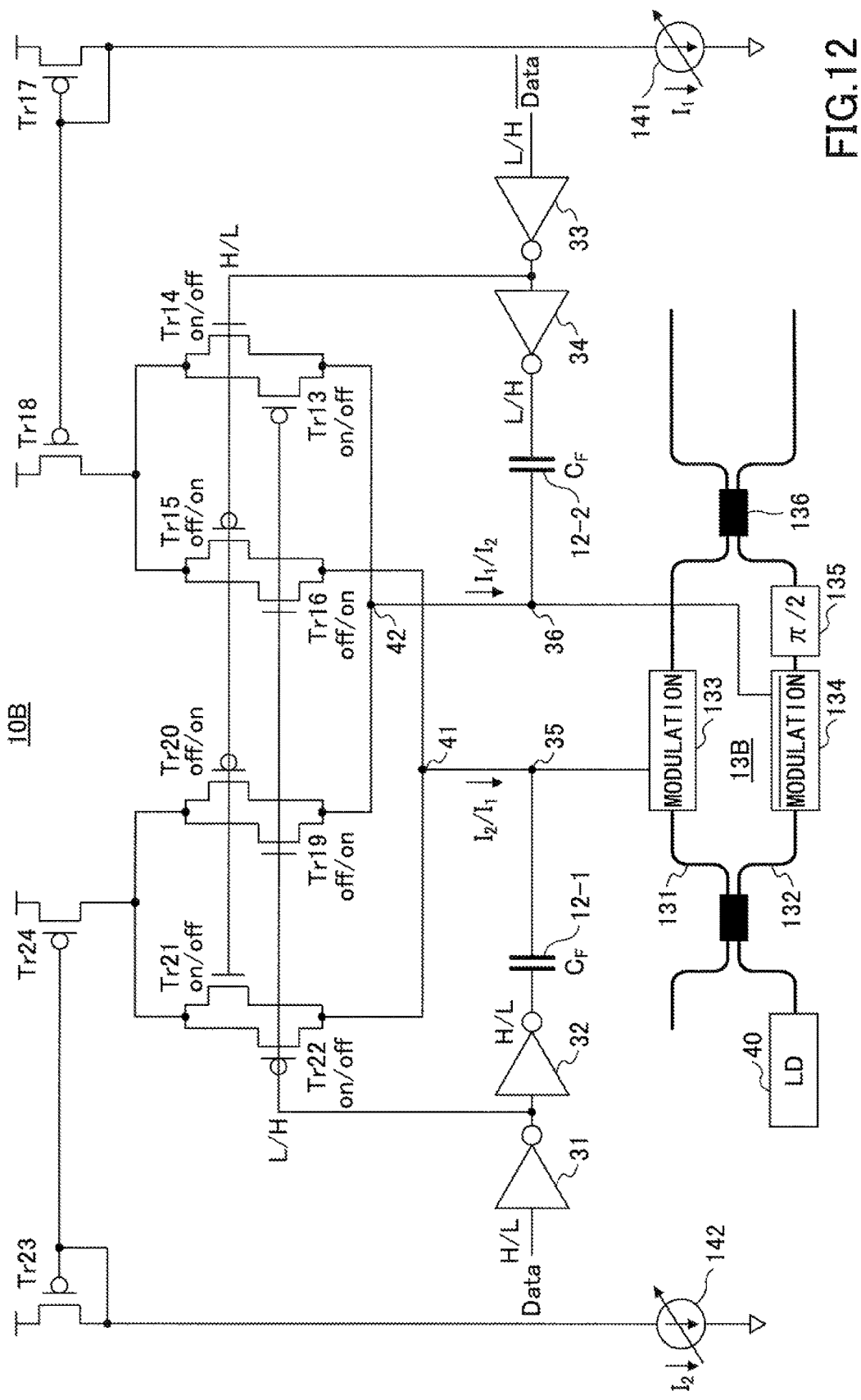
FIG. 12 is a diagram representing the configuration depicted in FIG. 11 by a transistor circuit.

FIG. 12 is a diagram in which a frequency characteristic adjustment circuit 10B in the second embodiment is represented by a transistor circuit. The first current source 141 generates the current $I_1$ and the second current source 142 generates the current $I_2$. The first current source 141 is connected to the gate of a transistor Tr18 via a transistor Tr17 and the second current source 142 is connected to the gate of a transistor Tr24 via a transistor Tr23.

When data of the output level "H" are input to the inverter 31, the "H" voltage is output to the capacitor 12-1 through the inverter 32. An output voltage "L" from the inverter 31 turns on a PMOS Tr13 and a PMOS Tr22 and turns off a NMOS Tr16 and a NMOS Tr19. With respect to the above, inverted data "L" are input to the inverter 33, and "L" voltage is output from the inverter 34 to the capacitor 12-2. An output voltage "H" from the inverter 33 turns on a NMOS Tr14 and a NMOS Tr21 and turns off a PMOS Tr15 and a PMOS Tr20. The NNOS Tr14, the NMOS Tr16, the NMOS Tr19 and the NMOS Tr21 are optional transistors and need not be used.

When the PMOS Tr13 and the NMOS Tr14 are turned ON, the current $I_1$ flows through a node 42, and a supply of the current to a node 41 is interrupted. Further, when the NMOS Tr21 and the PMOS Tr22 are turned ON, the current $I_2$ flows through the node 41. Accordingly, only the current accompanying the change of the data in which a low frequency component is cut off by the charge volume $C_F$ and the current $I_2$ appearing in the node 41 flows in the node 35. Only the current accompanying the change of the data in which the low frequency component is cut off by the charge volume $C_F$ and the current $I_1$ appearing in the node 42 flows in the node 36. As a result, a current accompanying the change in data and the current $I_1$, in which the low frequency component is cut off by the charge volume $C_F$, flow to the electrode 134 of the optical waveguide 132. The current accompanying the change in data, in which the low frequency component is cut off by the charge volume $C_F$ and the current $I_2$, flow to the electrode 133 of the optical waveguide 131. The beams multiplexed by the multiplexer 136 are strengthened and the modulator output becomes maximum.

In a case in which the data of the output level "L" is input to the inverter 31 and the inverted data of the output level "H" is input to the inverter 33, the operation is reversed from that described above, and the current $I_1$ flows through the electrode 133. The beams multiplexed by the multiplexer 136 are canceled by each other, and the modulator output becomes minimum.

In FIG. 11 and FIG. 12, the optical waveguides 131 and 132 of the Mach-Zehnder optical modulator 13B are formed by the PN junction. Even in a case in which the optical modulator 13B having the PN junction having a large junction capacitance and a nonlinear capacitance-voltage characteristic is used, by using the frequency characteristic adjustment circuit 10B, it is possible to obtain preferable response characteristics in high speed driving at the low voltage.

Third Embodiment

Figure 13:
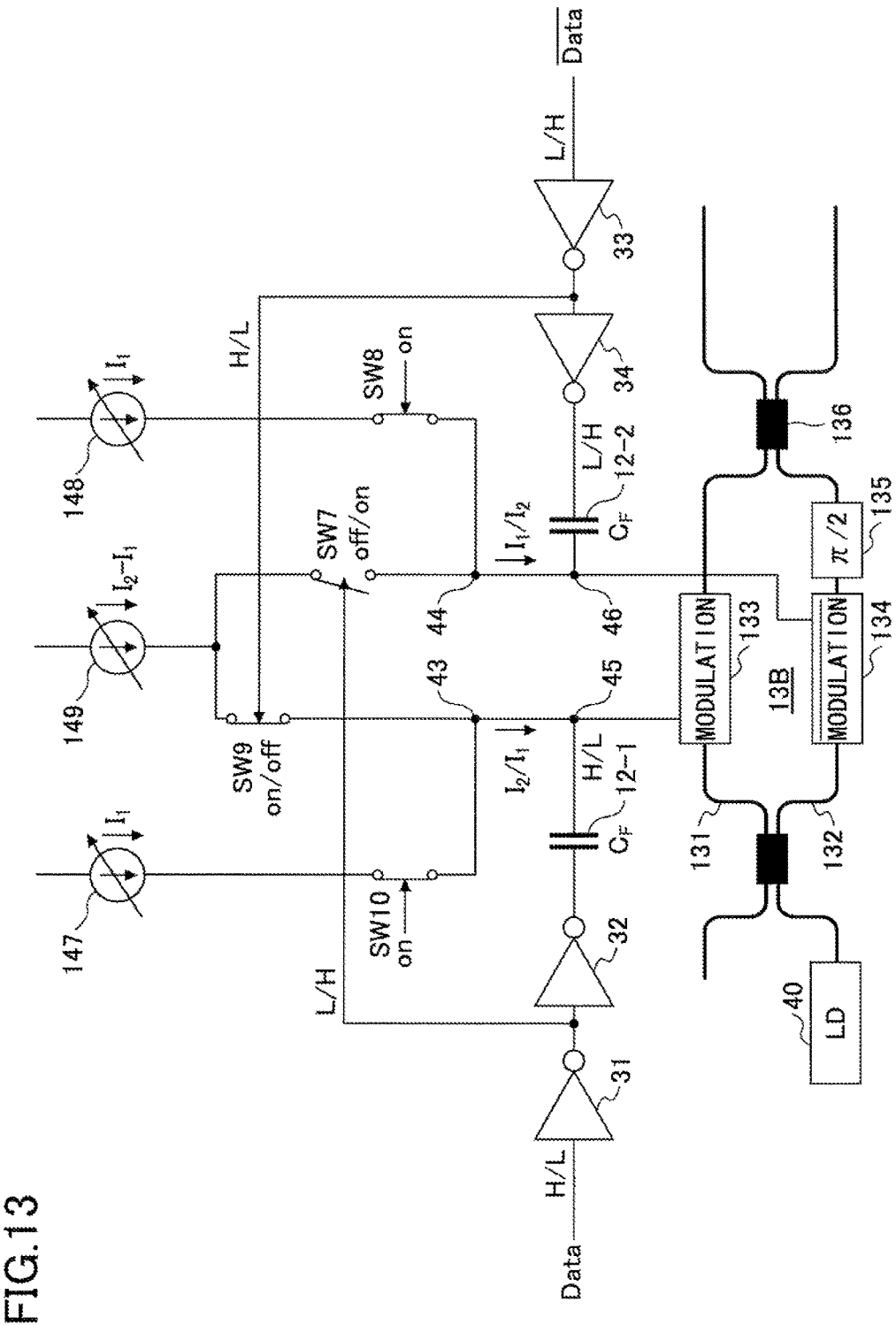
FIG. 13 is a diagram illustrating a configuration of a frequency characteristic adjustment circuit in a third embodiment.

FIG. 13 illustrates the adjustment operation of the optical modulator 13B using a frequency characteristic adjustment circuit 10C in a third embodiment. In the third embodiment, the Mach-Zehnder optical modulator 13B is driven. As an example, first current sources 147 and 148 for supplying a first current $I_1$ and a second current source 149 for supplying a differential current $(I_2-I_1)$ are used as current sources. Also, a differential drive circuit including inverters 31, 32, 33, and 34 is used.

The beam being output from the laser diode (LD) 40 corresponding to a light source is branched into two beams, and the branched beams are input to the optical waveguides 131 and 132, respectively. By applying the voltage to the electrodes 133 and 134, the effective optical path lengths of the optical waveguides 131 and 132 are changed, and then, the two beams are multiplexed by the multiplexer 136. In the multiplexer 136, when there is no phase difference between the beam propagated through the optical waveguide 131 and the beam propagated through the optical waveguide 132, the maximum output is obtained. When an optical path length difference of half the wavelength is generated between the two beams, path lengths of the two beams cancel the optical path length difference by each other, and the output becomes small. As a result, the intensity modulation is performed.

When the data of the output level "H" are input to the inverter 31, the "H" voltage is output to the capacitor 12-1 through the inverter 32. At this time, the "L" voltage is output from the inverter 31 to turn off a switch SW7. With respect to the above, the inverted data "L" are input to the inverter 33, and the "L" voltage is output from the inverter 34 to the capacitor 12-2. The "H" voltage being output from the inverter 33 turns on the switch SW9. Switches SW8 and SW10 are always ON. In a case in which there is no problem in the characteristics of a frequency characteristic adjustment circuit 10C, the switches SW8 and SW10 may be omitted.

Switches SW7 and SW8 are connected to a node 46, and the switches SW9 and SW10 are connected to a node 45. The current accompanying the change of the data, in which the low frequency component is cut off by the charge volume $C_F$, and the composite current $I_2$ of the currents $I_2-I_1$ and the current $I_1$ are flowed to the node 45, due to the input data "H" and the inverted data "L". Then, the current $I_2$ flows to the electrode 133 of one optical waveguide 131 of the Mach-Zehnder optical modulator 13B. At the same time, the current accompanying the change of the data, in which the low frequency component is cut off by the charge volume $C_F$, and the current $I_1$ are flowed to the node 46, and the current $I_1$ flows through the electrode 134 of the optical waveguide 132. The beam propagating through the optical waveguide 132 undergoes the phase adjustment according to the change in the refractive index, is subjected to the phase shift of π/2 by the phase shifter 135, and is combined with the beam propagating through the optical waveguide 131. At this time, the modulator output becomes maximum.

When the data of the output level "L" are input to the inverter 31 and the inverted data of the output level "H" is input to the inverter 33, the reverse operation is performed. The current $I_1$ flows through the electrode 133, and the current $I_2$ flows through the electrode 134. The beam propagating through the optical waveguide 132 undergoes phase adjustment according to the change in the refractive index, is subjected to the phase shift of $\pi/2$ by the phase shifter 135, and is multiplexed with the beam propagating through the optical waveguide 131. The beams being multiplexed are canceled by each other, and the modulator output becomes minimum.

Figure 14:
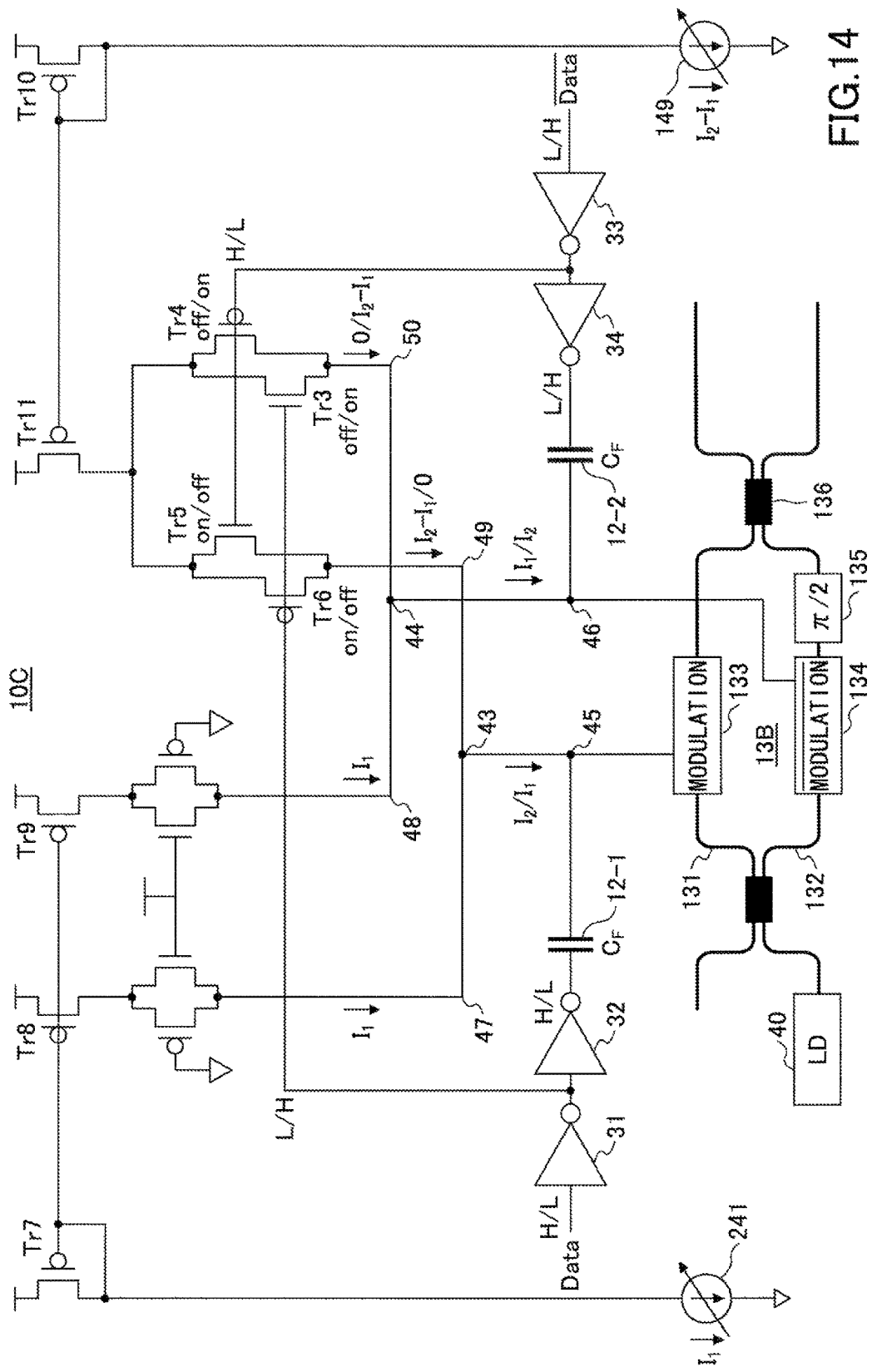
FIG. 14 is a diagram representing the configuration depicted in FIG. 13 by a transistor circuit.

FIG. 14 is a diagram representing the frequency characteristic adjustment circuit 10C in FIG. 13 (the third embodiment) by a transistor circuit. A first current source 241 generates the current $I_1$, and the second current source 149 generates the current $(I_2-I_1)$. This differential current may be referred to as $\Delta I$. The first current source 241 is connected to the gates of transistors Tr8 and Tr9 via a transistor Tr7, and the current $I_1$ appears at a node 43 and a node 44 under a condition that the transistors Tr8, Tr9, and Tr7 are ON. The second current source 149 is connected to the gate of a transistor Tr11 via a transistor Tr10.

When the data of the output level "H" is input to the inverter 31, the "H" voltage is output to the capacitor 12-1 through the inverter 32. The output voltage "L" from the inverter 31 turns on the PMOS Tr6 and turns off a NMOS Tr3. With respect to the above, the inverted data "L" are input to the inverter 33, and the "L" voltage is output from the inverter 34 to the capacitor 12-2. The output voltage "H" from the inverter 33 turns on a NMOS Tr5 and turns off a PMOS Tr4. The NMOS Tr3 and the NMOS Tr5 are optional transistors and need not be used.

The difference current $\Delta I$ flows through a node 49 due to the turning on of the transistor Tr6, added to the current $I_1$ appearing at a node 47, and $\Delta I+I_1=I_2$ flows to the node 43. As a result, the current accompanying the change of the data, in which the low frequency component is cut off by the charge volume $C_F$, and the current $I_2$ flows to the node 45, an AC current accompanying the change in the data and the current $I_2$ flow to the electrode 133 of the optical waveguide 131. At the same time, the supply of the current to a node 50 is cut off by turning off the PMOS Tr4. Only the current accompanying the change of the data, in which the low frequency component is cut off by the charge volume $C_F$, and the current $I_1$ appearing in a node 48 are flowed to the node 46. As a result, the current accompanying the change in the data, in which the low frequency component is cut off by the charge volume $C_F$, and the current $I_1$ flow to the electrode 134 of the optical waveguide 132. The beams multiplexed by the multiplexer 136 are mutually strengthened, and the output of the optical modulator 13B is maximized.

When the data of the output level "L" is input to the inverter 31 and the inverted data of the output level "H" is input to the inverter 33, the operation is reversed as described above. The current and the current $I_1$ accompanying the change in the data, in which the low frequency component is cut off by the charge volume $C_F$, flow to the electrode 133, and the current and the current $I_2$ accompanying the change in the data, in which the low frequency component is cut off by the charge volume $C_F$, flow in the electrode 134. The beams being multiplexed are canceled by each other, and the modulator output becomes minimum.

In FIG. 13 and FIG. 14, the optical waveguides 131 and 132 of the Mach-Zehnder optical modulator 13B are formed by the PN junctions. Even in the case of using the optical modulator 13B having the large junction capacitance and the nonlinear capacitance voltage characteristic, by using the frequency characteristic adjustment circuit 10C, it is possible to obtain preferable response characteristics in the high speed driving at the low voltage.

Fourth Embodiment

Figure 15:
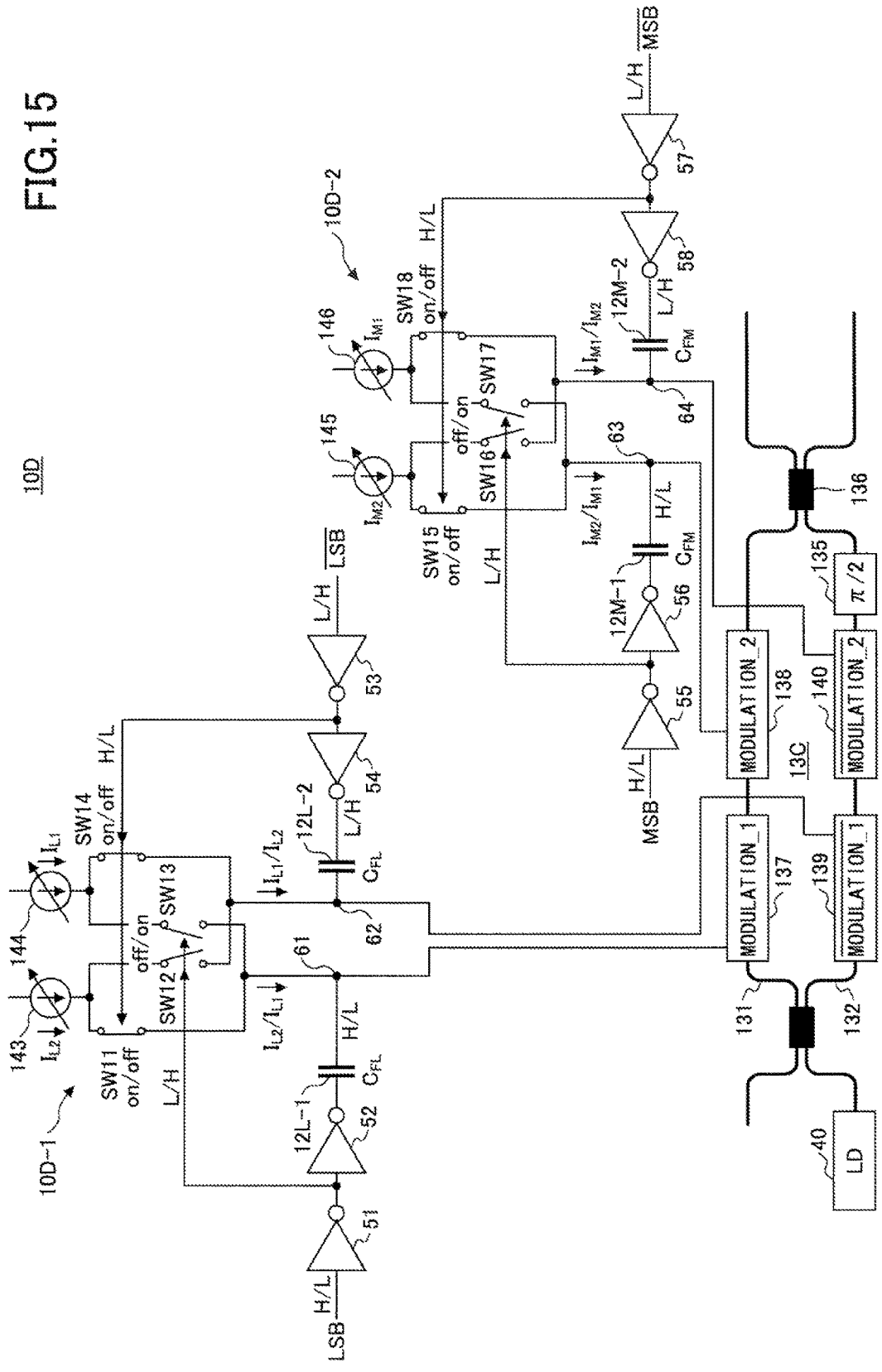
FIG. 15 is a diagram illustrating a configuration of a frequency characteristic adjustment circuit in a fourth embodiment.

FIG. 15 is a diagram illustrating an adjusting operation of an optical modulator 13C using a frequency characteristic adjustment circuit 10D in a fourth embodiment. In the fourth embodiment, a 2-bit pulse amplitude modulation (PAM-4) is performed using the Mach-Zehnder optical modulator 13C. Electrodes 137 and 139 for a least significant bit (LSB) and electrodes 138 and 140 for a most significant bit (MSB) are arranged in each of the optical waveguides 131 and 132 of the Mach-Zehnder optical modulator 13C. In the phase shifter 135, the phase difference of $\pi/2$ is given between the beams propagating through the two optical waveguides 131 and 132, similar to the second embodiment.

The frequency characteristic adjustment circuit 10D includes a circuit portion 10D-1 for the LSB and a circuit portion 10D-2 for the MSB. Basic configurations and operations of the circuit portions 10D-1 and 10D-2 are the same as the configurations and operations illustrated in FIG. 11, and redundant explanations are omitted.

The circuit portion 10D-1 for the LSB includes current sources 143 and 144. The circuit portion 10D-2 for the MSB includes current sources 145 and 146. The current source 143 generates a current $I_{L2}$, and the current source 144 generates current $I_{L1}$. The current source 145 generates current $I_{M2}$ and the current source 146 generates current $I_{M1}$. A ratio between the current $I_{L1}$ and the current $I_{M1}$ is usually 1:2, but may be a different value. The current sources 143, 144, 145, and 146 may be connected to the same power supply voltage $V_{DDH}$. With respect to a value of 2-bit input data, four types of phase changes are generated in the optical modulator 13C as the phase change of a sum of the phase changes generated by a modulation_1 and a modulation_2.

For instance, when the input data to the circuit part 10D-1 for the LSB indicate the output level "H", the current accompanying the change of the data, in which the low frequency component is cut off by a charge volume $C_{FL}$ (12L-1), and the current $I_{L2}$ flows through the electrode 137. A current accompanying a change in data, in which a low frequency component is cut off by a charge volume $C_{FL}$ (12L-2), and a current $I_{L1}$ flows through the electrode 139. When the input data to the circuit portion 10C-2 for the MSB indicate the output level "H", the current accompanying the change of the data, in which the low frequency component is cut off by the $C_{FM}$(12M-1), and the current $I_{M2}$ flows through the electrode 138. The current accompanying the change of the data, in which the low frequency component is cut off by the $C_{FM}$(12M-2), and the current $I_{M1}$ flow through the electrode 140. In the multiplexer 136, a pulse waveform having one of four amplitudes is generated according to voltages applied to the circuit portions 10C-1 and 10C-2.

Fifth Embodiment

Figure 16:
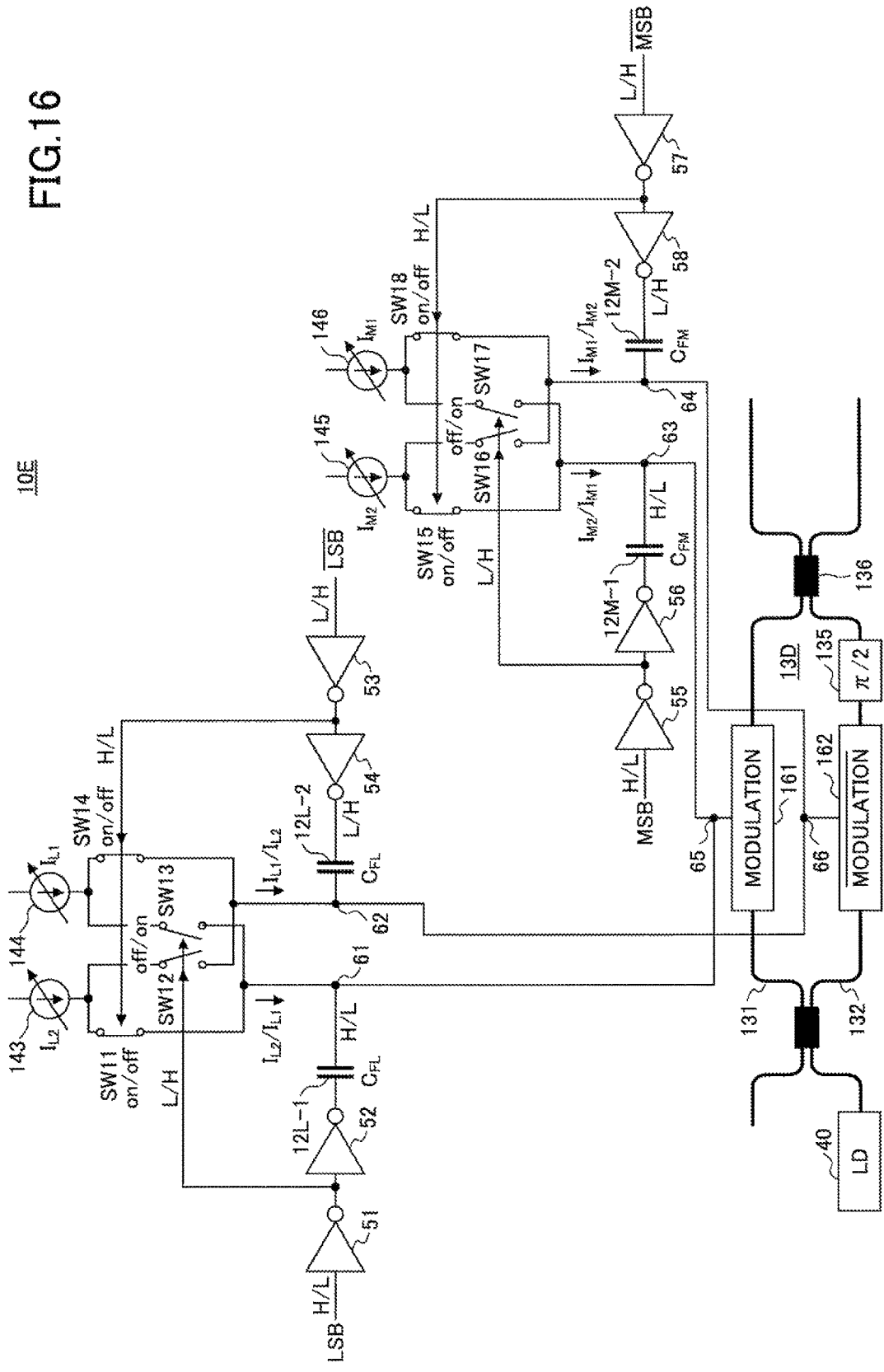
FIG. 16 is a diagram illustrating a configuration of a frequency characteristic adjustment circuit in a fifth embodiment.

FIG. 16 is a diagram illustrating a configuration for adjusting a driving operation of a Mach-Zehnder optical modulator 13D by using a frequency characteristic adjustment circuit 10E in a fifth embodiment. In FIG. 15, separate electrodes are arranged for the LSB and the MSB in the Mach-Zehnder optical modulator 13C. Alternatively, in FIG. 16, an electrode 161 disposed in the optical waveguide 131 and an electrode 162 disposed in the optical waveguide 132 are used.

Similar to the first embodiment through the fourth embodiment, in a circuit portion for the LSB, different current values $I_{L2}$ and $I_{L1}$ flow (indicated as "$I_{L2}/I_{L1}$" and "$I_{L1}/I_{L2}$" in FIG. 16) depending on the input voltage signal level (H or L). In the MSB circuit portion, different current values $I_{M2}$ and $I_{M1}$ flow (indicated as "$I_{M2}/I_{M1}$" and "$I_{M1}/I_{M2}$" in FIG. 16) depending on a voltage signal level (H or L) to be input.

Similar to the current condition for flattening the frequency characteristic described with reference to FIG. 9 with respect to the Non-Return to Zero (NRZ) signal, the condition for flattening the frequency characteristic for a PAM 4 signal in the configuration of FIG. 16 is considered. The condition in FIG. 16 is expressed in equations (7), (8), (9), and (10) as follows:

$$I_M(V_{M00}) = I_{M1} + I_{L1} \quad (7)$$

$$I_M(V_{M01}) = I_{M1} + I_{L2} \quad (8)$$

$$I_M(V_{M10}) = I_{M2} + I_{L1} \quad (9)$$

$$I_M(V_{M11}) = I_{M2} + I_{L2} \quad (10)$$

$$Q_{00} - C_{FL}(V_{SS} - V_{M00}) - C_{FM}(V_{SS} - V_{M00}) \approx Q_{00} - C_{FL}(V_{DD} - V_{M01}) - C_{FM}(V_{SS} - V_{M01}) \approx Q_{00} - C_{FL}(V_{SS} - V_{M10}) - C_{FM}(V_{DD} - V_{M10}) \approx Q_{00} - C_{FL}(V_{DD} - V_{M11}) - C_{FM}(V_{DD} - V_{M11}) \quad (11).$$

In the above equations (7) through (11), a current-voltage characteristic $I_M(V_M)$ of the modulator is the current-voltage characteristic of the Mach-Zehnder optical modulator 13D.

Also in a case of using the configuration depicted in FIG. 16, when the optical modulator 13D is driven at the high speed with the low driving voltage, it is possible to obtain a pulse shape with the preferable response characteristics with less distortion. If the electrical characteristic of the modulator 13D strongly becomes nonlinear, the above equations may not hold. However, in this case, it is possible to approximate the condition in FIG. 16 to the equations.

Sixth Embodiment

Figure 17:
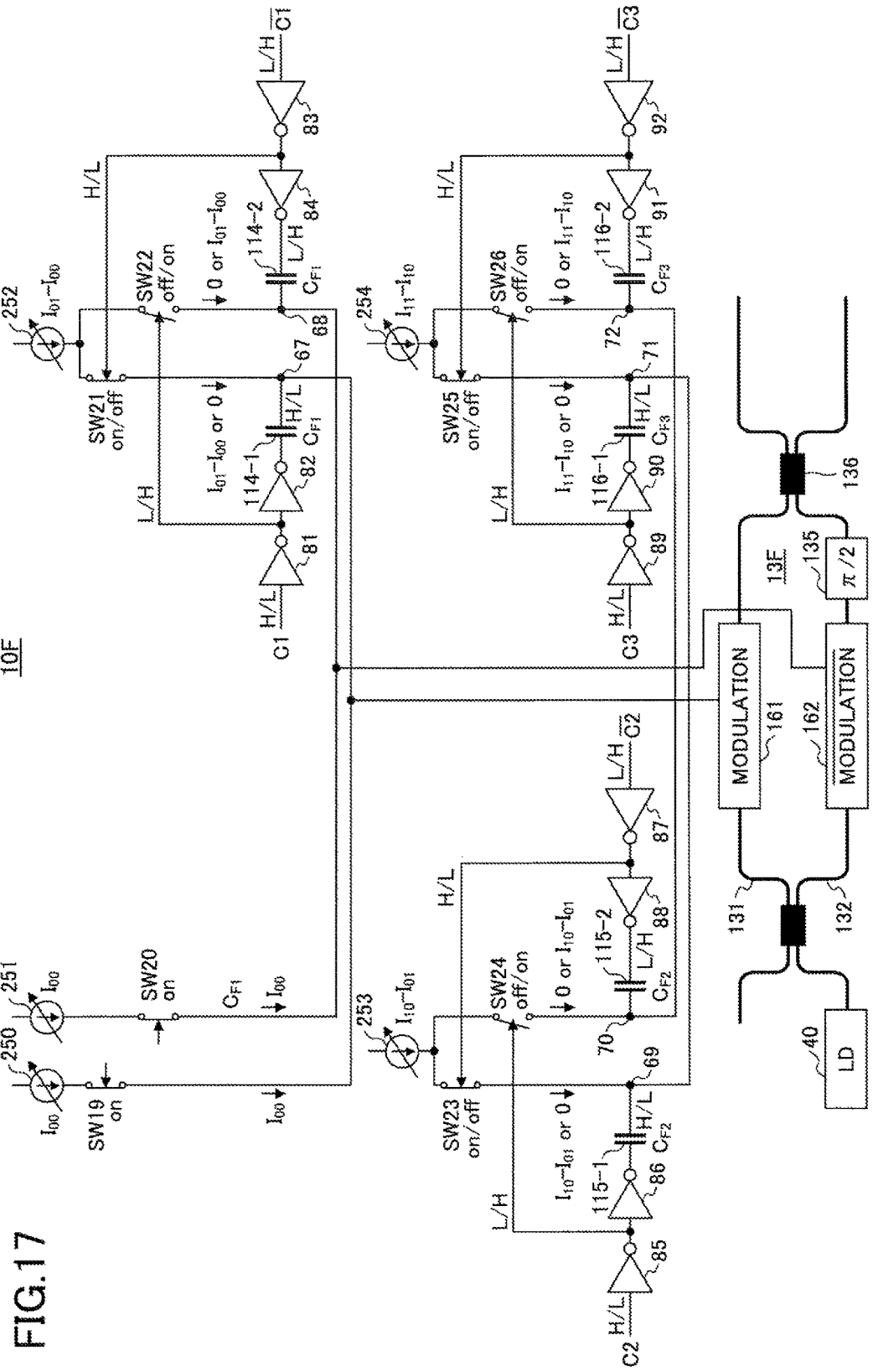
FIG. 17 is a diagram illustrating a configuration of a frequency characteristic adjustment circuit in a sixth embodiment.

FIG. 17 is a diagram illustrating a configuration for adjusting a driving operation of a Mach-Zehnder optical modulator 13F by using a frequency characteristic adjustment circuit 10F in a sixth embodiment. In FIG. 15, separate electrodes are arranged for the LSB and the MSB in the Mach-Zehnder optical modulator 13C. Alternatively, in FIG. 17, similar to the fifth embodiment, an electrode 161 disposed in the optical waveguide 131 and an electrode 162 disposed in the optical waveguide 132 are used. Also, current sources 250, 251, 252, 253, and 254 are used.

The current source 250 and the current source 251 provide a current $I_{00}$. A switch SW19 connected to the current source 250 and a switch SW20 connected to the current source 251 are always ON. Depending on the characteristics of the frequency characteristic adjustment circuit 10F, the switches SW19 and SW20 may be omitted.

In a circuit portion corresponding to a drive circuit (including inverters 81 to 84) to which a data signal C1 and its inverted signal are input, capacitors 114-1 and 114-2 of a capacitance $C_{F1}$ are used. Depending on the value (H or L) of the input voltage signal, the value of the current flowing through nodes 67 and 68 is either $I_{01}-I_{00}$ or zero.

In a circuit portion corresponding to a drive circuit (including inverters 85 to 88) to which a data signal C2 and its inverted signal are input, capacitors 115-1 and 115-2 of a capacitance $C_{F2}$ are used. Depending on the value of the input voltage signal, the current value flowing through nodes 69 and 70 is either $I_{10}-I_{01}$ or zero.

In a circuit portion corresponding to a drive circuit (including inverters 89 to 92) to which a data signal C3 and its inverted signal are input, capacitors 116-1 and 116-2 of the capacitance $C_{F3}$ are used. In accordance with the value of the input voltage signal, the current value flowing through nodes 71 and 72 is $I_{11}-I_{10}$ or zero.

A condition for flattening the frequency characteristic when modulating using four voltage levels $V_{M00}$, $V_{M01}$, $V_{M10}$, and $V_{M11}$ in the sixth embodiment of FIG. 17 is expressed in equations (12), (13), (14), (15), and (16) as follows:

$$I_M(V_{M00}) = I_{00} \quad (12)$$

$$I_M(V_{M01}) = I_{00} + (I_{01} - I_{00}) = I_{01} \quad (13)$$

$$I_M(V_{M10}) = I_{00} + (I_{01} - I_{00}) + (I_{10} - I_{01}) = I_{10} \quad (14)$$

$$I_M(V_{M11}) = I_{00} + (I_{01} - I_{00}) + (I_{10} - I_{01}) = (I_{11} - I_{10}) = I_{11} \quad (15)$$

$$Q_{00} - C_{F1}(V_{SS} - V_{M00}) - C_{F2}(V_{SS} - V_{M00}) - C_{F3}(V_{SS} - V_{M00}) \quad (16)$$
$$= Q_{01} - C_{F1}(V_{DD} - V_{M01}) - C_{F2}(V_{SS} - V_{M01}) - C_{F3}(V_{SS} - V_{M01})$$
$$= Q_{10} - C_{F1}(V_{DD} - V_{M10}) - C_{F2}(V_{DD} - V_{M10}) - C_{F3}(V_{SS} - V_{M10})$$
$$= Q_{11} - C_{F1}(V_{DD} - V_{M11}) - C_{F/2}(V_{DD} - V_{M11}) - C_{F3}(V_{DD} - V_{M11}).$$

Also, in a case of using the configuration depicted in FIG. 17, when the optical modulator 13F is driven at the high speed with the low driving voltage, it is possible to obtain a pulse shape with the preferable response characteristics with less distortion.

Seventh Embodiment

The frequency characteristic adjustment circuits in the first embodiment to the sixth embodiment supply currents indicating the different current values respective to optical circuit elements, which are driven according to the voltage received from the drive circuit. Hence, the high speed driving of the optical circuit elements are realized at the low voltage, and the preferable response characteristics are realized. It is possible to further improve the circuits in the first embodiment to the sixth embodiment by applying a configuration described below.

Figure 18:
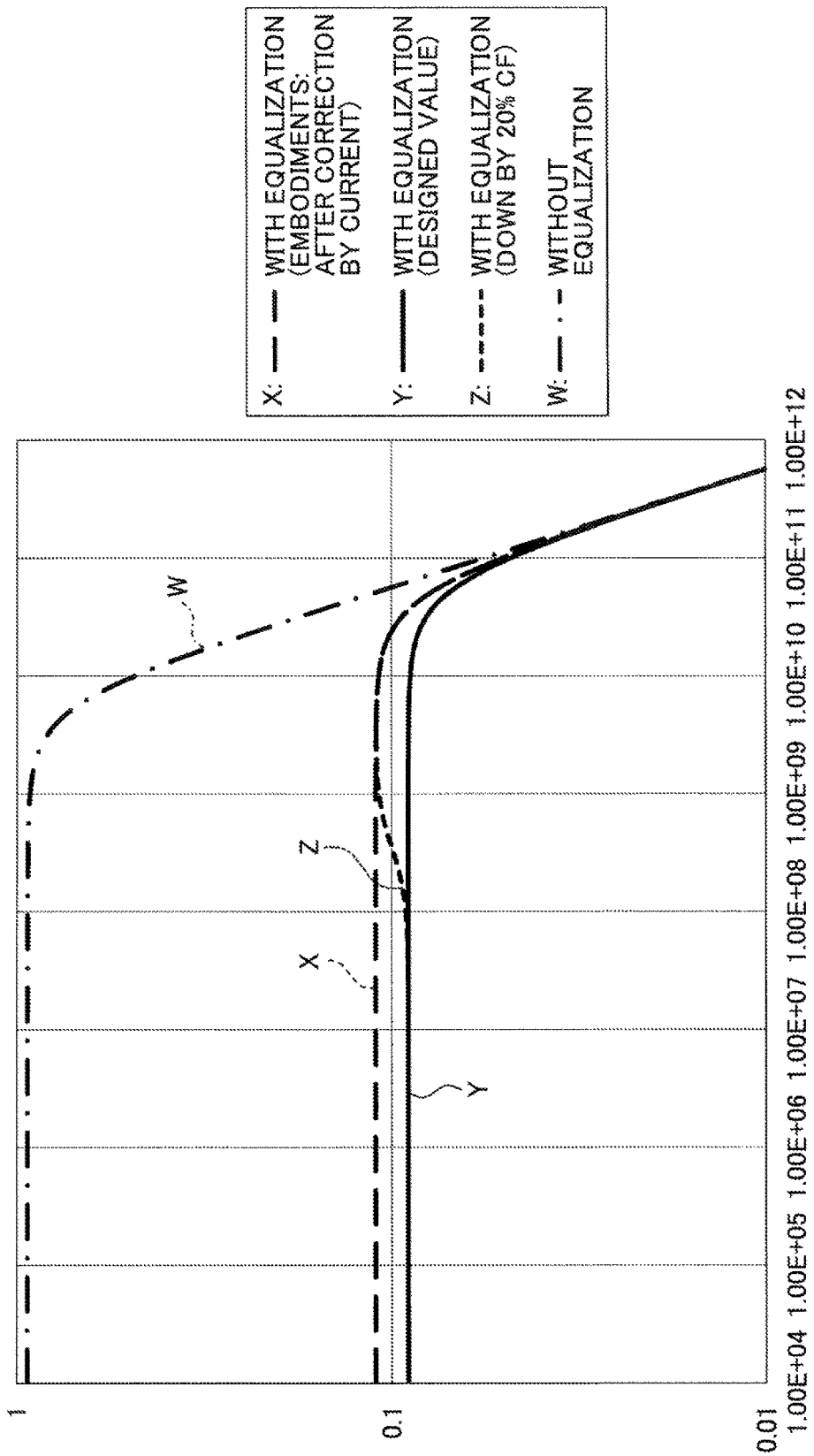
FIG. 18 is a graph for explaining a further improvement of the frequency characteristic adjustment circuit.

FIG. 18 is a graph for explaining a further improvement of the frequency characteristic adjustment circuit. By inserting the equalizing circuit designed as indicated by a solid line Y in a state without using the equalizing circuit (frequency characteristic indicated by a dash-dotted line W), it is possible to extend the bandwidth by a factor of 10 (a DC gain is one-tenth). However, when the capacitance drops by 20% from a design value due to a process variation or the like, the frequency characteristic is not flat in the medium frequency bandwidth as indicated by a short dashed line Z. Then, an intersymbol interference (ISI) occurs in a signal.

In order to solve this problem, in the first embodiment to the sixth embodiment, by changing settings of the currents supplied to the optical circuit elements, a flat frequency characteristic is realized as indicated by a broken line X. Even if the frequency characteristics are flat, the DC gain and bandwidth may deviate slightly from their designed values.

In order to solve the deviation from the design values, it is conceivable to use a variable capacitance such as a varactor. However, since the variable capacitance has a large parasitic resistance component and a linearity (capacitance-voltage characteristic) is not preferable, the frequency characteristic may be degraded.

Therefore, in the seventh embodiment, a plurality of sets of the drive circuit and the capacitor are arranged, and in some or all combinations, an output state of the drive circuit is selectable between "active" and "High-Z" (high impedance).

Figure 19:
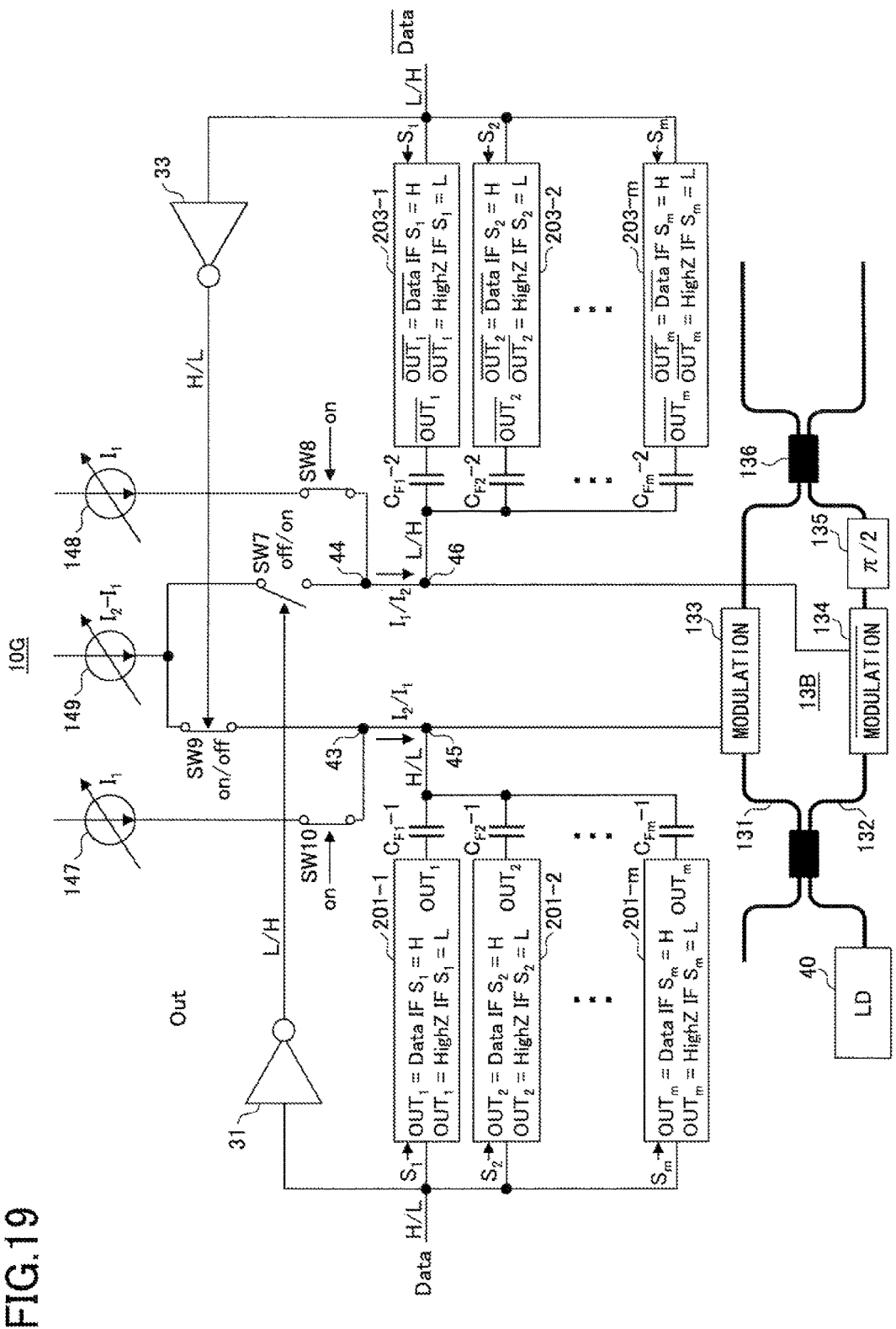
FIG. 19 is a diagram illustrating a configuration of a frequency characteristic adjustment circuit in a seventh embodiment.

FIG. 19 is a diagram illustrating an operation example of the optical modulator 13B using a frequency characteristic adjustment circuit 10G in the seventh embodiment. In this example, similar to FIG. 13 (the third embodiment), by using the first current sources 147 and 148 for supplying the first current $I_1$, and the second current source 149 for supplying the difference current $(I_2-I_1)$, the Mach-Zehnder optical modulator 13B is driven.

On the input side of the data signal, instead of the inverters 31 and 32 and the capacitor ($C_F$) 12-1 in FIG. 13, a plurality of pairs of output state variable buffers 201 (collectively representing 201-1 through 201-$m$) and capacitors $C_F$-1 (collectively representing $C_{F1}$-1 through $C_{Fm}$-1) as the drive circuit are arranged. On the input side of the inverted data signal, instead of the inverters 33 and 34 and the capacitor ($C_F$) 12-2 in FIG. 13, a plurality of pairs of output state variable buffers 203 (collectively representing 203-1 through 203-$m$) and capacitors $C_F$-2 (collectively representing $C_{F1}$-2 through $C_{Fm}$-2) are arranged as drive circuits.

In detail, the inverters 31 and 32 and the capacitors $C_F$ connected to their outputs are divided into the output state variable buffer 201-1 and the capacitor $C_{F1}$, the output state variable buffer 201-2 and the capacitor $C_{F2}$, . . . , and an output state variable buffer 201-$m$ and the capacitor $C_{Fm}$. In the same manner, the inverters 33 and 34 and the capacitors $C_F$ connected to their outputs are connected to the output state variable buffer 203-1, the $C_{F1}$, the output state variable buffer 203-2, the $C_{F2}$, . . . , the output state variable buffer 203-$m$, the $C_{Fm}$.

Control signals $S_1, \ldots, S_m$ are input with the data signals to the output state variable buffers 201-1 to 201-$m$, respectively. The control signals $S_1, \ldots, S_m$ are input with the inverted data signals to the output state variable buffers 203-1 to 203-$m$, respectively.

When a control signal S is "High", the output state variable buffers 201 and 203 buffer and output inputs. Also, the output state variable buffers 201 and 203 have functions of setting the output state to "High-Z", when the control signal S is "Low". Therefore, among the capacitors $C_{F1}$ to $C_{Fm}$, only the capacitor connected to the output state variable buffer 201 or 203, in which the control signal S indicates "High", contributes to the frequency characteristic adjustment. The capacitor connected to the output state variable buffer 201 or 203, in which control signal S indicates "Low", does not contribute to the frequency characteristic. With this configuration, it is possible to adjust the signal bandwidth by the control signal S, and it is possible to realize an optical transmitter capable of supporting a plurality of communication standards.

The drive operation of the Mach-Zehnder optical modulator 13B by switching the current value is the same as that in the third embodiment, and a redundant explanation will be omitted. In FIG. 13, the signals for controlling the switches SW7 and SW9 connected to the current source are extracted from between the inverters 31 and 32, and between the inverters 33 and 34, whereas in FIG. 19, the inverters 31 and 33 are provided. Functions are the same as those in the third embodiment.

The configuration depicted in FIG. 19 corresponds to the example of the switch configuration (the third embodiment) using the differential current in FIG. 13. This configuration in FIG. 19 may be applied to the transistor configuration in FIG. 14 in the same manner. Moreover, it is possible to apply any of the configurations in the first, second, fourth to sixth embodiments. In a case of combining with any of the configurations, depending on the control signal S, by setting the output state to "active" or "High-Z" with a desired combination of the output state variable buffer and the capacitor, it is possible to realize a designed frequency bandwidth while flattening the frequency characteristic. In FIG. 19, for convenience, a circuit including the capacitor $C_{F1}$-1 through $C_{Fm}$-1, the first current sources 147 and 148, and the switches SW7 through SW10 may be called as "adjustor circuit". Also, a circuit including the capacitor $C_{F1}$-2 through $C_{Fm}$-2, the first current sources 147 and 148, and the switches SW7 through SW10 may be called as "adjustor circuit for the inverted signal".

Figure 20:
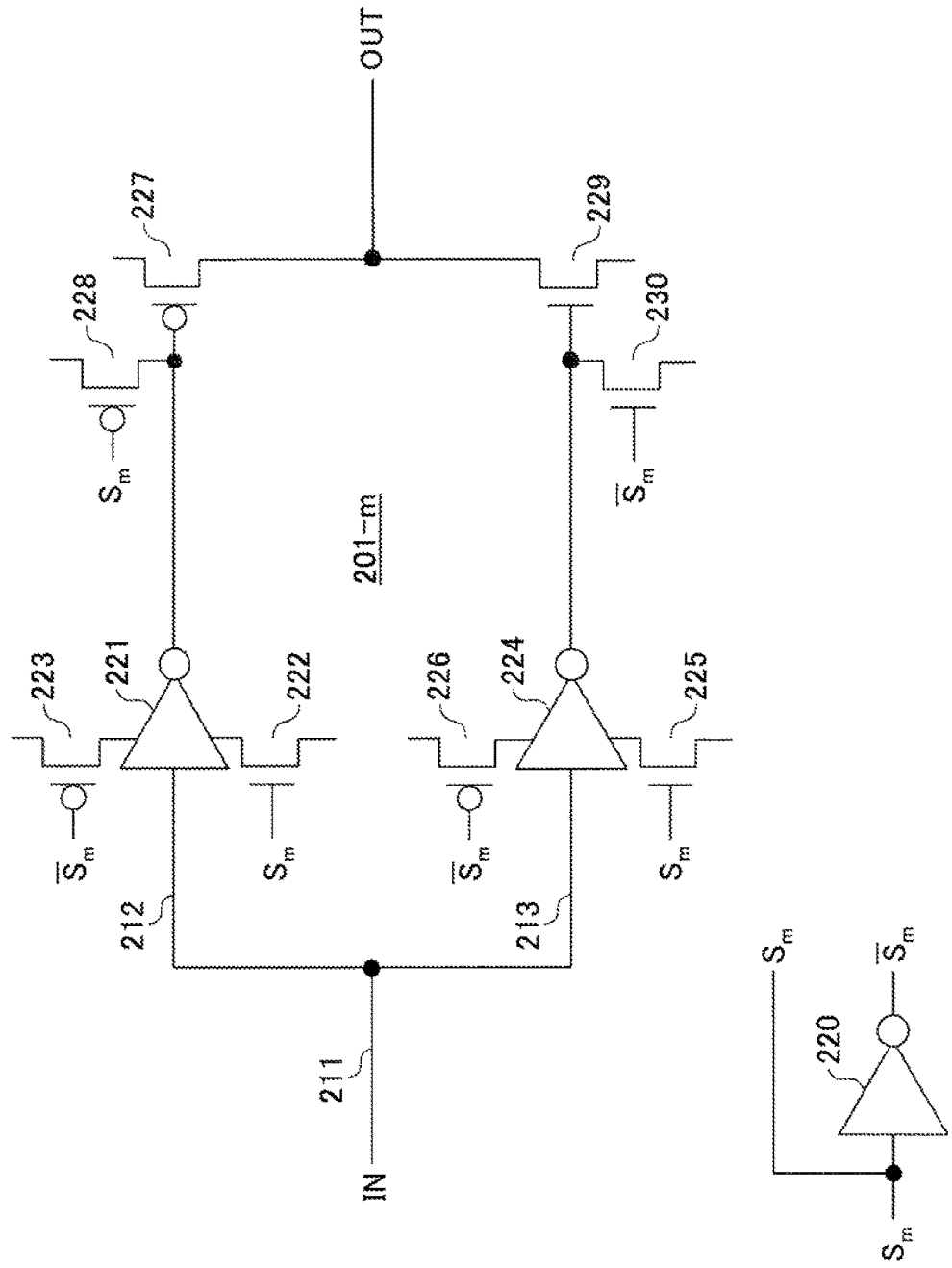
FIG. 20 is a diagram illustrating a configuration example of an output state variable buffer used in the circuit in FIG. 19.

FIG. 20 illustrates a circuit configuration example of the output state variable buffer 201-$m$. In FIG. 20, for a convenience of illustration, a part of a connection is omitted. A data signal (IN) and the control signal $S_m$ are input to the output state variable buffer 201-$m$, and the inverted signal of the control signal $S_m$ is generated by an inverter 220. The control signal $S_m$ and an inversion control signal $S_m$ (bar) are connected to gates of the corresponding transistors, respectively.

An input 211 is branched into two systems of a signal component 212 and a signal component 213 and branched input signals are input to inverters 221 and 224, respectively. Each of the inverters 221 and 224 has a power supply side connected to PMOS transistors 223 and 226, and a ground side connected to NMOS transistors 222 and 225.

When the control signal $S_m$ is "High", the NMOS transistors 222 and 225 are ON. PMOS transistors 223 and 226 are also turned ON, since their inputs are inverted by the inverter 220 and set to "Low". Therefore, outputs of the inverters 221 and 224 are inverted with respect to an input IN. In addition, since a PMOS transistor 228 and a NMOS transistor 230 are also turned OFF, the circuit composed of a PMOS transistor 227 and a NMOS transistor 229 functions as inverters. As a result, an output (OUT) becomes the same signal as the input and functions as the buffer as a whole.

With respect to the above, when the control signal $S_m$ is "Low", the PMOS transistors 223 and 226 and the NMOS transistors 222 and 225 are turned OFF, the inverters 221 and 224 are not operated, and the PMOS transistor 228 and the NMOS transistor 230 are turned ON. As a result, the PMOS transistor 227 and the NMOS transistor 229 are also turned OFF, and the output (OUT) is in a "High-Z" state.

In this manner, the drive circuit, that is, the output state variable buffers 201 and 203, is realized by using the two-stage CMOS inverters. In each of two branched paths, a first-stage CMOS inverter is switch-connected to the power supply and the ground, the output of the CMOS inverter is fixed to the power supply side at a first stage switch OFF of a first path, and the output of the CMOS inverter is fixed to the ground side at the first stage switch OFF of a second path. At this time, an output of a second stage PMOS to which the output of a first stage CMOS inverter of the first path is connected, and an output of a second stage NMOS to which the output of the first stage CMOS inverter of the second path is connected are in the "High-Z" state. Each of divided drive circuits is not limited to the output state buffer configuration depicted in FIG. 20, and may be any configuration capable of selectively outputting an input value and the "High-Z" state.

<Control of Current Supplied from Frequency Characteristic Adjustment Circuit>

Next, the control of the current $I_1$ and the current $I_2$ supplied from the frequency characteristic adjustment circuit 10 will be described. The control of the current $I_1$ and the current $I_2$ is applied to any of the above-described first through seventh embodiments.

FIG. 21A through FIG. 21C are diagrams for explaining a phenomenon in a case in which the current supplied from the frequency characteristic adjustment circuit 10 to the optical circuit element deviates. In FIG. 21A through FIG. 21C, an upper row depicts an input waveform in a case in which a signal, which alternately switches "0" and "1", is input to the drive circuit 11 with a period being lower than the intermediate frequency region. A lower row depicts a waveform of a voltage applied to the optical modulator 13 when the signal depicted at the upper row is input to the drive circuit 11. In this case, the optical modulator 13 exhibits performance as designed if the current, which is supplied from the frequency characteristic adjustment circuit 10 to the optical modulator 13, is supplied according to the equations (4) and (5) described above:

$$I_M(V_{M1})=I_1 \quad (4)$$

$$I_M(V_{M2})=I_2 \quad (5)$$

It is considered that the current, which is supplied from the frequency characteristic adjustment circuit 10 to the optical modulator 13, becomes $I_1'$ instead of $I_1$, or $I_2'$ instead of $I_2$. A pattern (A) of FIG. 21A illustrates a voltage waveform of an input of the drive circuit and a voltage waveform of the optical modulator when $I_1'=I_1$ and $I_2'=I_2$.

A pattern (B) of FIG. 21B illustrates the waveforms in a case of $I_1'<I_1$ or $I_2'>I_2$, and a pattern (C) of FIG. 21C illustrates the waveforms in a case of $I_1'>I_1$ or $I_2'<I_2$. In the pattern (A), a spike-like waveform is seen when the input signal to the drive circuit changes (rises and falls), and then a constant voltage is maintained. In the pattern (B), in an interval of an input value "1", after a spike, the voltage gradually rises from a desired voltage level. When the input value switches to "0", the spike occurs in the reverse direction, and gradually decreases toward the desired voltage level thereafter.

In the pattern (C) of FIG. 21C, the voltage level slowly drops after an occurrence of the spike due to a change from "0" to "1". However, the voltage level does not return to the desired voltage level appearing within the predetermined period. When the input value becomes "0", the voltage level continues to rise slowly towards the desired voltage level after the spike in the reverse direction.

In the pattern (A), the voltage applied to the optical modulator after the spike is maintained at a constant level, whereas in the pattern (B) and the pattern (C), the voltage applied to the optical modulator is shifted after the spike (switching of the input value). The direction of the change is opposite between the pattern (B) and the pattern (C).

FIG. 22A through FIG. 22C are diagrams for explaining a principle of detecting the deviation of the current setting value. In FIG. 22A through FIG. 22C, time is shifted and original waveforms are superimposed. A solid line represents the waveform in FIG. 21A through FIG. 21C, and a broken line represents the waveform when the time is shifted. The waveform of the broken line changes later than that of the solid line. At a time $T_1$ (the input is high) and a time $T_2$ (the input is Low) when an initial spike-like voltage change is ending, the voltages of the two waveforms are compared with each other. As depicted by circles, in the pattern (A) of FIG. 22A, the waveform of the solid line and the waveform of the broken line are the same potential at both times $T_1$ and $T_2$ even if the time is shifted. In the pattern (B) of FIG. 22B, at time $T_1$, the potential of the solid line is higher than the potential of the broken line (solid line>broken line). At the time $T_2$, the potential of the solid line is lower than the potential of the broken line (solid line<dashed line). In the pattern (C) of FIG. 22C, at time $T_1$, the potential of the solid line is lower than the potential of the broken line (solid line<broken line). At the time $T_2$, the potential of the solid line is higher than the potential of the broken line (solid line>broken line).

By comparing the original waveform of the voltage applied to the optical modulator and the waveform shifted in time, it is possible to comprehend to which side the current condition deviates. Assuming that the frequency of the input signal is f and the time to shift the waveform on a time axis is τ, τ is preferably as large as possible. In such a case, a certain condition is derived.

Figure 23:
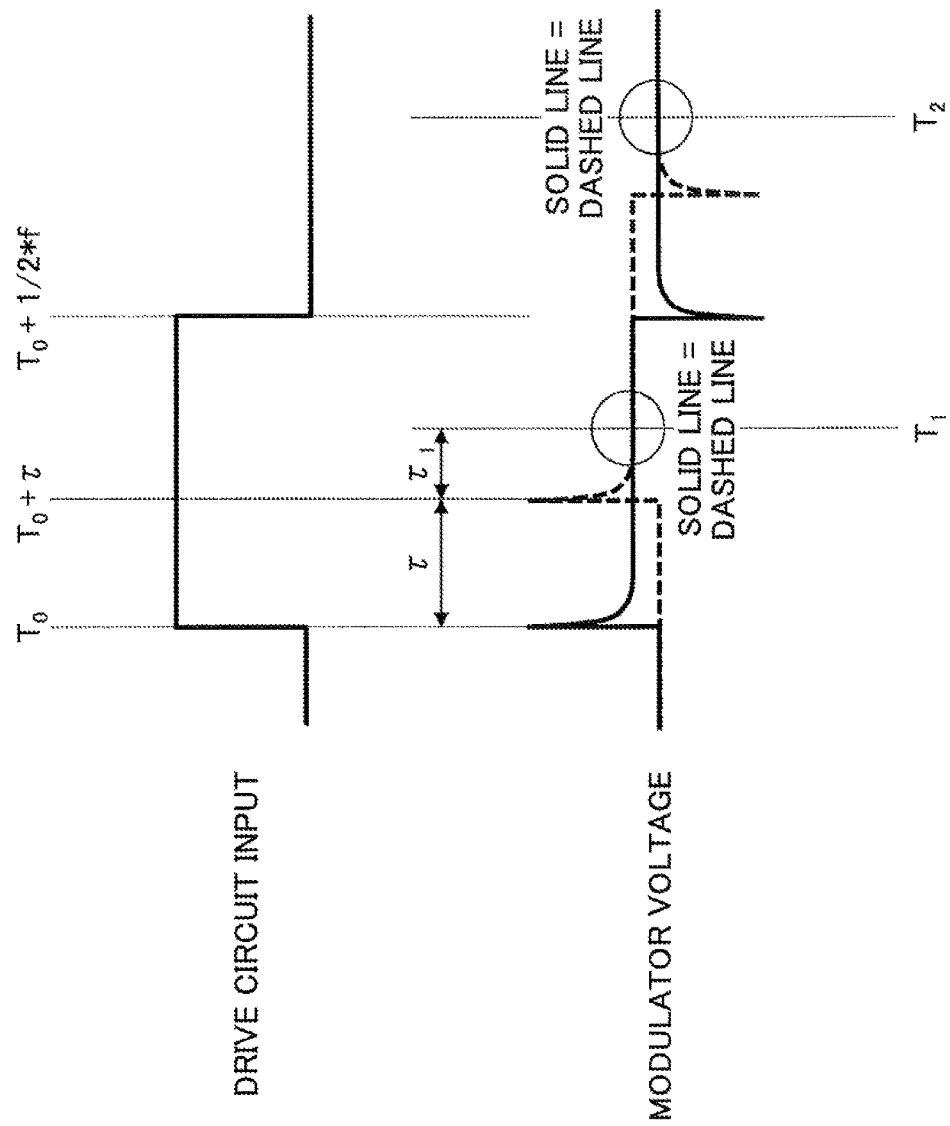
FIG. 23 is a diagram for explaining a principle for detecting a deviation of the current setting value.

As illustrated in FIG. 23, τ1 denotes a time taken for the spike-like change appearing in the voltage applied to the optical modulator to end, and τ2 denotes a reaction time of a comparator comparing the waveforms, the following condition is derived:

$$T_1>T_0+\tau+\tau1, \text{ and}$$

$$T_1+\tau2<T0+1/(2*f).$$

From these two conditional expressions, $$\tau<1/(2*f)-\tau1-\tau2$$

the above expression is derived. Accordingly, for a waveform comparison, a delay time τ for shifting the voltage waveform is set to satisfy τ<1/(2*f)−τ1−τ2.

Figure 24A:
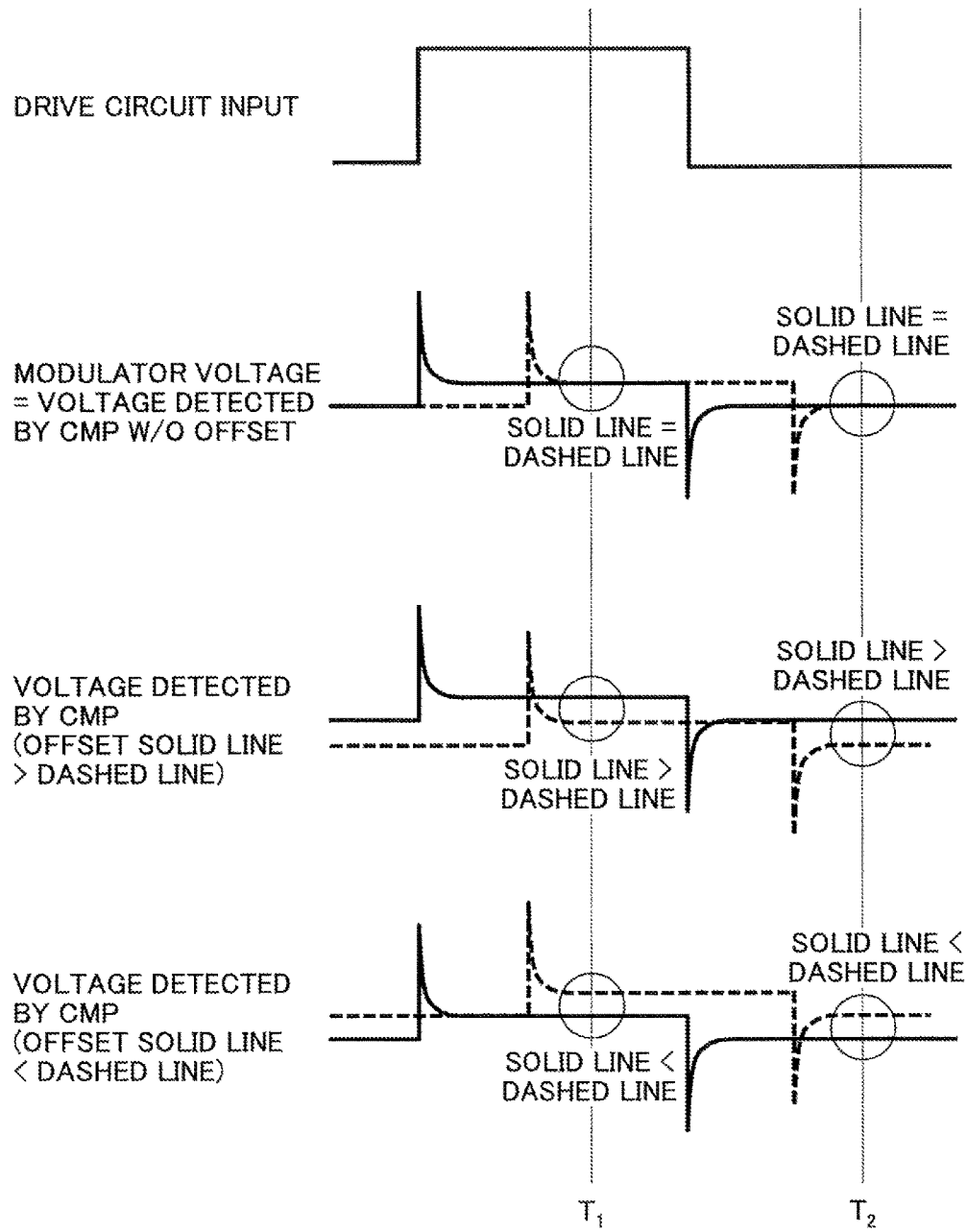
FIG. 24A through FIG. 24C are diagrams for explaining a phenomenon and its detection in a case in which there is an input offset of a comparator.
Figure 24B:
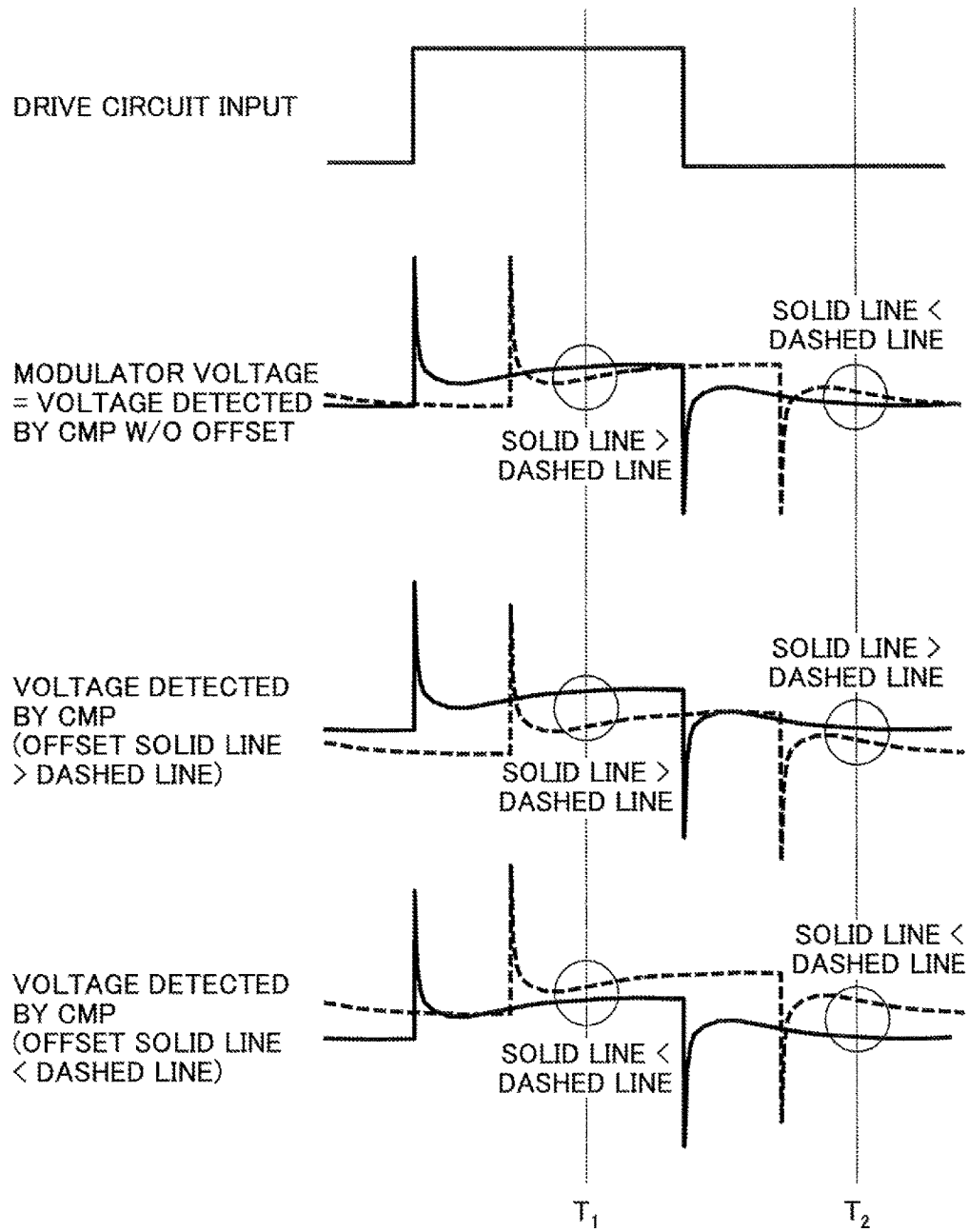
Figure 24C:
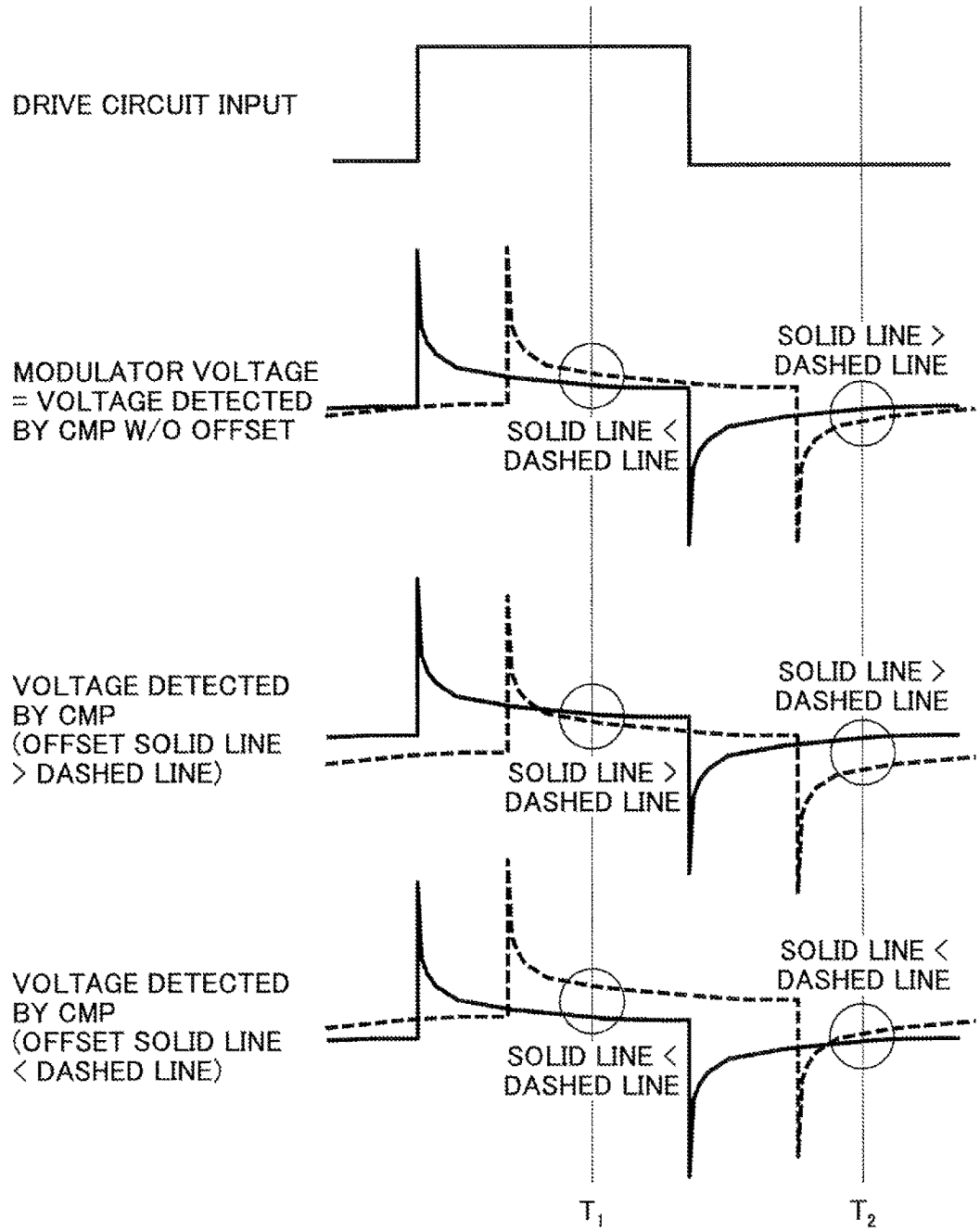

FIG. 24A, FIG. 24B, and FIG. 24C are diagrams illustrating cases in which an input offset voltage of the comparator (CMP) is considered when comparing the voltage waveforms. The input offset voltage indicates a value representing an error of the comparator and is regarded as the voltage difference between the inputs when the output becomes 0 (0 for no error). FIG. 24A depicts the voltage waveform under the condition of the pattern (A), FIG. 24B depicts the voltage waveform under the condition of the pattern (B), and FIG. 24C depicts the voltage waveform under the condition of the pattern (C). As illustrated in a second row from a top in FIGS. 24A to 24C, assuming that there is no input offset, by comparing the two waveforms (the original waveform and the time-shifted waveform) at the times $T_1$ and $T_2$ at which the spike converges, a magnitude relation is obtained. Based on the obtained magnitude relation, it is possible to specify a direction of the deviation of the current condition. As depicted in FIG. 24A, when the voltage values compared in the two waveforms are the same, $I_1'=I_1$ and $I_2'=I_2$. A theoretical current is supplied from the frequency characteristic adjustment circuit 10 to the optical circuit element (for instance, the optical modulator) 13. As depicted in FIG. 24B, at time $T_1$, a level of the solid line (original waveform) is smaller than a level of the broken line (shift waveform), and at time $T_2$, the level of the solid line (original waveform) is greater than the level of the broken line (shift waveform). In this case, the current supplied to the optical modulator 13 deviates in a direction of $I_1'<I_1$ or $I_2'>I_2$. As depicted in FIG. 24C, at time $T_1$, the level of the solid line (original waveform) is smaller than the level of the broken line (shift waveform), and at time $T_2$, the level of the solid line (original waveform) is larger than the level of the broken line (shift waveform). In this case, the current supplied to the optical modulator 13 deviates in a direction of $I_1'>I_1$ or $I_2'<I_2$.

However, there is generally an input offset in the comparator. The second row from the bottom in FIGS. 24A to 24C illustrate a case in which an offset received as the solid line (original waveform)>the broken line (shift waveform) is generated in the comparator. When the offset of the comparator is sufficiently greater, the comparator always outputs a determination result of the solid line (original waveform) >the broken line (shift waveform) irrespective of a current condition and of the timing. Conversely, as depicted in the bottom row of FIGS. 24A to 24C, when an offset received as the solid line<the broken line occurs in the comparator, if the offset is sufficiently greater, the comparator outputs the determination result of the solid line<the dashed line irrespective of a current condition and of the timing. Therefore, if the comparison results of two consecutive times are the same and both comparison results are determined as the solid line>the dashed line, the offset of the comparator is adjusted in a direction in which a second comparison result becomes the solid line<the dashed line. If the results of two consecutive comparisons are the same, and the solid line<the broken line is determined in both cases, the offset of the comparator is adjusted in a direction, in which the second comparison result indicates the solid line>the broken line. By this adjustment, it is possible to accurately determine the deviation of the current condition.

Figure 25:
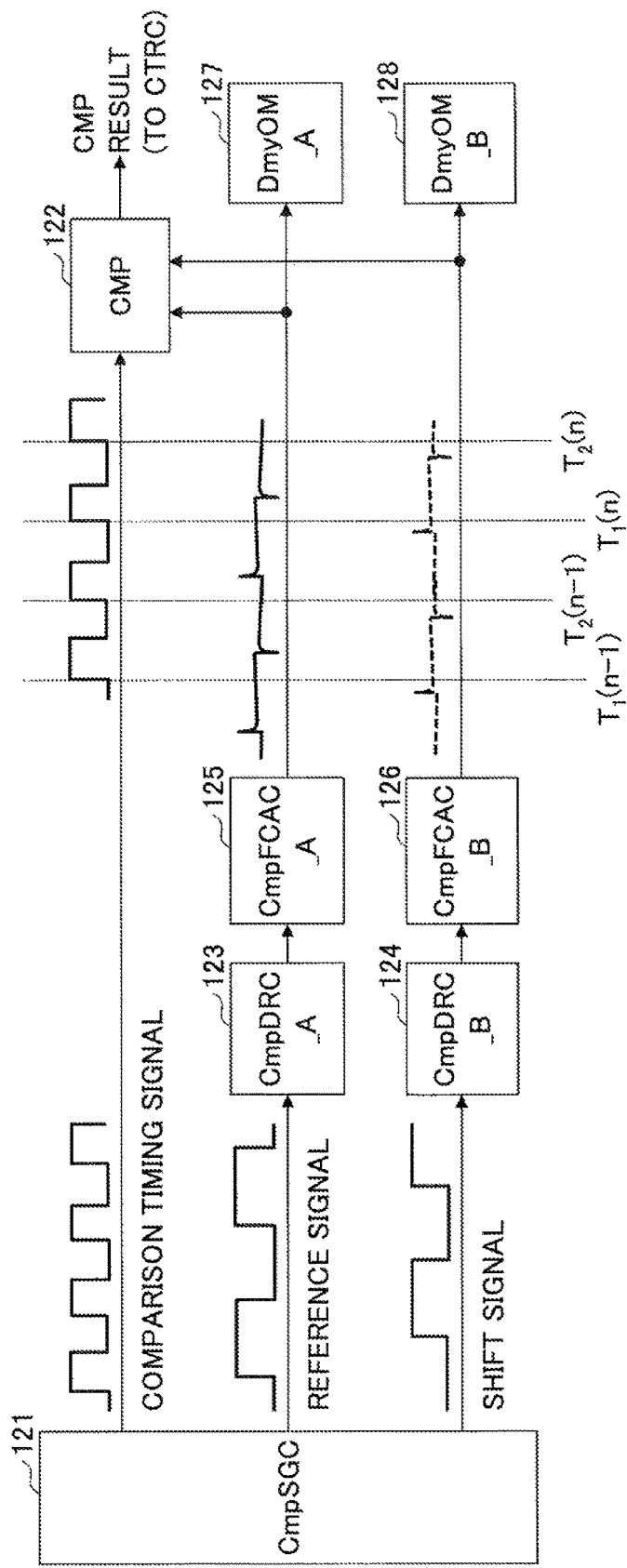
FIG. 25 is a diagram illustrating a configuration of a circuit for monitoring a current condition of the frequency characteristic adjustment circuit.

FIG. 25 is a diagram illustrating a configuration of a current condition monitoring circuit 30 for monitoring the deviation of the current condition. The current condition monitoring circuit 30 includes a comparison signal generation circuit (CmpSGC) 121, a comparator (CMP) 122, a comparison drive circuit_A (CmpDRC_A) 123, a comparison drive circuit_B (CmpDRC_B) 124, a comparison frequency characteristic adjustment circuit_A (CmpFCAC_A) 125, a comparison frequency characteristic adjustment circuit_B (CmpFCAC_B) 126, a dummy optical modulator_A (DmyOM_A) 127, and a dummy optical modulator_B (DmyOM_B) 128. The comparison signal generation circuit 121 generates a reference signal synchronized with a data signal being input to the drive circuit (DRC) 11 for the optical modulation, a shift signal obtained by shifting the reference signal by time τ, and a comparison timing signal. The shift signal rises after the reference signal rises, and the shift signal falls after the reference signal falls.

The reference signal is input to the comparison drive circuit_A 123, and the comparison drive signal generated by the comparison drive circuit_A 123 is input to the comparison frequency characteristic adjustment circuit_A 125. The comparison frequency characteristic adjustment circuit_A 125 supplies the current $I_1$ or the current $I_2$ to the dummy optical modulator_A 127 in response to the voltage level of the comparison drive signal. The shift signal is input to the comparison drive circuit_B 124, and the drive signal generated by the comparison drive circuit_B 124 is input to the comparison frequency characteristic adjustment circuit_B 126. The comparison frequency characteristic adjustment circuit_B 126 supplies the current $I_1$ or the current $I_2$ to the dummy optical modulator_B 128 in response to the voltage level of the comparison drive signal. The comparison drive circuit_A 123 and the comparison drive circuit_B 124 have the same configuration as the drive circuit 11 used in the first to seventh embodiments. The comparison frequency characteristic adjustment circuit_A 125 and the comparison frequency characteristic adjustment circuit_B 126 have the same configuration as the frequency characteristic adjustment circuit 10 (or any of 10A to 10G) used in the first to seventh embodiments. The dummy optical modulator_A 127 and the dummy optical modulator_B 128 have the same configuration as the optical modulator (OptMD) 13 used in the first to seventh embodiments. However, light need not be input to the dummy optical modulator_A 127 and the dummy optical modulator_B.

The comparison timing signal, the voltage waveform applied to the dummy optical modulator_A 127, and the voltage waveform applied to the dummy optical modulator_B 128 are input to the comparator 122. The comparator 122 compares the waveform of the voltage applied to the dummy optical modulator_A 127 and the waveform of the voltage applied to the dummy optical modulator_B 128 at a rising edge of the comparison timing signal. The rising edge of a comparison timing signal alternately indicates the time $T_1$ and the time $T_2$. At time $T_1$, the voltage of the shift signal converges to a constant level after the spike on the plus side. At the time $T_2$, the voltage of the shift signal converges to a constant level after the spike on the minus side. The comparator 122 compares the two voltage waveforms input at the time $T_1(n-1)$ and the time $T_2(n-1)$ for a (n−1)-th input signal, and compares the two voltage waveforms input at the time $T_1(n)$ and the time $T_2(n)$ for a n-th input signal. A comparison result is supplied to a control circuit that controls the current value of the frequency characteristic adjustment circuit 10 (or any of 10A to 10G). The control circuit will be described later.

Figure 26:
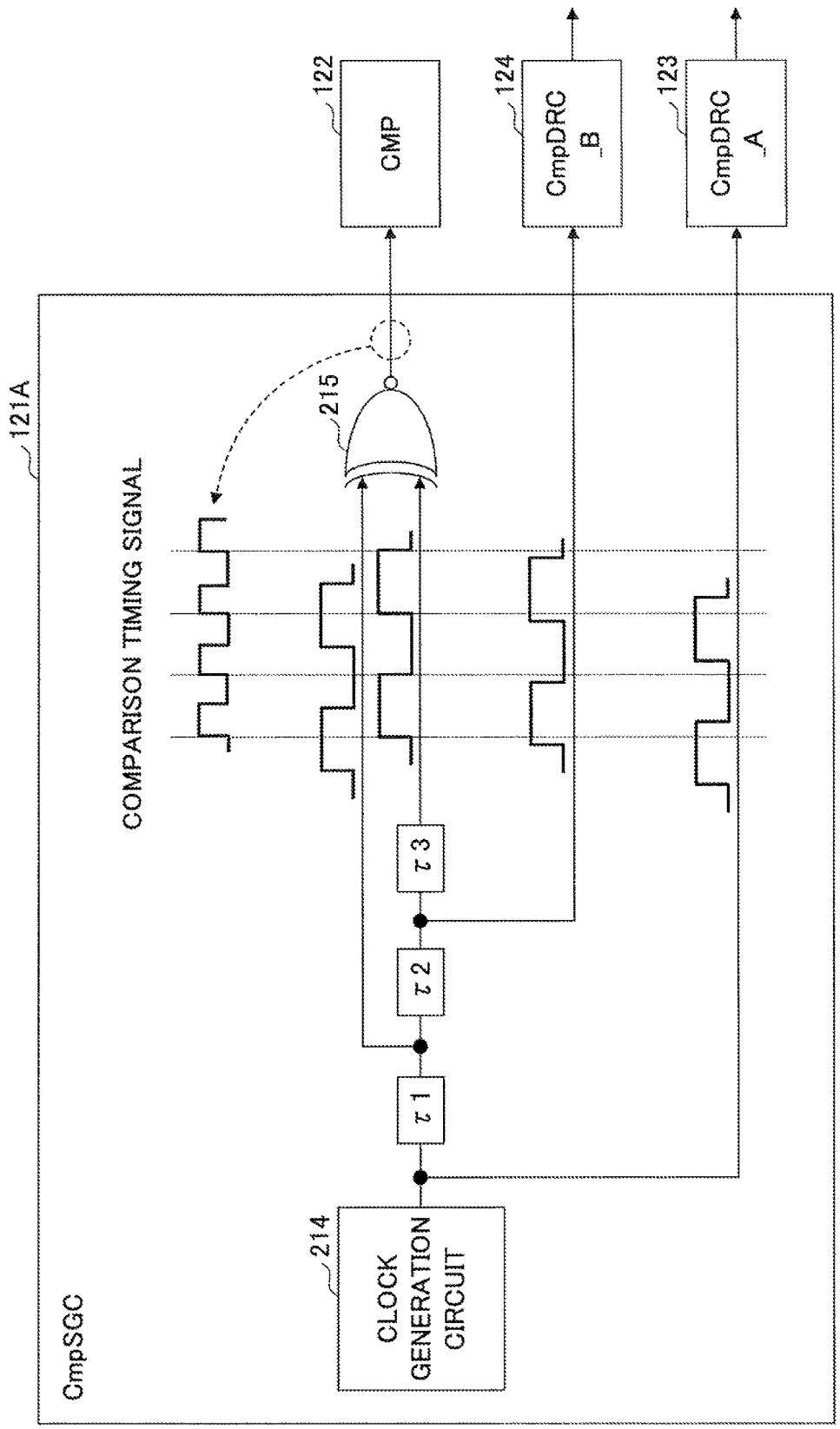
FIG. 26 is a diagram illustrating a configuration of a comparison signal generation circuit used in the circuit of FIG. 25.

FIG. 26 is a diagram illustrating a configuration of a comparison signal generation circuit (CmpSGC) 121A as an example of the comparison signal generation circuit 121. The comparison signal generating circuit 121A forms the comparison drive signal (the reference signal and the shift signal), and creates the comparison timing signal from these drive signals. An output of a clock generation circuit 214 is input to the comparison drive circuit_A 123 as a reference signal. An output of the clock generation circuit 214 is delayed by delay circuits τ1 and τ2 to generate a shift signal, and the shift signal is input to the comparison drive circuit_B 124. A signal obtained by delaying the reference signal by the delay circuit τ1 and a signal obtained by delaying the shift signal by the delay circuit τ3 are input to a negative exclusive OR (XNOR) circuit 215, and thus, the comparison timing signal is generated. The comparison timing signal is supplied to the comparator 122. With this configuration, it is possible to compare the two voltage waveforms at a rising timing of the comparison timing signal.

Figure 27:
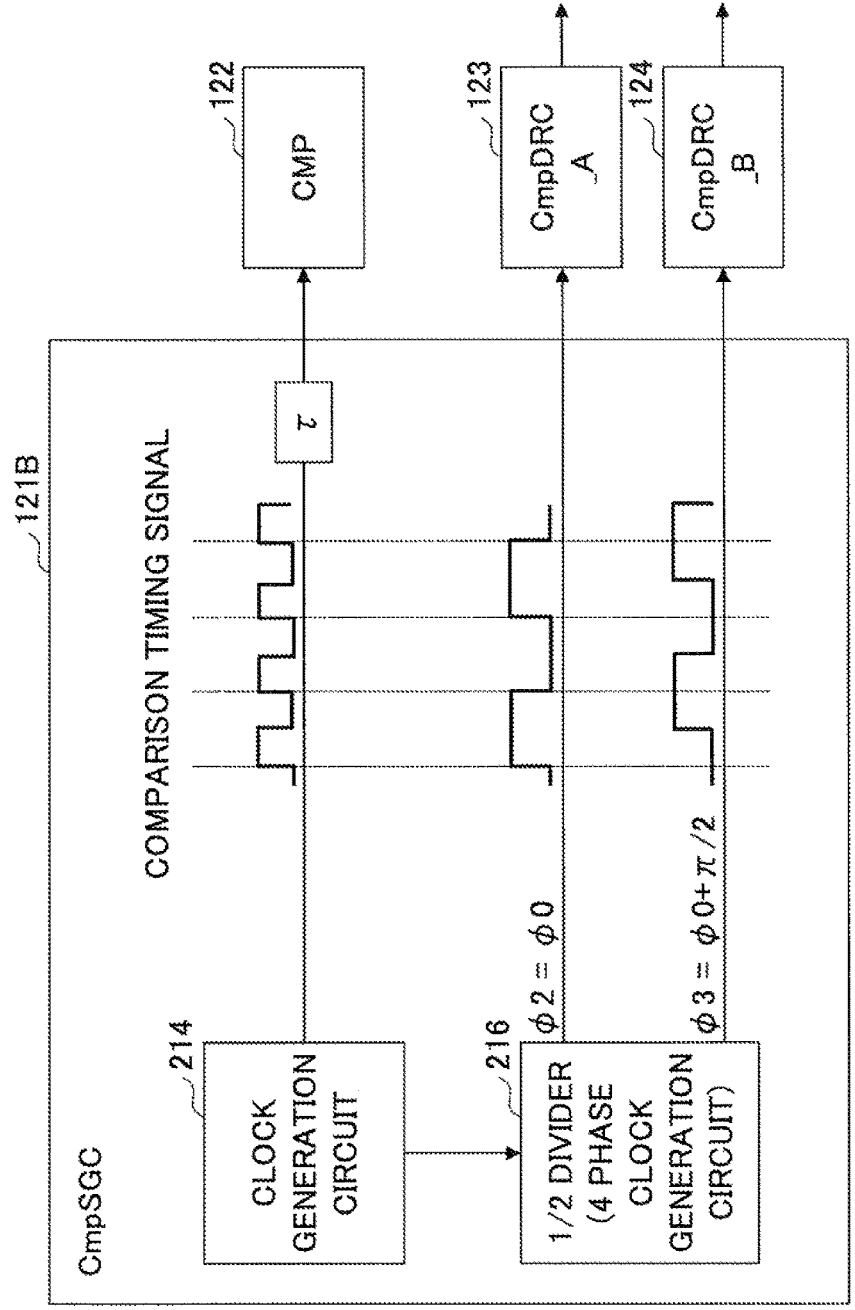
FIG. 27 is a diagram illustrating the configuration of the comparison signal generation circuit used in the circuit of FIG. 25.

FIG. 27 is a diagram illustrating a configuration of a comparison signal generation circuit (CmpSGC) 121B as another example of the comparison signal generation circuit 121. In the comparison signal generation circuit 121B, the comparison timing signal supplied to the comparator 122 is formed, and based on the comparison timing signal, comparison drive signals (the reference signal and the shift signal) are generated. The output of the clock generation circuit 214 is supplied to the comparator 122 as the comparison timing signal. In order to make a timing of the comparison timing signal appropriate, a delay τ may be added, but the delay τ is not indispensable.

A ½ frequency divider 216 generates a reference signal ($\varphi2=\varphi0$) synchronized with the rising edge of a clock signal and a shift signal ($\varphi3=\varphi0+\pi/2$) synchronized with a falling edge of the clock signal, based on a clock signal output from the clock generation circuit 214. The reference signal is supplied to the comparison drive circuit_A 123, and the shift signal is supplied to the comparison drive circuit_B 124.

Also, in a configuration of FIG. 27, it is possible to compare the two voltage waveforms at the rising timing of the comparison timing signal.

Figure 28:
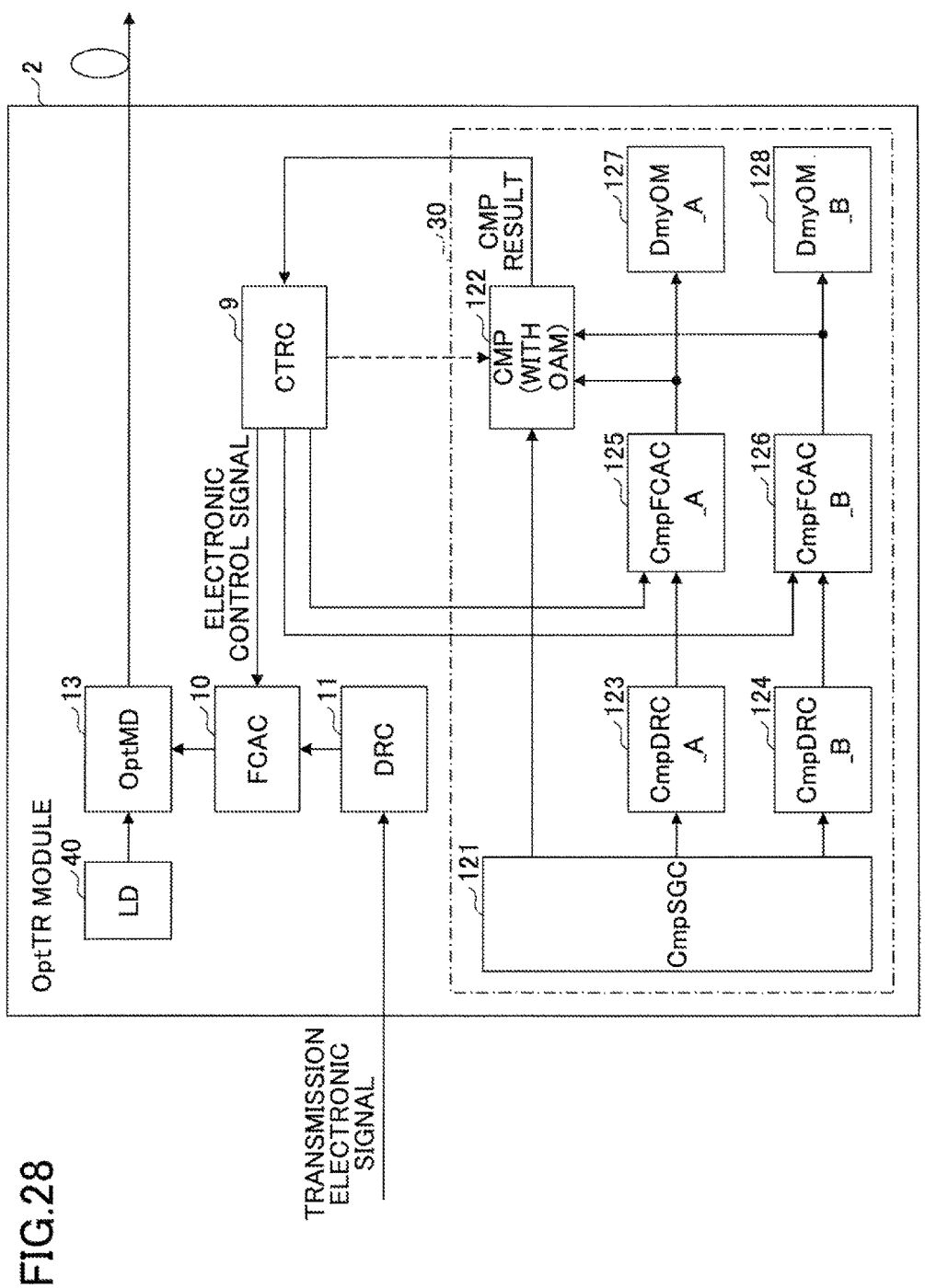
FIG. 28 is a diagram illustrating a configuration example of an optical transmission module using the frequency characteristic adjustment circuit and a current condition monitoring circuit.

FIG. 28 is a diagram illustrating a configuration example of an optical transmission module (OptTR MODULE) 2 having the frequency characteristic adjustment circuit (FCAC) 10 and the current condition monitoring circuit 30. The optical transmission module 2 includes a light source 40, an optical modulator 13 which is an example of the optical circuit element, a drive circuit 11, a frequency characteristic adjustment circuit 10, a control circuit (CTRC) 9, and a current condition monitoring circuit 30. An input electronic signal representing transmission data is converted into a high-speed drive signal by the drive circuit 11 and input to the optical modulator 13. Light incident on the optical modulator 13 from the light source 40 is modulated by a drive signal, and a modulated optical signal is output. The frequency characteristic adjustment circuit 10, which is inserted between the drive circuit 11 and the optical modulator 13, supplies the current $I_2$ or the current $I_2$ to the optical modulator 13 in response to the voltage level of the drive signal. Therefore, the optical modulator 13 modulates flat frequency characteristics in which a jitter of a data dependency is controlled.

The current value supplied from the frequency characteristic adjustment circuit 10 to the optical modulator 13 is controlled by the control circuit 9 based on the output of the current condition monitoring circuit 30. A configuration and an operation of the current condition monitoring circuit 30 are the same as those described with reference to FIG. 25. The control circuit 9 also controls the current values of the comparison frequency characteristic adjustment circuit_A 125 and the comparison frequency characteristic adjustment circuit_B 126 for comparison of the current condition monitoring circuit 30 in the same manner as the frequency characteristic adjustment circuit 10, based on the comparison result of the current condition monitoring circuit 30. In a case of using a comparator with an offset adjustment mechanism (CMP with OAM) as the comparator 122, the control circuit 9 may generate an offset adjustment signal based on the output of the comparator 122, and may supply the offset adjustment signal to the comparator 122. A known circuit configuration as a comparator with an offset adjusting mechanism may be applied.

Figure 29:
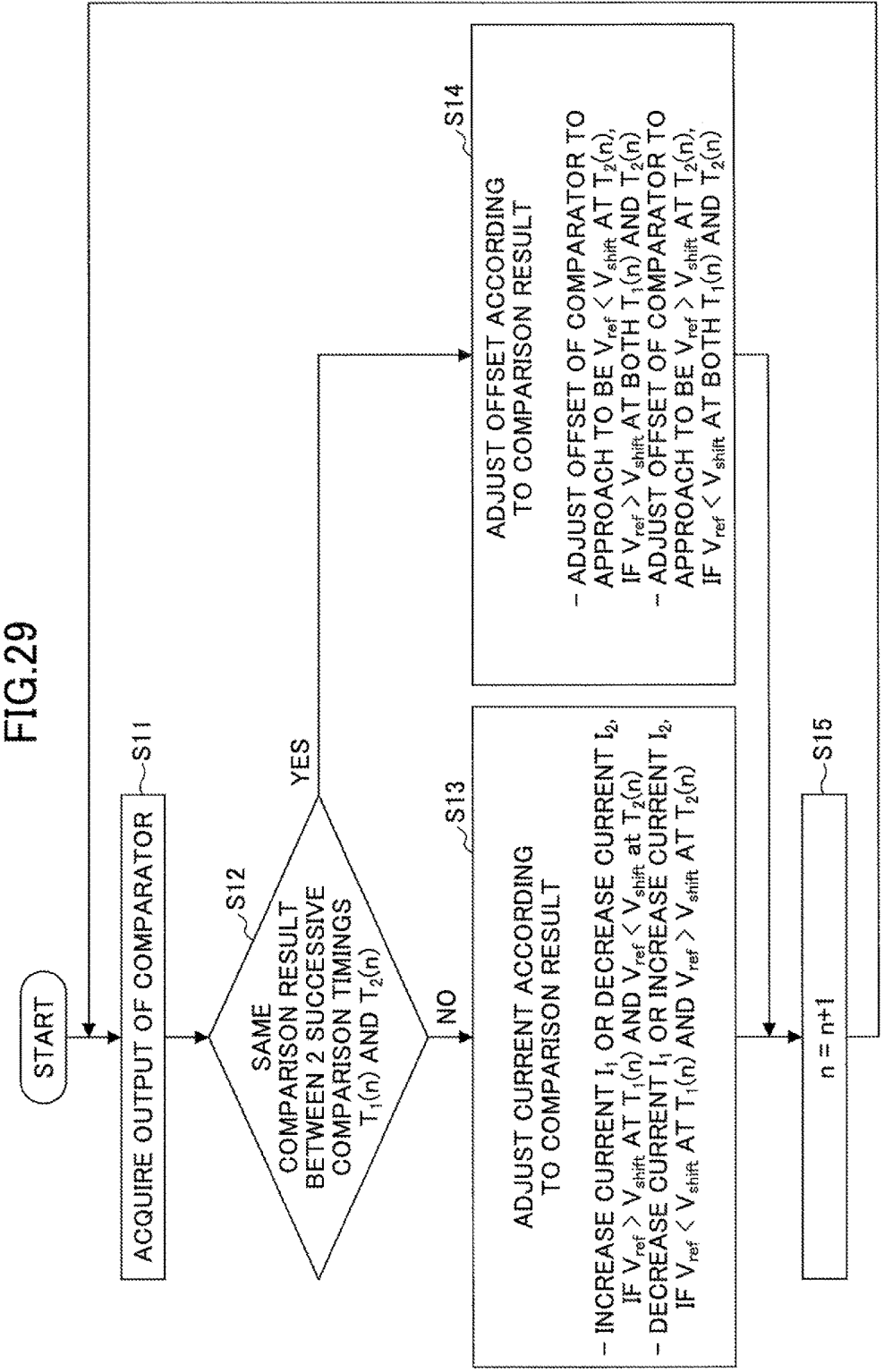
FIG. 29 is a diagram for explaining a control flow conducted by the control circuit.

FIG. 29 is a diagram illustrating a control flow conducted by the control circuit 9. Since this control flow is repeatedly performed during an operation of the optical transmission module 2, a loop is formed. The control circuit 9 acquires the comparison result from the comparator 122 every time the drive signal for driving the optical modulator 13 changes (step S11). It is determined whether the comparison results at two consecutive comparison timings $T_1(n)$ and $T_2(n)$ are the same as each other in the n-th (n is a positive integer) switching signal (an alternating signal of "0" and "1") (step S12). If the comparison results are different, it is considered that an effect of the input offset is within an allowable range, and the current value of the frequency characteristic adjustment circuit (FCAC) 10 is adjusted according to the comparison result (step S13). The voltage of the reference signal applied to the dummy optical modulator_A 127 is denoted by Vref, and the voltage of the shift signal applied to the dummy optical modulator_B 128 is denoted by Vshift. In a case in which Vref>Vshift at the time $T_1(n)$ and Vref<Vshift at the time $T_2(n)$, the current $I_1$ of the frequency characteristic adjustment circuit 10 is increased, or the current $I_2$ is controlled to be decreased. In a case in which Vref<Vshift at the time $T_1(n)$ and Vref>Vshift at the time $T_2(n)$, the current $I_1$ of the frequency characteristic adjustment circuit 10 is decreased, or the current $I_2$ is controlled to be increased.

When the comparison results are the same at the comparison timings $T_1(n)$ and $T_2(n)$ (YES at step S12), it is considered that the input offset exceeds the allowable range, and the offset of the comparator 122 is adjusted according to the comparison result (step S14). More specifically, if both the times $T_1(n)$ and $T_2(n)$ are Vref>Vshift, the offset voltage of the comparator 122 is controlled in the direction of Vref<Vshift at the time $T_2(n)$. If Vre<Vshift at both times $T_1(n)$ and $T_2(n)$, the offset voltage of the comparator 122 is controlled in the direction of Vref>Vshift at the time $T_2(n)$.

When the adjustment in step S13 or S14 is completed, n is incremented and the process returns to step S11. The output of the comparator 122 is obtained at a timing (n+1) of switching to a next input signal value. By this control method, a continuous beam output from the light source 40 undergoes a flat modulation in the frequency characteristic in the optical modulator 13. Hence, it is possible to realize high-speed operation without causing data-dependent jitter.

<Application to Optical Transceiver>

Figure 30:
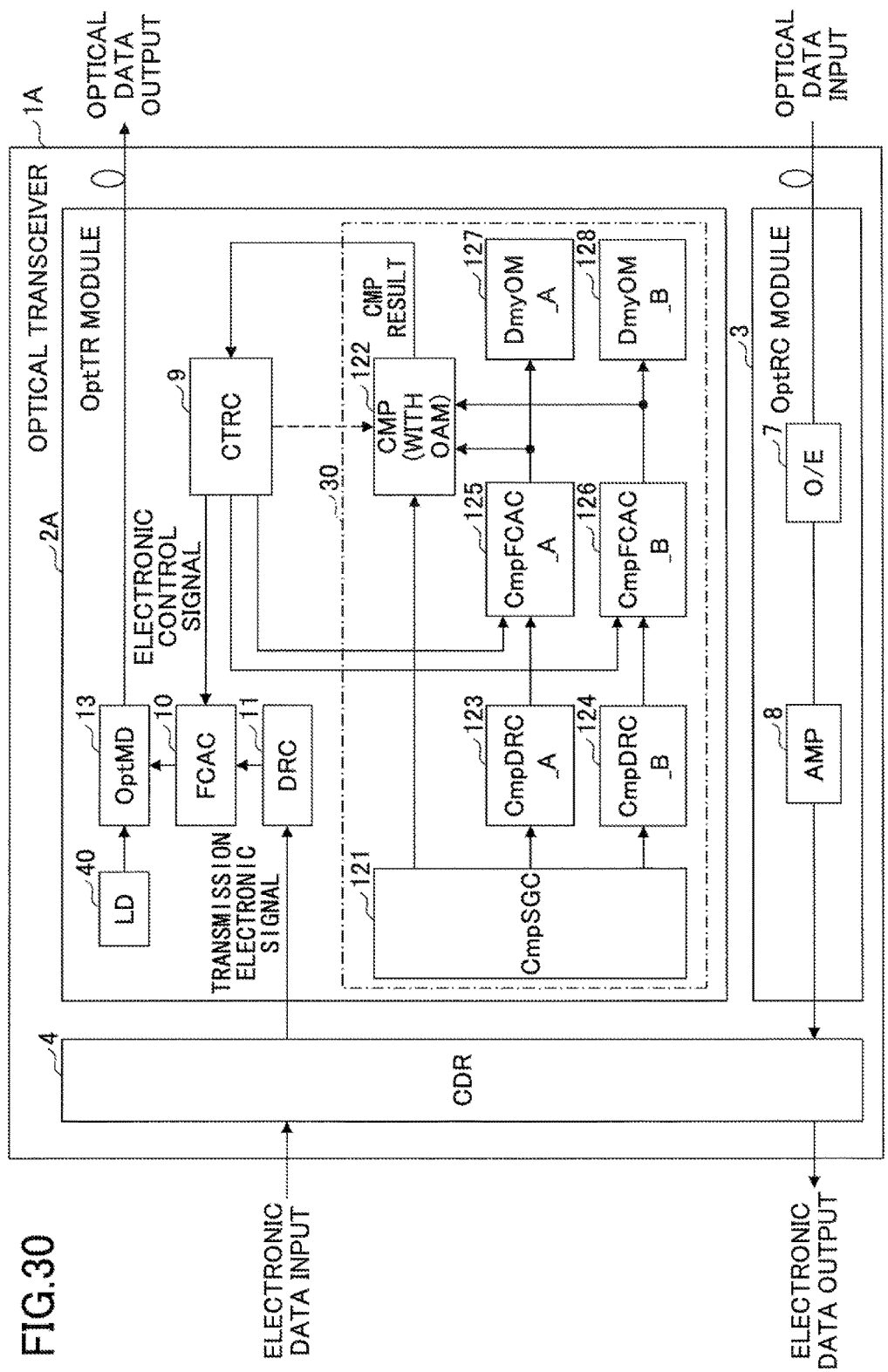
FIG. 30 is a schematic block diagram illustrating an optical transceiver using an optical transmission module having the frequency characteristic adjustment circuit and the current condition monitoring circuit.

FIG. 30 is a schematic diagram illustrating an optical transmission module (OptTR MODULE) 2A, to which the frequency characteristic adjustment circuit 10 according to any of the above described embodiments is applied, and an optical transceiver 1A using the optical transmission module 2A.

The optical transceiver 1A includes the optical transmission module 2A, an optical reception module (OptRC MODULE) 3, and a clock data recovery (CDR) 4. The optical transmission module 2A includes the configuration described with reference to FIG. 28. Based on the output of the current condition monitoring circuit 30, the control circuit 9 adjusts the current $I_1$ and the current $I_2$ supplied from the frequency characteristic adjustment circuit 10 to the optical modulator 13. The current condition monitoring circuit 30 includes the configuration and the operation described with reference to FIG. 25.

An optical receiver module 3 includes an optical/electric (O/E) converting unit 7 having a light receiving element such as a photodiode (PD) and an amplifier (AMP) 8. The amplifier (AMP) 8 includes, for instance, a transimpedance amplifier (TIA) that converts a current output from the PD to a voltage, and a linear amplifier that amplifies the output of the TIA to a voltage level suitable for the CDR.

A data signal input from an external signal processing circuit such as a DSP (digital signal processor) is waveform-shaped by the CDR 4, and is input to the drive circuit 11. The drive circuit 11 generates a high-speed drive signal based on the input data, and inputs the drive signal to the optical modulator 13. The optical modulator 13 modulates light from the LD 40 with a drive signal, and outputs an optical signal.

A frequency characteristic adjustment circuit (FCAC) 10, which is disposed between the drive circuit 11 and the optical modulator 13, includes a capacitor 12 and a current supply circuit 14 (refer to FIG. 6), and supplies an adjustment current $I_1$ or $I_2$ to the optical modulator 13 in response to the drive signal level. By inserting the frequency characteristic adjustment circuit 10, the operating bandwidth is expanded, and the function of the equalizing circuit is realized without generating additional power supply voltage or negative voltage. Moreover, by switching the amount of the current supplied to the optical modulator 13 in accordance with the input data, the nonlinearity of the charge-voltage characteristic or the capacitance-voltage characteristic of the optical modulator 13 is compensated.

Accordingly, it is possible to obtain preferable response characteristics even in a case of driving at high speed with the low voltage. As a result from controlling the characteristic fluctuation from the medium frequency to the high frequency, there is also an effect in which intersymbol interference is reduced.

The value of the current, which is supplied from the frequency characteristic adjustment circuit 10 to the optical modulator 13, is controlled by the control circuit 9 in accordance with the control flow depicted in FIG. 29 based on the output of the current condition monitoring circuit 30. By performing the current control in accordance with the control flow depicted in FIG. 29, it is possible to adjust the values of the currents $I_2$ and $I_2$ supplied from the frequency characteristic adjustment circuit 10 to the optical modulator 13 so that the condition of the equations (4) to (6) is satisfied. Alternatively, by applying a configuration which will be described later, it is possible to control values of currents $I_{M1}$, $I_{L1}$, $I_{M2}$, and $I_{L2}$ supplied from the frequency characteristic adjustment circuit 10 to the optical circuit element such as the optical modulator so that the equations (7) to (11) are satisfied, or to control values of currents $I_{00}$, $I_{01}$, $I_{10}$, and $I_{11}$ from the frequency characteristic adjustment circuit 10 to the optical circuit element such as the optical modulator so that the equations (12) to (16) are satisfied. In a case of using the configuration in the seventh embodiment, the control signals $S_2$ to $S_m$ are also supplied from the control circuit 9 to the frequency characteristic adjustment circuit 10. This configuration contributes to realize the designed bandwidth characteristic.

At a receiver side, a received optical signal is converted into an electronic signal, is amplified to an appropriate level, and then, is input to the CDR 4. The CDR 4 identifies and reproduces the data from a received signal, and outputs the data signal to the digital signal processor.

The light source 40, the optical modulator 13, and the dummy optical modulators 127 and 128 may be formed on one chip by silicon photonics technology. The drive circuit 11, the comparison drive circuits 123 and 124, the frequency characteristic adjustment circuit 10, and the comparison frequency characteristic adjustment circuits 125 and 126 may be formed on one integrated circuit (IC) chip. Since a temperature control of the optical transmission module 2 and a control of a drive current of the LD 40 are not directly related to the above described embodiments, these control sections are not illustrated and are omitted.

Figure 31:
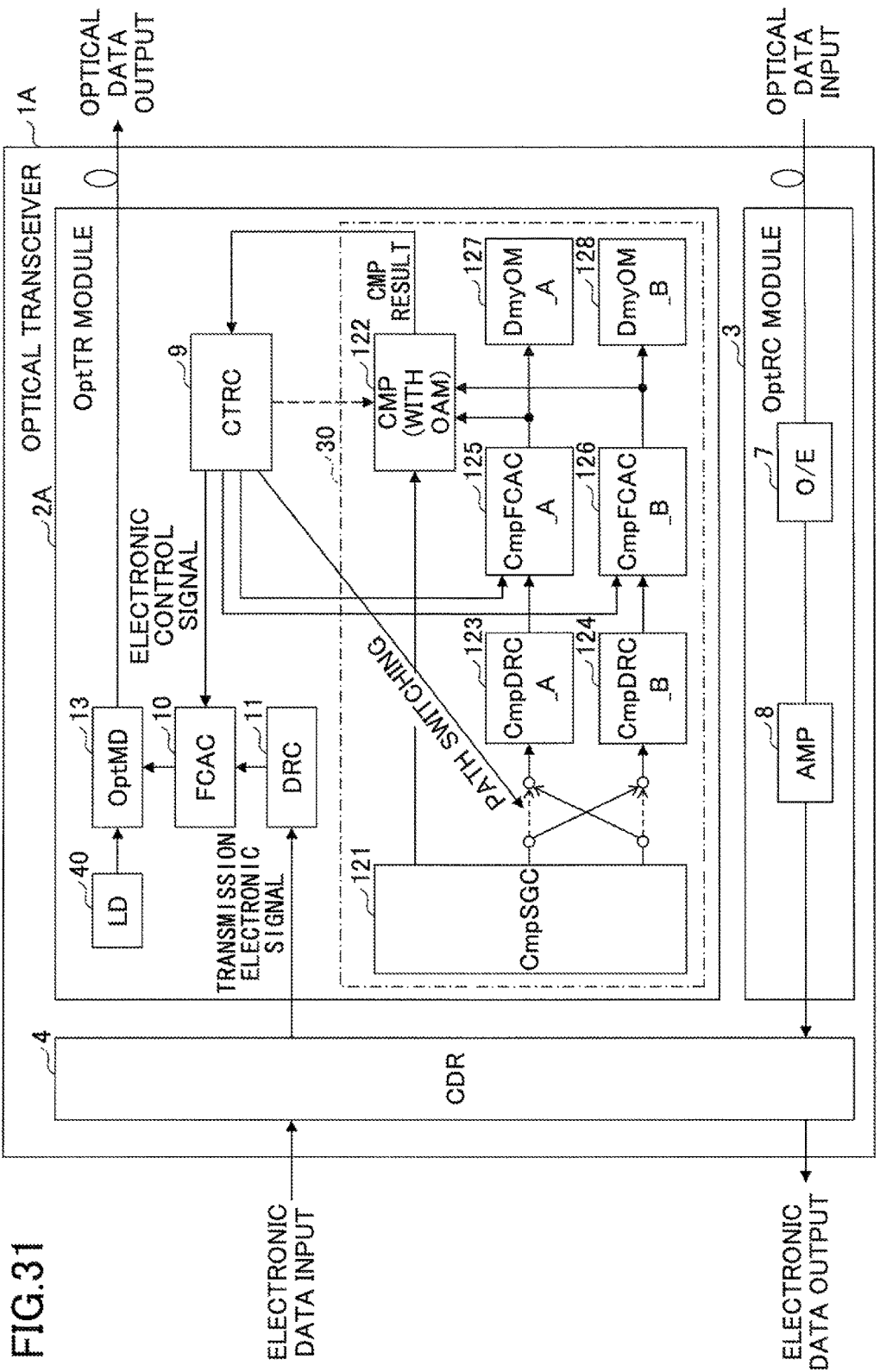
FIG. 31 is a diagram illustrating countermeasures for controlling variations in an optical transceiver 1A in FIG. 30.

FIG. 31 is a diagram illustrating countermeasures for controlling variations in the optical transceiver 1A in FIG. 30. In a case in which there is a variation between the dummy optical modulators 127 and 128 of the optical transmission module 2A, the signals (the reference signal and the shift signal) being input to the comparison drive circuits 123 and 124 from the comparison signal generation circuit 121 may be switched, and an average of the current adjustment values before and after switching may be acquired. By this control, it is possible to correspond to a manufacturing variation between the dummy optical modulators 127 and 128, and the like.

Figure 32:
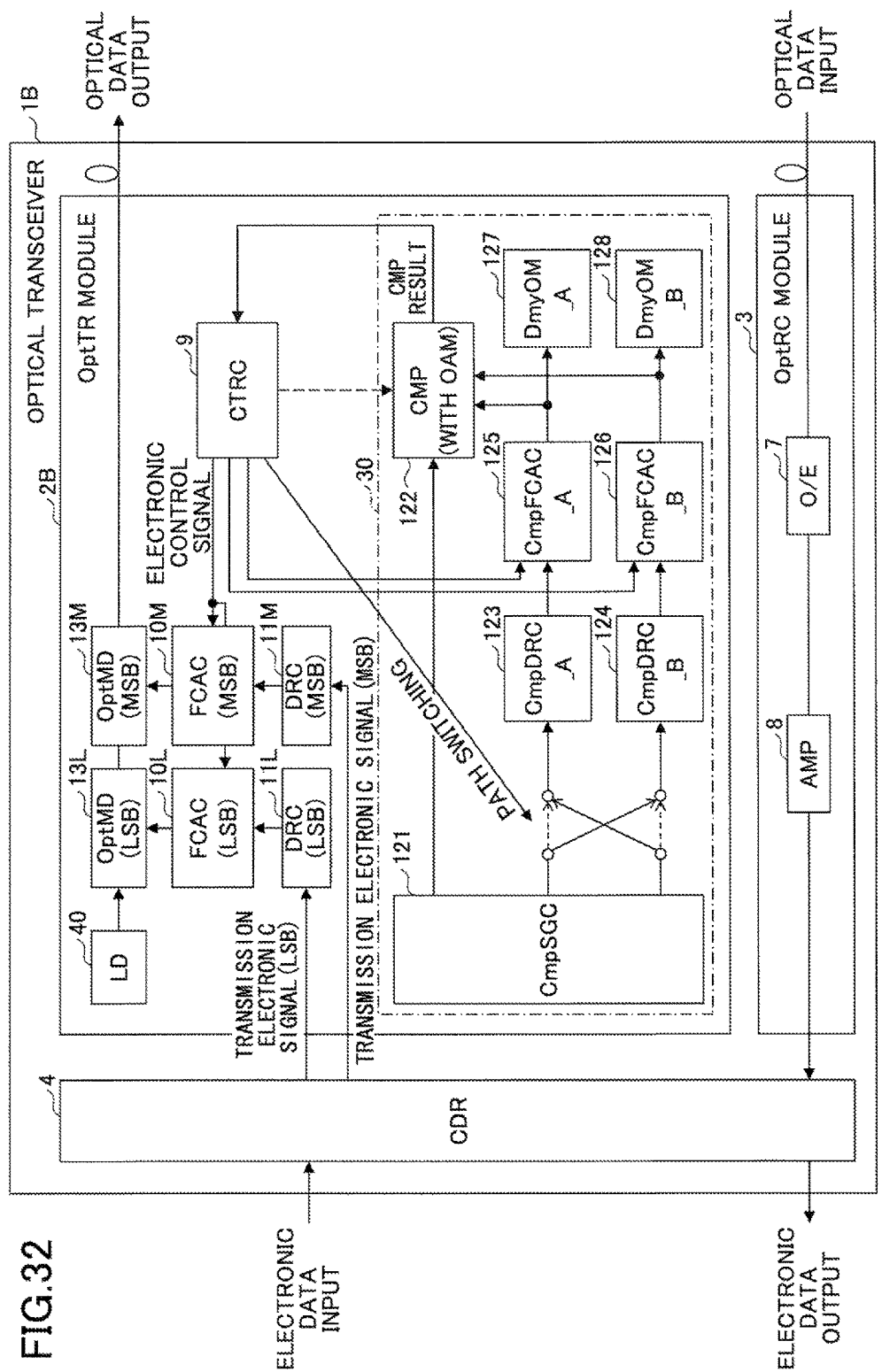
FIG. 32 is a schematic block diagram illustrating a PAM 4 optical transceiver using the optical transmission module in the embodiments.

FIG. 32 illustrates an optical transceiver 1B as a variation of the optical transceiver. The optical transceiver 1B is a Power Amplitude Modulation-4 (PAM 4: 4-level pulse amplitude modulation) type optical transceiver, which transmits 2 bits by one modulation. Similar to the fourth embodiment (FIG. 15), the optical transceiver 1B may be applied to a configuration in which the signal electrodes divided into the respective optical waveguides of the MZ type optical modulator are arranged, and the lower bit (LSB) and an upper bit are individually modulated.

The optical transmission module 2B of the optical transceiver 1B includes a drive circuit 11L for the LSB and a drive circuit 11M for the MSB. The electronic signal representing the lower order bit and the electronic signal representing the upper order bit are input to the drive circuit 11L and the drive circuit 11M, respectively. A frequency characteristic adjustment circuit (FCAC) 10L supplies the current $I_1$ or $I_2$ to the optical modulator 13L for LSB modulation in response to the level of the driving voltage supplied from the drive circuit 11L. A frequency characteristic adjustment circuit (FCAC) 10M supplies the current $I_1$ or $I_2$ to an optical modulator 13M for a MSB modulation in response to the level of the driving voltage supplied from the drive circuit 11M. The beam output from the light source 40 is modulated by the optical modulator 13L and the optical modulator 13M, and a 4-bit modulated optical signal is generated and is output.

The control circuit 9 controls the current values $I_{M1}$ and $I_{M2}$ supplied from the frequency characteristic adjustment circuit 10M to the optical modulator 13M, and the currents $I_{L1}$ and $I_{L2}$ supplied from the frequency characteristic adjustment circuit 10L to the optical modulator 13L, based on the output of the current condition monitoring circuit 30. When the comparator 122 is equipped with an offset adjusting mechanism, the input offset of the comparator 122 may be feedback-adjusted. Similar to FIG. 31, the control circuit 9 may switch the signals supplied to the comparison drive circuits 123 and 124 to reduce variations between the dummy optical modulators 127 and 128.

Figure 33:
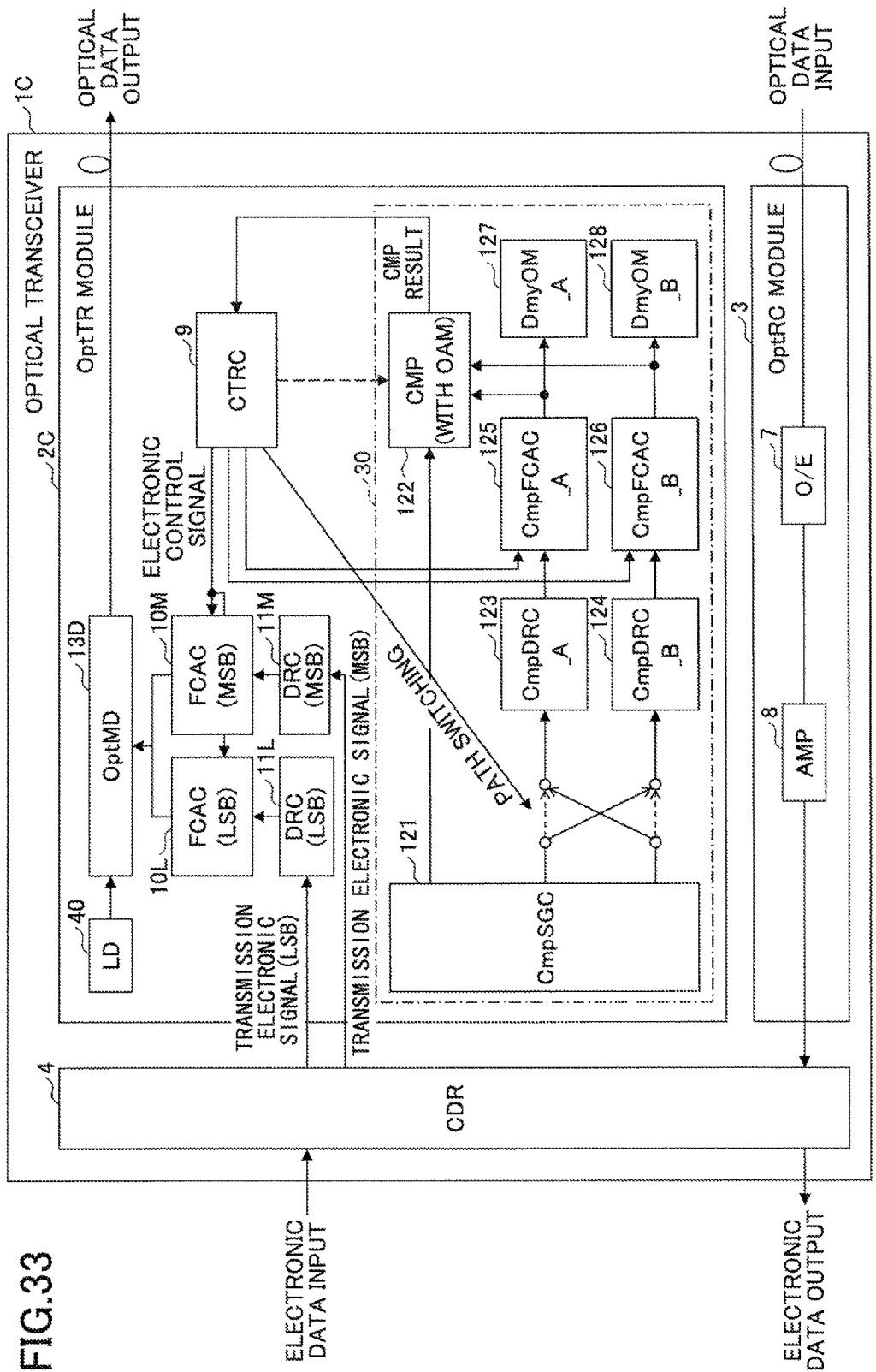
FIG. 33 is a schematic block diagram illustrating another configuration of the PAM 4 optical transceiver using the optical transmission module in the embodiments.

FIG. 33 is a diagram illustrating an optical transceiver 1C, which is another example of the PAM 4 optical transceiver. As described in the fifth embodiment (FIG. 16) or the sixth embodiment (FIG. 17), the optical transceiver 1C generates the 2-bit modulated signal by the PAM 4 modulation method by disposing a pair of signal electrodes in the MZ type optical modulator. The drive circuits 11L and 11M are disposed for the lower bit LSB and the upper bit MSB, respectively, and the frequency characteristic adjustment circuits 10L and 10M are provided for the drive circuits 11L and 11M, respectively. The frequency characteristic adjustment circuits 10L and 10M realize the optical modulation with the flat frequency characteristics by supplying the current value corresponding to the level of the driving voltage with respect to the optical modulation of the corresponding bit.

The control circuit 9 controls the current values $I_{M1}$ and $I_{M2}$ supplied from the frequency characteristic adjustment circuit 10M to the optical modulator 13M, and the currents $I_{L1}$ and $I_{L2}$ supplied from the frequency characteristic adjustment circuit 10L to the optical modulator 13L, based on the output of the current condition monitoring circuit 30. In a case in which the comparator 122 is equipped with an offset adjusting mechanism, the input offset of the comparator 122 may be feedback-adjusted. FIG. 31, the control circuit 9 may switch the signals supplied to the comparison drive circuits 123 and 124 to reduce the variations between the dummy optical modulators 127 and 128.

The configurations of FIG. 32 and FIG. 33 are also applied to the data modulation of 3 bits or more. In the case of a n-bit data modulation, n frequency characteristic adjustment circuits 10 are provided corresponding to the n drive circuits 11. In response to the input value ("0" or "1") of each bit, the current value to be supplied to the optical circuit element such as the optical modulator 13 or the like is controlled to adjust the frequency characteristic.

<First Variation of Current Control>

By the current control described above, the current $I_1$ or $I_2$ of an appropriate level is supplied from the frequency characteristic adjustment circuit 10 according to the input data value. However, the potential of the signal compared at the comparator 122 is small and may be 1 mV or less. Thus, a resolution in a sub mV may be preferable for an offset adjustment of the comparator 122. It may be possible to realize a sub-mV resolution by improving a functional configuration of the comparator 122; however, this is difficult. Therefore, as a variation of the current control, the difference between the signals for a comparison is amplified before the comparison.

Figure 34A:
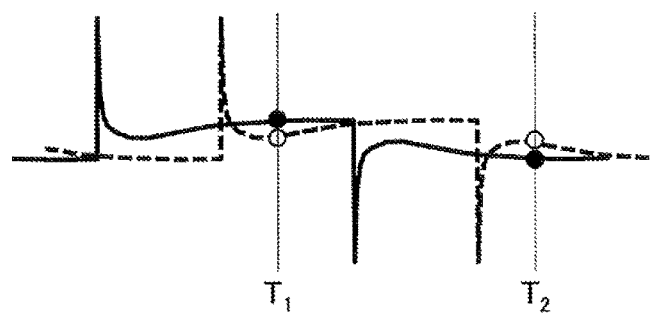
FIG. 34A through FIG. 34C are diagrams for explaining the principle of a first variation of the current control.
Figure 34B:
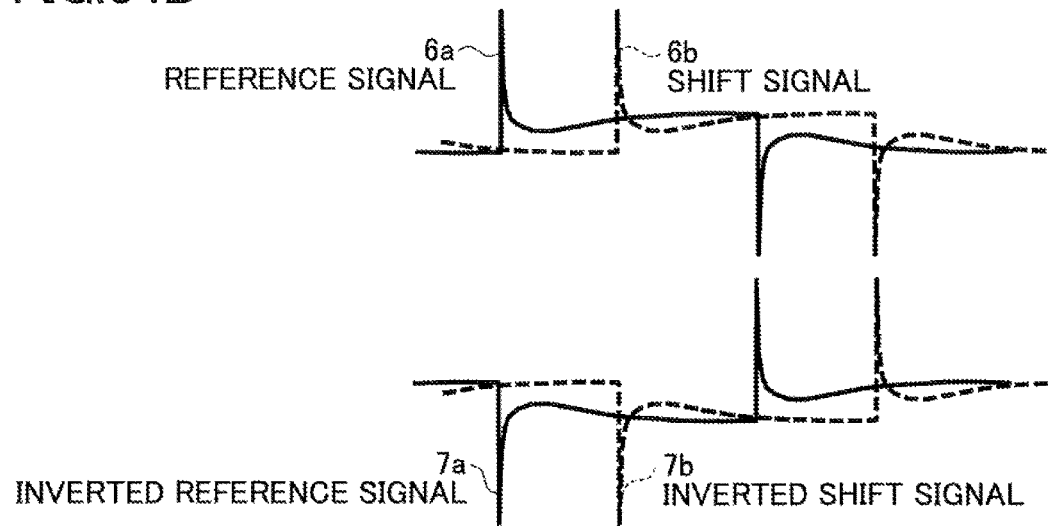
Figure 34C:
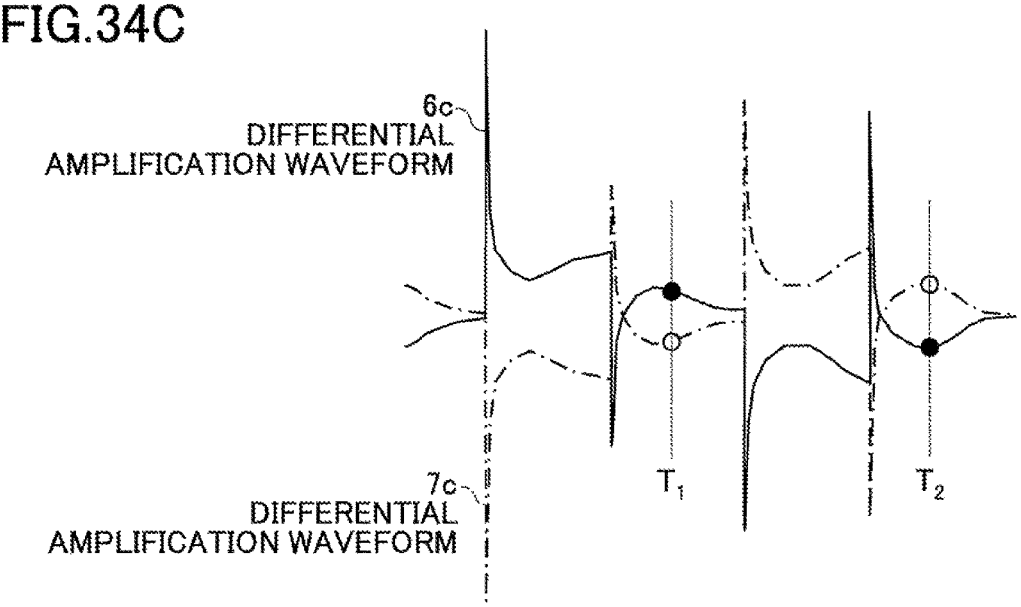

FIG. 34A through FIG. 34C are diagrams for explaining the principle of a first variation of the current control. As illustrated in FIG. 34A, when the waveforms outputted from the frequency characteristic adjustment circuit for the comparison in accordance with a reference signal 6a and a shift signal 6b are directly compared at the times $T_1$ and $T_2$, there may be a case in which the potential difference between the signals is small and a correct comparison result is not be obtained. In this case, a value of a black circle and a value of a white circle are directly compared at the times $T_1$ and $T_2$. Therefore, an inverted signal is generated as illustrated in FIG. 34B, and a differential amplification value of the voltage waveform of a non-inverted signal and the differential amplification value of the voltage waveform of the inverted signal are compared as illustrated in FIG. 34C.

In FIG. 34B, the inverted signal of the reference signal 6a and the inverted signal of the shift signal 6b are generated, and an output waveform from the frequency characteristic adjustment circuit for the comparison is obtained for each of the non-inverted signal and the inverted signal. In FIG. 34C, a thin solid line depicts a differential amplification waveform 6c, which is obtained by differentially amplifying the output of the frequency characteristic adjustment circuit for the comparison corresponding to the input of the reference signal 6a and the shift signal 6b. An alternately long and short dashed line is a differential amplification waveform 7c, which is obtained by differentially amplifying the output of the frequency characteristic adjustment circuit for the comparison corresponding to the input of an inverted reference signal 7a and an inverted shift signal 7b. Similar to FIG. 34A, the value of the black circle and the value of the white circle are directly compared at the times $T_1$ and $T_2$.

At times $T_1$ and $T_2$, if the non-inverted reference signal matches with a response waveform based on the shift signal, the differential amplification value becomes zero. Similarly, if the inverted reference signal 7a matches with the response waveform based on the inverted shift signal, the differential amplification value becomes zero. Hence, at times $T_1$ and $T_2$, the current value supplied from the frequency characteristic adjustment circuit is controlled so that the difference between the differential amplification value of the non-inverted signal and the differential amplification value of the inverted signal approaches zero. Since the differential amplification value of the non-inverted signal and the potential of the differential amplification value of the inverted signal are amplified, it is possible to improve the resolution and to perform the comparison with high accuracy.

When the reference signal is larger than the shift signal, the difference is amplified to a plus side, and when the reference signal is smaller than the shift signal, the difference is amplified to a minus side. When the inverted reference signal 7a is larger than the inverted shift signal, the difference is amplified to the plus side, and when the inverted reference signal 7a is smaller than the inverted shift signal, the difference is amplified to the minus side. Therefore, when the reference signal is larger than the shift signal, the comparison result, which is acquired by comparing the differential amplification value of the reference signal and the shift signal 6b with the differential amplification value of the inverted signal and the inverted shift signal, becomes positive. When the reference signal is smaller than the shift signal, the comparison result, which is acquired by comparing the differential amplification value of the reference signal and the shift signal 6b with the differential amplification value of the inverted signal and the inverted shift signal, is negative. Depending on a sign of the comparison result, it is possible to know a direction of the current control.

Figure 35:
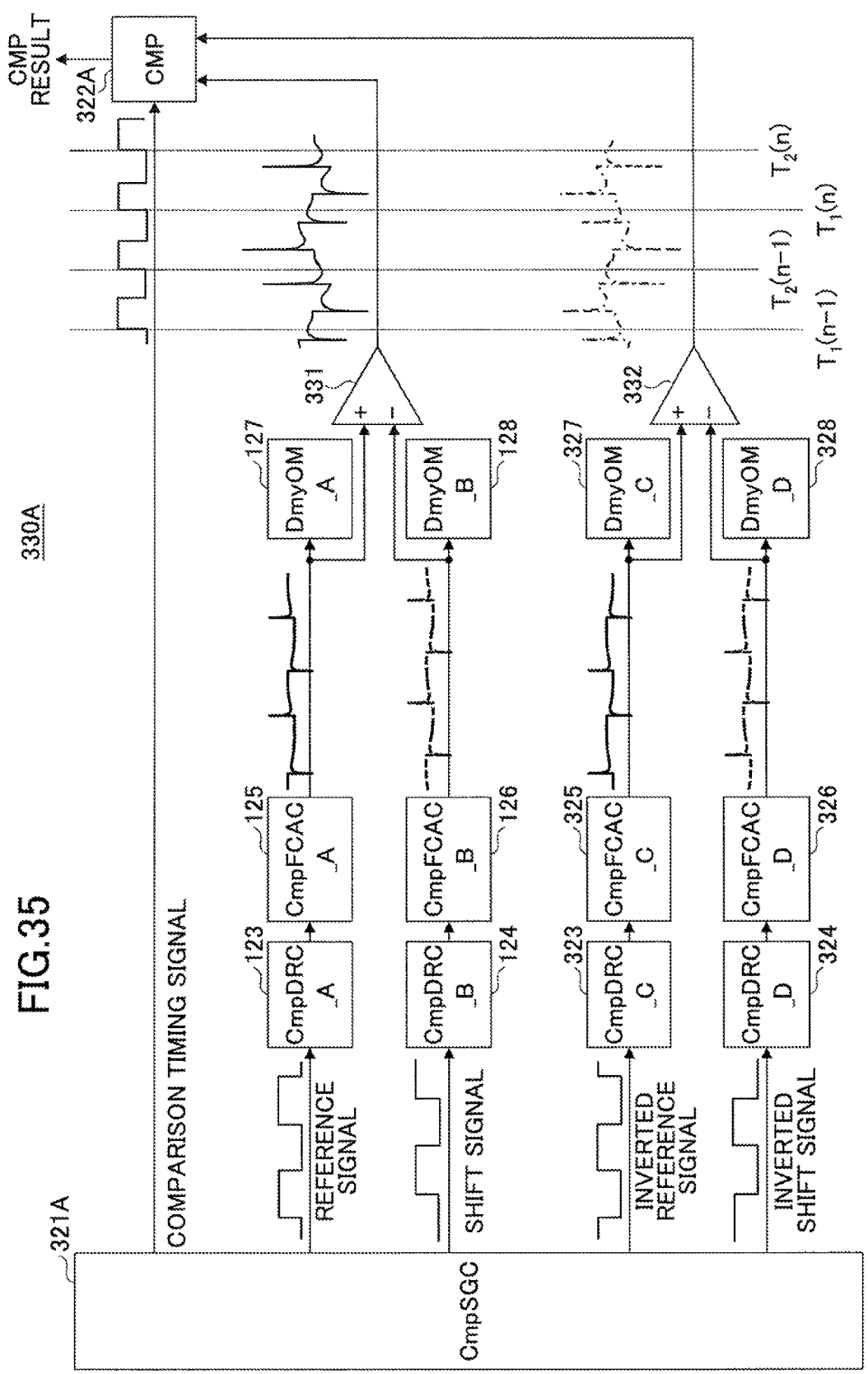
FIG. 35 is a diagram illustrating a configuration example of the current condition monitoring circuit of a first variation.

FIG. 35 is a schematic diagram illustrating a current condition monitoring circuit 330A which implements a principle depicted in FIG. 34. The current condition monitoring circuit 330A includes a comparison signal generating circuit (CmpSGC) 321A, a comparator (CMP) 322A, a comparison drive circuit_A (CmpDRC_A) 123, a comparison drive circuit_B (CmpDRC_B) 124, a comparison drive circuit_C (CmpDRC_C) 323, a comparison drive circuit_D (CmpDRC_D) 324, a comparison frequency characteristic adjustment circuit_A (CmpFCAC_A) 125, a comparison frequency characteristic adjustment circuit_B (CmpFCAC_B) 126, a comparison frequency characteristic adjustment circuit_C (CmpFCAC_C) 325, and a comparison frequency characteristic adjustment circuit_D (CmpFCAC_D) 326, and differential amplifiers 331 and 332. The comparison signal generation circuit 321A generates a reference signal and an inverted reference signal, which are synchronized with the data signal input to the optical modulation drive circuit 11, the shift signal and the inverted shift signal, which are obtained by shifting the reference signal and the inverted reference signal by the time τ, and the comparison timing signal. The shift signal rises after the reference signal rises, and the shift signal falls after the reference signal falls. The inverted shift signal falls after the inverted reference signal falls, and the inverted shift signal rises after the inverted reference signal rises.

The reference signal is input to the comparison drive circuit_A 123, and the comparison drive signal generated by the comparison drive circuit_A 123 is input to the comparison frequency characteristic adjustment circuit_A 125. The comparison frequency characteristic adjustment circuit_A 125 supplies the current $I_1$ or the current $I_2$ to the dummy optical modulator_A 127 in response to the voltage level of the comparison driving signal. The shift signal is input to the comparison drive circuit_B 124, and the drive signal generated by the comparison drive circuit_B 124 is input to the comparison frequency characteristic adjustment circuit_B 126. The comparison frequency characteristic adjustment circuit_B supplies the current $I_1$ or the current $I_2$ to the dummy optical modulator_B 128 in response to the voltage level of the comparison drive signal.

The inverted reference signal is input to the comparison drive circuit_C 323, and the comparison inversion drive signal generated by the comparison drive circuit_C 323 is input to the comparison frequency characteristic adjustment circuit_C 325. The comparison frequency characteristic adjustment circuit_C 325 supplies the current $I_1$ or the current $I_2$ to a dummy optical modulator_C (DmyOM_C) 327 in response to the voltage level of the comparison inversion drive signal. The inverted shift signal is input to the comparison drive circuit_D 324, and the inverted drive signal generated by the comparison drive circuit_D 324 is input to the comparison frequency characteristic adjustment circuit_D 326. The comparison frequency characteristic adjustment circuit_D 326 supplies the current $I_1$ or the current $I_2$ to the dummy optical modulator_D (DmyOM_D) 328 in response to the voltage level of the comparison inversion drive signal.

The comparison drive circuit_A 123, the comparison drive circuit_B 124, the comparison drive circuit_C 323, and the comparison drive circuit_D 324 have the same configuration as the drive circuit 11 used in the first embodiment to the seventh embodiment. The comparison frequency characteristic adjustment circuit_A 125, the comparison frequency characteristic adjustment circuit_B 126, the comparison frequency characteristic adjustment circuit_C 325, and the comparison frequency characteristic adjustment circuit_D 326 for comparison have the same configuration as the frequency characteristic adjustment circuit 10 (or any of 10A to 10G) used in the first embodiment to the seventh embodiment. The dummy optical modulator_A 127, the dummy optical modulator_B 128, the dummy optical modulator_C 327, and the dummy optical modulator_D 328 have the same configuration as the optical modulator 13 used in the first embodiment to the seventh embodiment.

The voltage waveform applied to the dummy optical modulator_A 127 is connected to a first input of a differential amplifier 331, and the voltage waveform applied to the dummy optical modulator_B 128 is connected to a second input of the differential amplifier 331. The differential amplification result from the differential amplifier 331 is input to the comparator 322A. The voltage waveform applied to the dummy optical modulator_C 327 is connected to the first input of a differential amplifier 332, and the voltage waveform applied to the dummy optical modulator_D 328 is connected to the second input of the differential amplifier 332. The differential amplification result is input from the differential amplifier 332 to the comparator 322A.

At the rising edge of the comparison timing signal, the comparator 322A compares the output waveform of the differential amplifier 331 with the output waveform of the differential amplifier 332. The rising edge of the comparison timing signal alternately indicates the time $T_1$ and the time $T_2$. The time $T_1$ is a time when the voltage of the shift signal converges to the constant level after a plus side spike of the non-inverted reference signal. The time $T_2$ is a time when the voltage of the shift signal converges to the constant level after the plus side spike of the non-inverted reference signal. The comparator 322A compares the two differential amplification waveforms input at the time $T_1(n-1)$ and the time $T_2(n-1)$ for the (n−1)-th input signal, and compares the nth input signal at the time $T_1(n)$ and the time $T_2(n)$. The comparison result is supplied to a control circuit that controls the current value of the frequency characteristic adjustment circuit 10 (or any of 10A to 10G). The control circuit performs the control operation described with reference to FIG. 29.

That is, in a case in which the signs of the comparison results of the two consecutive differential amplification values at times $T_1$ and $T_2$ are different from each other, the current value $I_1$ or $I_2$ is adjusted according to the comparison result. In a case in which the non-inverted differential amplification value is greater than the inverted differential amplification value at the time $T_1$ and the non-inverted differential amplification value is smaller than the inverted differential amplification value at the time $T_2$, the current $I_1$ is increased, or the current $I_2$ is decreased. In a case in which the non-inverted differential amplification value is smaller than the inverted differential amplification value at the time $T_1$ and the non-inverted differential amplification value is greater than the inverted differential amplification value at the time $T_2$, the current $I_1$ is decreased, or the current $I_2$ is increased.

In a case in which the signs of the comparison results of the two successive differential amplification values at times $T_1$ and $T_2$ are the same, the offset value of the comparator 322A is adjusted. In a case in which the differential amplification result of a non-inversion at both times $T_1$ and $T_2$ is greater than the result of the differential amplification of the inversion, the offset of the comparator 322A is adjusted in a direction in which a non-inverted differential amplification result becomes smaller than an inverted differential amplification result at the time $T_2$. In a case in which the differential amplification result of the non-inversion at times $T_1$ and $T_2$ is smaller than the result of differential amplification of inversion, the offset of the comparator 322A is adjusted in a direction in which the non-inverted differential amplification result becomes greater than the inverted differential amplification result at the time $T_2$.

Figure 36:
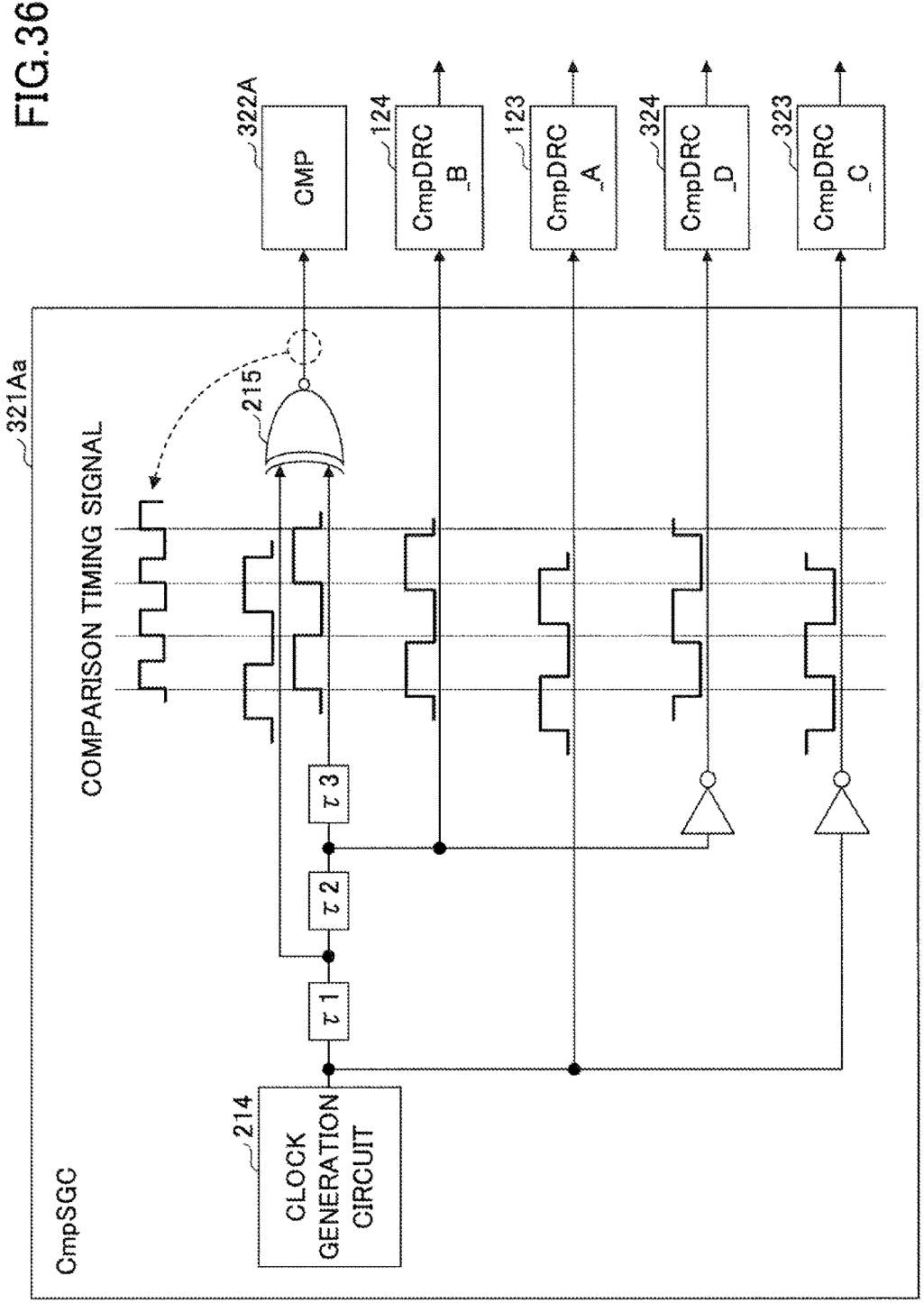
FIG. 36 is a diagram illustrating a configuration example of a comparison signal generation circuit used in the first variation.

FIG. 36 is a diagram illustrating the configuration of a comparison signal generation circuit (CmpSGC) 321Aa as an example of the comparison signal generation circuit 321A. The comparison signal generating circuit 321Aa first produces comparison drive signals (corresponding to the reference signal and the shift signal), and generates the comparison timing signal and inverted drive signals (corresponding to the inverted reference signal and the inverted shift signal) from these drive signals. The output of the clock generation circuit 214 is input to the comparison drive circuit A as the reference signal, and its inverted signal is input to the comparison drive circuit C. With respect to the above, the output of the clock generation circuit 214 is delayed by the delay circuits τ1 and τ2 to generate the shift signal and its inverted signal. The shift signal is input to the comparison drive circuit_B 124, and the inverted shift signal is input to the comparison drive circuit_D 324. A signal obtained by delaying the reference signal by the delay circuit τ1 and a signal obtained by delaying the shift signal by the delay circuit τ3 are input to a negative exclusive OR (XNOR) circuit 215, and the comparison timing signal is generated. The comparison timing signal is supplied to the comparator 322A. By this configuration, it is possible to compare the two differential amplified waveforms at the rising timing of the comparison timing signal.

Figure 37:
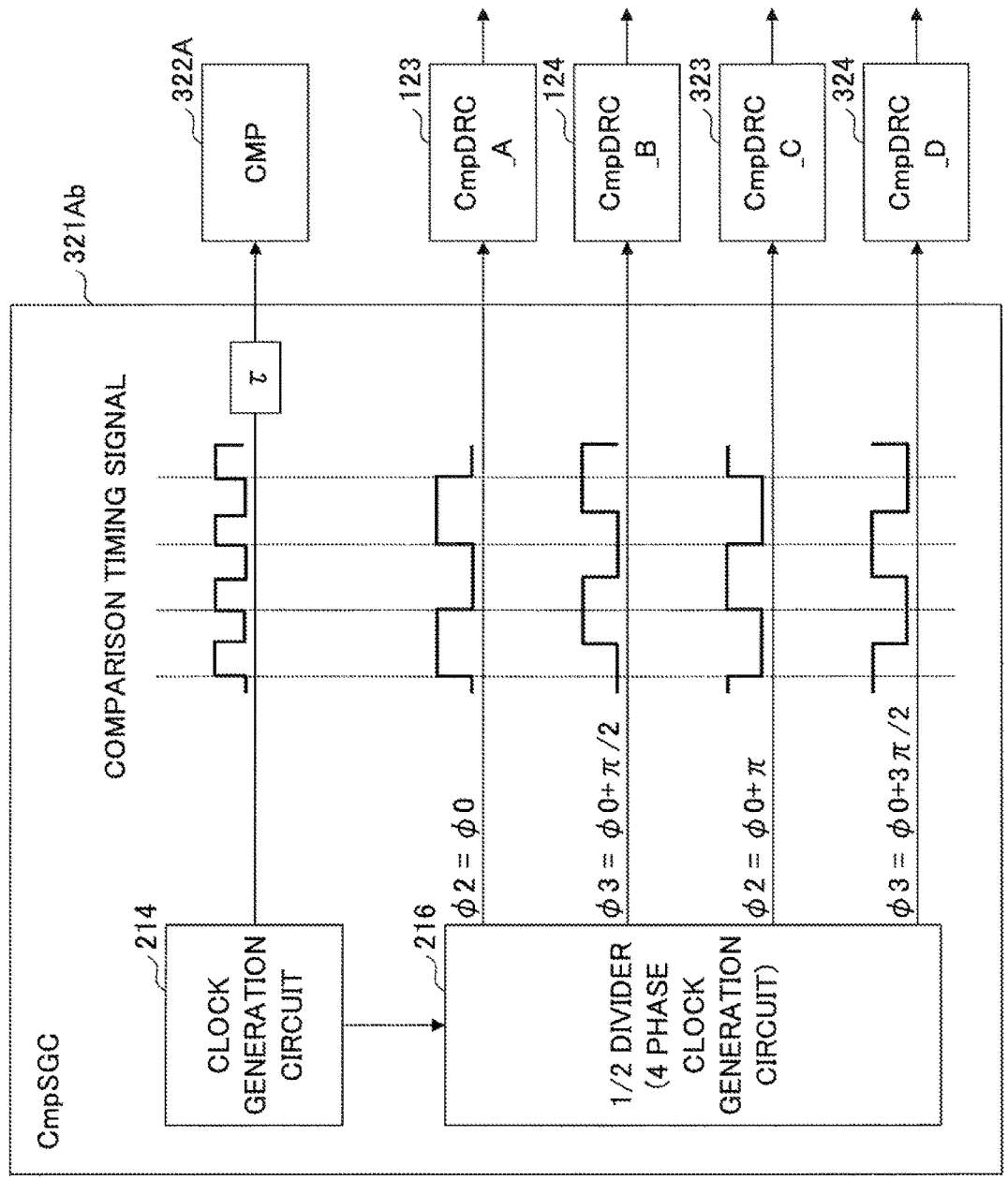
FIG. 37 is a diagram illustrating another configuration example of the comparison signal generating circuit used in the first variation.

FIG. 37 is a diagram illustrating a configuration of a comparison signal generation circuit (CmpSGC) 321Ab as another example of the comparison signal generation circuit 321A. In the comparison signal generating circuit 321Ab, first, the comparison timing signal supplied to the comparator 322A is created. The comparison signal generation circuit 321Ab generates comparison drive signals (corresponding to the reference signal, the shift signal, the inverted reference signal, and the inverted shift signal) based on the comparison timing signal. The output of the clock generation circuit 214 is supplied to the comparator 322A as the comparison timing signal. In order to make the timing of the comparison timing signal appropriate, a delay τ may be added, but the delay τ is not indispensable.

Based on the clock signal outputted from the clock generation circuit 214, the ½ frequency divider 216 divides the reference signal ($\varphi2=\varphi0$) synchronized with the rising edge of the clock signal, the shift signal ($\varphi3=\varphi0+\pi/2$) synchronized with the falling edge of the clock signal, the inverted reference signal ($\varphi2=\varphi0+\pi$) synchronized with the rising edge of the clock signal, and the inverted shift signal ($\varphi3=\varphi0+3\pi/2$) synchronized with the falling edge of the clock signal. The reference signal is supplied to the comparison drive circuit_A 123, and the shift signal is supplied to the comparison drive circuit_B 124. The inverted reference signal is supplied to the comparison drive circuit_C 323, and the inverted shift signal is supplied to the comparison drive circuit_D 324. Also, in the configuration depicted in FIG. 37, it is possible to compare the two differential amplified waveforms at the timing of the rise of the comparison timing signal.

<Second Variation of Current Control>

Figure 38:
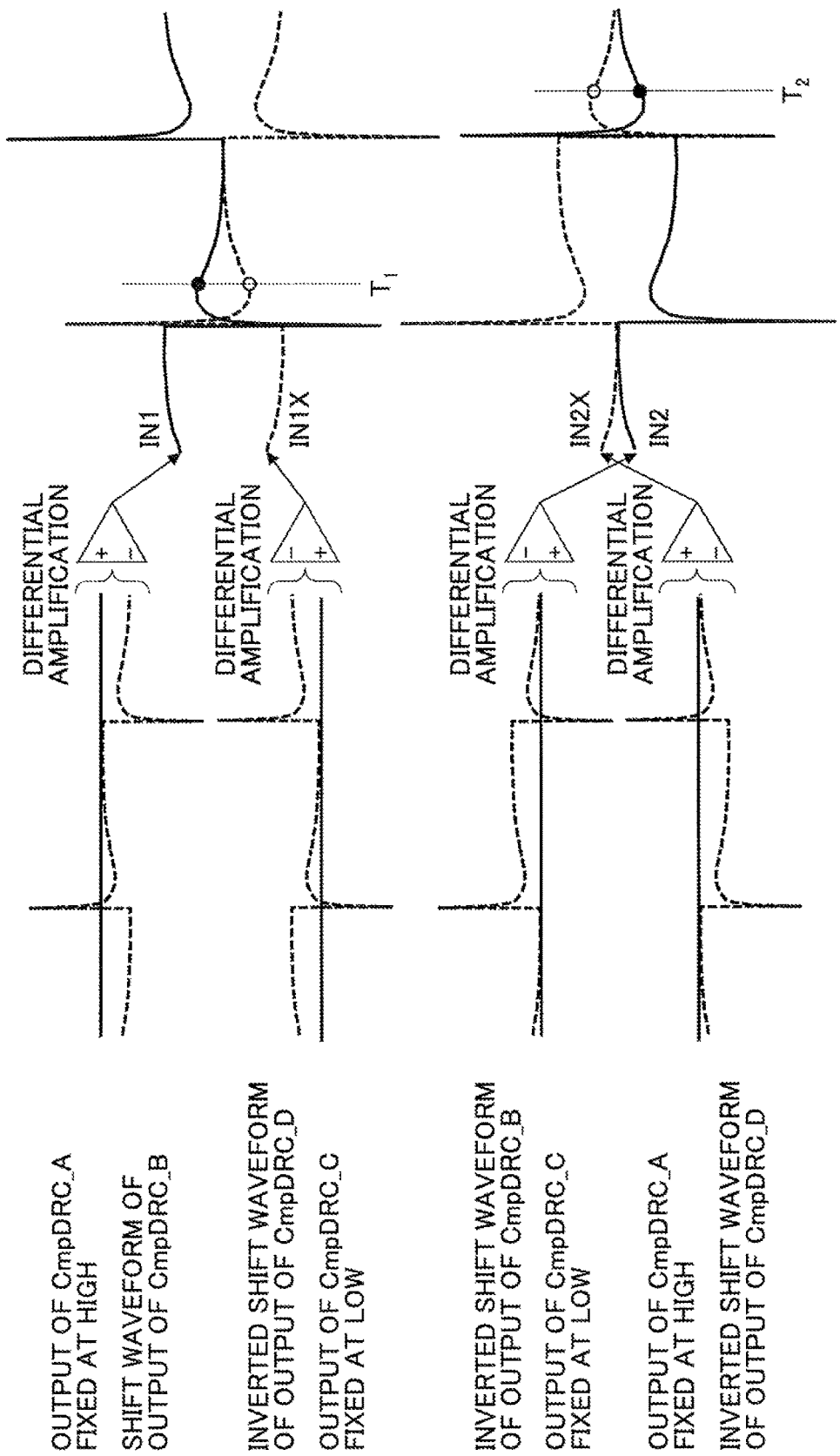
FIG. 38 is a diagram for explaining a principle in a second variation of the current control.

FIG. 38 is a diagram for explaining a principle of a second variation of the current control. In the configuration for comparing the differential amplification values, it is sufficient to obtain the difference between the reference signal and the shift signal, and the difference between the inverted reference signal and the inverted shift signal. Thus, as illustrated in FIG. 38, even if a first fixed potential is used instead of the reference signal, and the second fixed potential is used instead of the inverted reference signal, it is possible to conduct a differential amplification comparison.

In the example in FIG. 38, for the comparison at the time $T_1$, the output of the comparison drive circuit_A 123 is fixed to High, and the output of the comparison drive circuit_B 124 uses the shift waveform. Moreover, the output of the comparison drive circuit_C 323 is fixed to Low, and the output of the comparison drive circuit_D 324 uses the inverted shift waveform. A difference between the voltage waveform applied to the dummy optical modulator_B 128 due to the shift waveform and the voltage waveform applied to the dummy optical modulator_A 127 due to the High potential is amplified. This differential amplification value is used as one input IN1 to the comparator at the time $T_1$. A difference between the voltage waveform applied to the dummy optical modulator_D 328 by the inverted shift waveform and the voltage waveform applied to the dummy optical modulator_C 327 by the Low potential is amplified. A differential amplification value is used as another input IN1x to the comparator at the time $T_1$.

For the comparison at the time $T_2$, the output of the comparison drive circuit_A 123 is fixed to High, and the output of the comparison drive circuit_D 324 uses the inverted shift waveform. Also, the output of the comparison drive circuit_C 323 is fixed to Low, and the output of the comparison drive circuit_B 124 uses the inverted shift waveform. A difference between the voltage waveform applied to the dummy optical modulator_B 128 by the shift waveform and the voltage waveform applied to the dummy optical modulator_C 327 by the Low potential is amplified. This differential amplification value is used as one input IN2 to the comparator at the time $T_2$. A difference between the voltage waveform applied to the dummy optical modulator_D 328 due to the inverted shift waveform and the voltage waveform applied to the dummy optical modulator_A 127 due to the High potential is amplified. This differential amplification value is used as another input IN2x to the comparator at the time $T_2$. The current control of the control circuit based on the comparison result is the same as the control described in the first variation. That is, when two consecutive comparison results in the times $T_2$ and $T_2$ are different, the current value $I_2$ or $I_2$ is adjusted based on the comparison result. When the two comparison results are the same, the offset of the comparator is adjusted depending on the magnitude of the differential amplification value.

By this configuration, the potential of the comparison drive circuit_A 123 is fixed at High and the potential of the comparison drive circuit_C 323 is fixed at Low. In addition, the same waveform in the first variation may be used for the output (the shift signal) of the comparison drive circuit_B 124 and the output (the inverted shift signal) of the comparison drive circuit_D 324. In the configuration in FIG. 38, since only half of the circuit (the comparison drive circuit_B 124 and the comparison drive circuit_D 324) operates similar to an AC, the power consumption is preferably reduced.

Figure 39:
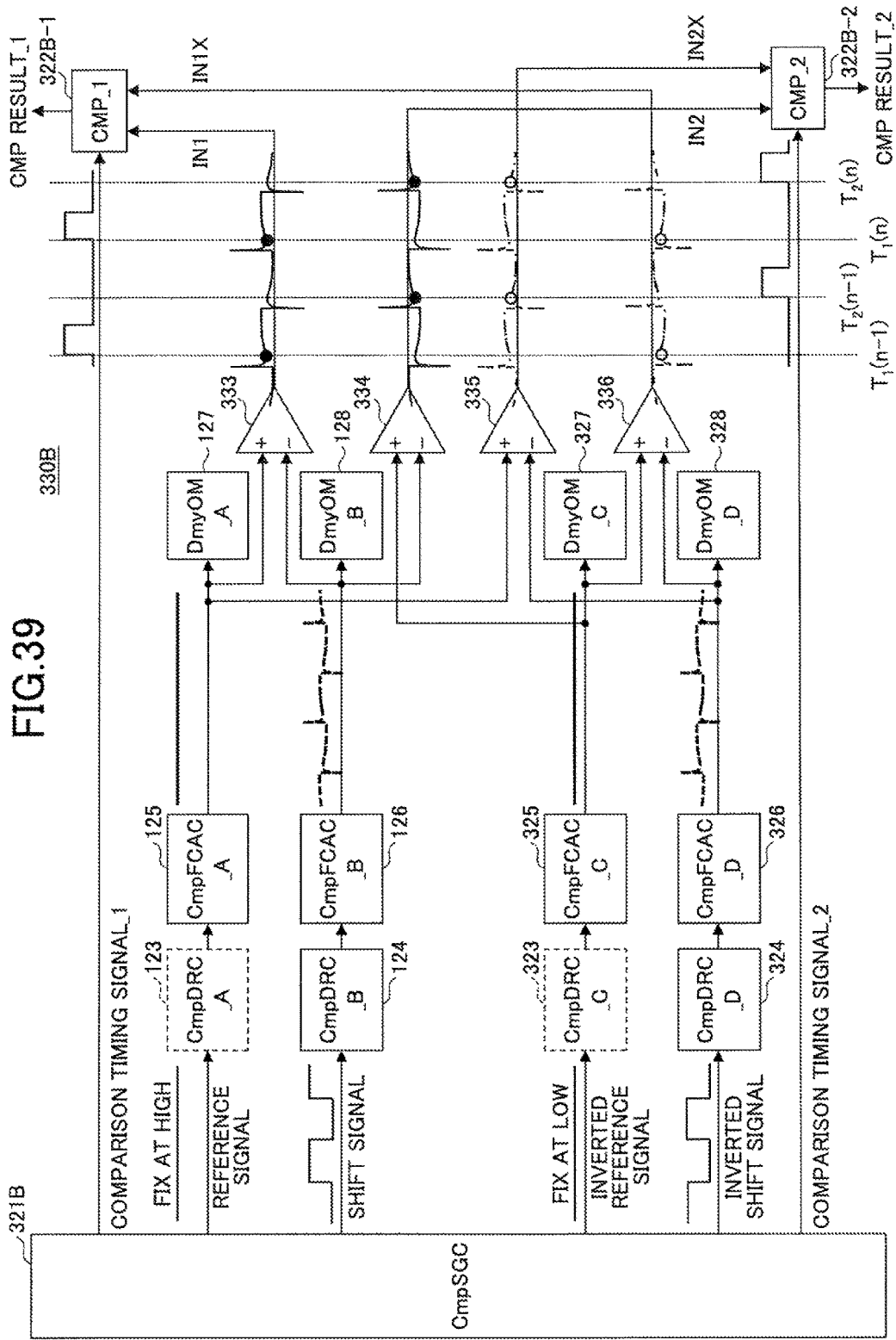
FIG. 39 is a diagram illustrating a configuration example of a current condition monitoring circuit in the second variation.

FIG. 39 is a schematic diagram illustrating a current condition monitoring circuit 330B realizing the principle depicted in FIG. 38. The current condition monitoring circuit 330B includes a comparison signal generating circuit (CmpSGC) 321B, a first comparator 322B-1, and a second comparator 322B-2. The current condition monitoring circuit 330B further includes the comparison drive circuit_A 123, the comparison drive circuit_B 124, the comparison drive circuit_C 323, the comparison drive circuit_D 324, the comparison frequency characteristic adjustment circuit_A 125, the comparison frequency characteristic adjustment circuit_B 126, the comparison frequency characteristic adjustment circuit_C 325, the comparison frequency characteristic adjustment circuit_D 326, the dummy optical modulator_A 127, the dummy optical modulator_B 128, the dummy optical modulator_C 327, and the dummy optical modulator_D 328.

The comparison signal generation circuit 321B generates a comparison signal_1, a comparison timing signal_2, the shift signal obtained by shifting the data signal input to the drive circuit 11 for the optical modulation, and the inverted signal (the inverted shift signal) of the shift signal. Also, a high potential signal is generated as the reference signal, and a low potential signal is generated as the inverted reference signal. A High fixed signal is input to the comparison drive circuit_A 123. The shift signal is input to the comparison drive circuit_B 124. A Low fixed signal is input to the comparison drive circuit_C 323. The inverted shift signal is input to the comparison drive circuit_D 324. A signal, in which the potential is fixed, is used as the reference signal and the inverted reference signal. Hence, instead of using the comparison drive circuit_A 123 and the comparison drive circuit_C 323, the High fixed signal may be directly connected to the power supply potential, and the Low fixed signal may be directly connected to the ground (GND) potential.

The comparison timing signal_1 and the comparison timing signal_2 are signals obtained by alternately taking out the rising edge of the comparison timing signal used in the first variation. The comparison timing signal_1 is input to the first comparator 322B-1, and is used for the comparison at the time $T_1$. The comparison timing signal_2 is inputted to the comparator 322B-2, and is used for the comparison at the time $T_2$.

The voltage waveform, which is applied from the comparison drive circuit_A 123 to the dummy optical modulator_A 127 via the comparison frequency characteristic adjustment circuit_A 125, that is, the fixed potential "High" is connected to one input of the differential amplifier 333, and is connected to one input of the differential amplifier 335.

The voltage waveform, which is applied from the comparison drive circuit_B 124 to the dummy optical modulator_B 128 via the comparison frequency characteristic adjustment circuit_B 126, that is, the voltage waveform by the shift signal is connected to another input of the differential amplifier 333, and is connected to one input of the differential amplifier 334.

The voltage waveform, which is applied from the comparison drive circuit_C 323 to the dummy optical modulator_C 327 via the comparison frequency characteristic adjustment circuit_C 325, that is, the fixed potential "Low" is connected to another input of the differential amplifier 334, and is connected to one input of the differential amplifier 336.

The voltage waveform, which is applied from the comparison drive circuit_D 324 to the dummy optical modulator_D 328 via the comparison frequency characteristic adjustment circuit_D 326, that is, the voltage waveform based on the inverted shift signal is connected to another input of the differential amplifier 335 and another input of the differential amplifier 336.

The differential amplifier 333 and the differential amplifier 336 output the differential amplification values IN1 and IN1x at the rise of the comparison timing signal_1. The differential amplification values IN1 and IN1x are input to the comparator 322B-1. The comparison result of the comparator 322B-1 is output to the control circuit as the comparison result 1 at the time $T_1$.

The differential amplifier 334 and the differential amplifier 335 output the differential amplification values IN2 and IN2x at the rise of the comparison timing signal_2. The differential amplification values IN2 and IN2x are input to the comparator 322B-2. The comparison result of the comparator 322B-2 is output to the control circuit as the comparison result_2 at the time $T_2$. By this circuit configuration, the power consumption of the current condition monitoring circuit 330B is preferably reduced.

Figure 40:
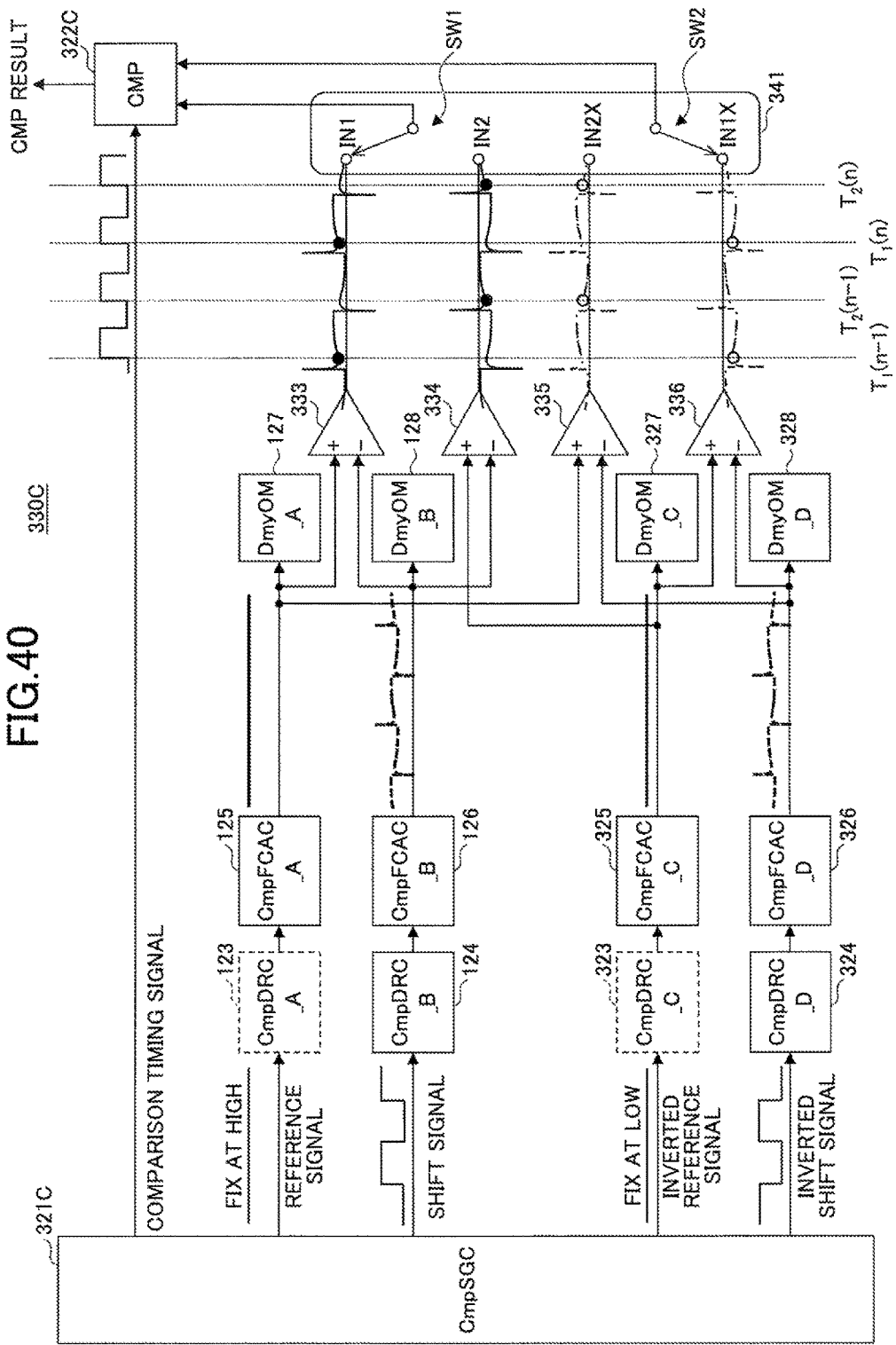
FIG. 40 is a diagram illustrating another configuration example of the current condition monitoring circuit in the second variation.

FIG. 40 is a diagram illustrating a current condition monitoring circuit 330C as another circuit configuration in the second variation. The current condition monitoring circuit 330C uses a single comparison timing signal and a single comparator 322C to compare inputs to the comparator 322C (that is, outputs of the differential amplifiers 333 through 336) to the switch 341, at the times $T_1$ and $T_2$. Similar to those in FIG. 39, the types of signals supplied to the comparison drive circuit_A 123 to the comparison drive circuit_D 324 are the High fixed signals as reference signals, the shift signal, the Low fixed signal as the inverted reference signal, and the inverted shift signal. Similar to those in FIG. 39, the power supply potential and the ground (GND) potential may be supplied to the frequency characteristic adjustment circuit_A 125 and the frequency characteristic adjustment circuit_C 325 for comparison, respectively, instead of supplying the High fixed signal and the Low fixed signal to the comparison drive circuit_A 123 and the comparison drive circuit_C 323, respectively.

The rise of the comparison timing signal is alternately used as the comparison timing at the time $T_1$ and the comparison timing at the time $T_2$. At the rising edge of the comparison timing signal, SW1 of the switch 341 is connected to the output of the differential amplifier 333, and SW2 is connected to the output of the differential amplifier 336. As a result, at the time $T_1$, the differential amplification value of the High fixed signal and the shift signal, and the differential amplification value of the Low fixed signal and the inverted shift signal are supplied to the comparator 322C.

At a next rising edge of the comparison timing signal, SW1 of the switch 341 is connected to the output of the differential amplifier 334, and SW2 of the switch 341 is connected to the output of the differential amplifier 335. As a result, at the time $T_2$, the differential amplification value of the Low fixed signal and the shift signal, and the differential amplification value of the High fixed signal and the inverted shift signal are supplied to the comparator 322C.

In this configuration, by using the single comparison timing signal and the single comparator 322C, it is possible to realize the same operation as the circuit in FIG. 39.

Figure 41:
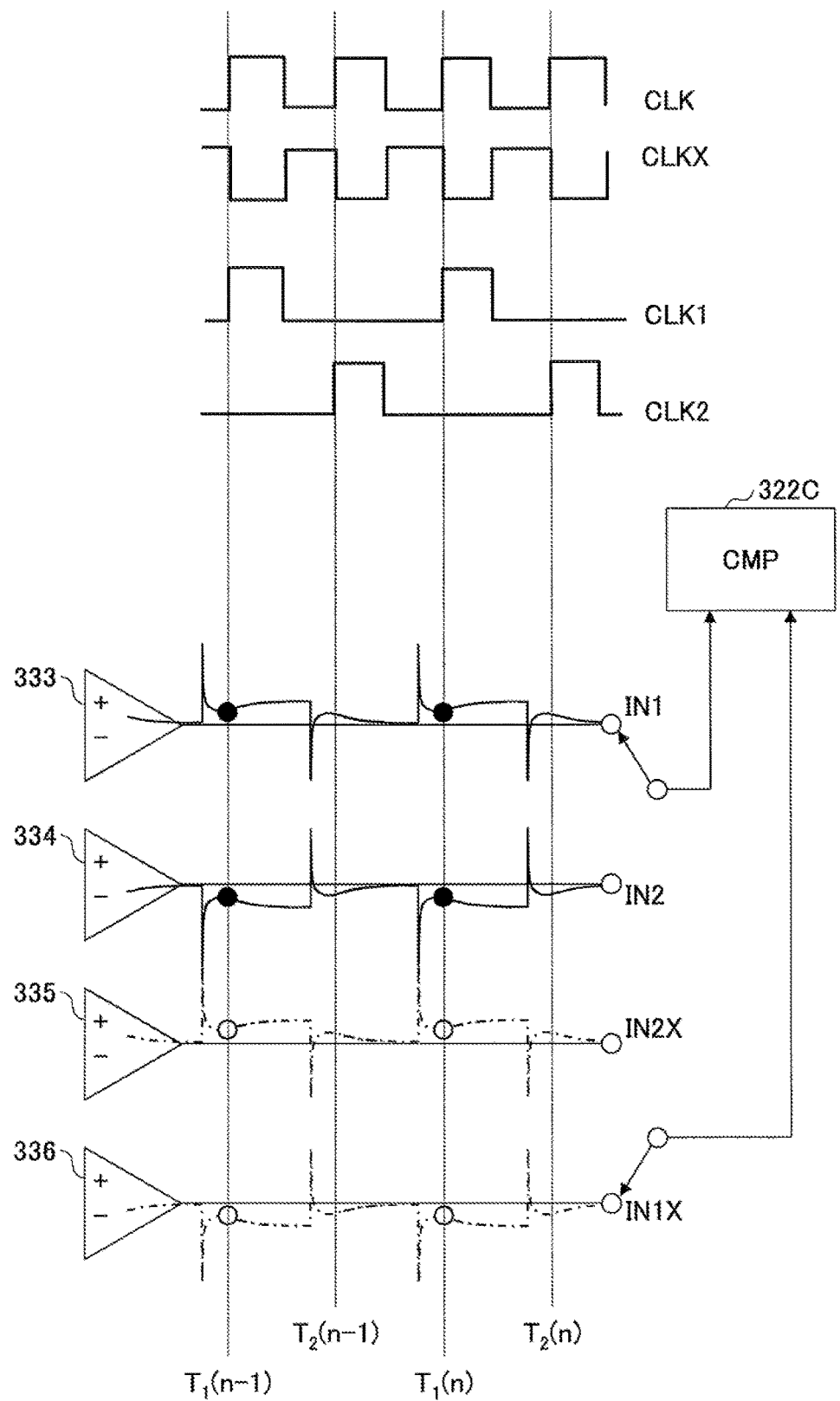
FIG. 41 is a diagram illustrating an example of a clock signal in a case in which the switch configuration in FIG. 40 is provided inside the comparator.

FIG. 41 is a diagram for explaining a configuration in which the switch configuration is provided inside the comparator in the configuration of FIG. 40. In order to perform a switching operation depicted in a lower part in FIG. 41 inside the comparator, four clock signals depicted in an upper part in FIG. 41 are used.

At a rise of a CLK signal, the differential amplification (the differential amplifier 333) of the shift signal and the High fixed signal, and the differential amplification (the differential amplifier 334) of the shift signal and the low fixed signal are alternately performed. At a falling edge of a CLKX signal, the differential amplification (the output of the differential amplifier 336) of the inverted shift signal and the Low fixed signal, and the differential amplification (the output of the differential amplifier 335) of the inverted shift signal and the high fixed signal are alternately performed. CLK1 represents a comparison clock at the time $T_1$, and CLK2 represents a comparison clock at the time $T_2$.

Figure 42:
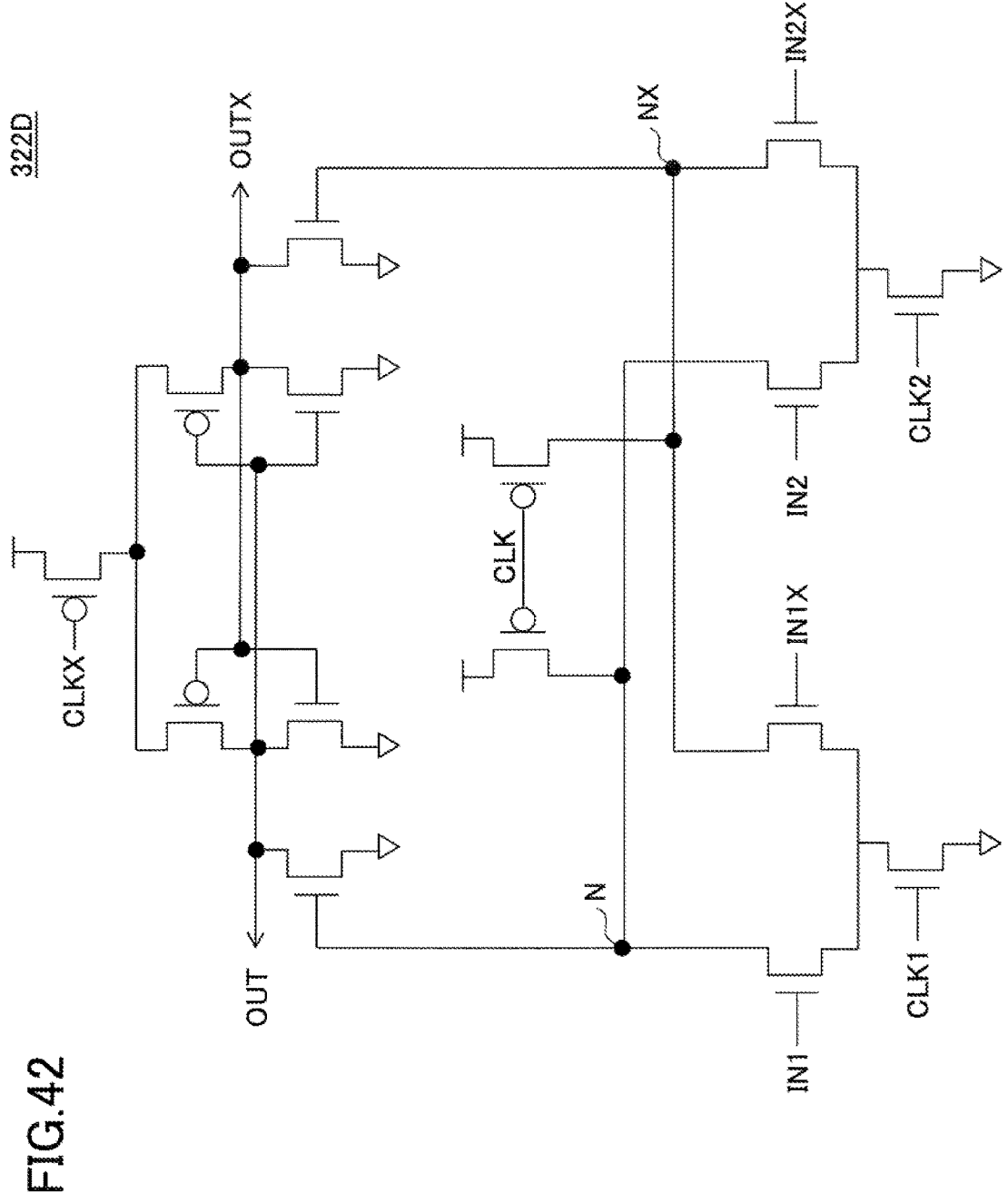
FIG. 42 is a diagram illustrating a configuration example of the comparator including the switch configuration in FIG. 40.

FIG. 42 is a diagram illustrating an example of a circuit configuration of a comparator (CMP) 322D including a switching function using four clock signals CLK, CLKX, CLK1, and CLK2 depicted in FIG. 41. When CLK and CLK1 are High, and CLKX and CLK2 are Low, a current is drawn according to the voltage value appearing at the differential amplification values IN1 and IN1X. When the differential amplification value IN1 is High and the differential amplification value IN1X is Low, the potential of a node N falls faster than that of a node NX, and a NMOS connected to an OUTX strongly draws current more than a NMOS connected to an OUT. As a result, the OUT becomes High and the OUTX becomes Low. Conversely, in a case in which the differential amplification value IN1 is Low and the differential amplification value IN1X is High, the OUT is Low and the OUTX is High. When the CLK and the CLK2 are High and the CLKX and the CLK1 are Low, since the current is drawn according to the voltage value appearing at the differential amplification values IN2 and IN2X, the differential amplification value IN2 is High. When the differential amplification value IN2X is Low, the potential of the node N falls faster than that of the node NX, and the NMOS connected to the OUTX draws current more strongly than the NMOS connected to the OUT. As a result, the OUT goes High and the OUTX goes Low. Conversely, in a case in which the differential amplification value IN2 is Low and the differential amplification value IN2X is High, the OUT is Low and the OUTX is High. By this configuration, it is possible to realize the comparison of the differential amplification values at the times $T_1$ and $T_2$ with a single comparator while using a fixed potential signal as the reference signal.

Figure 43:
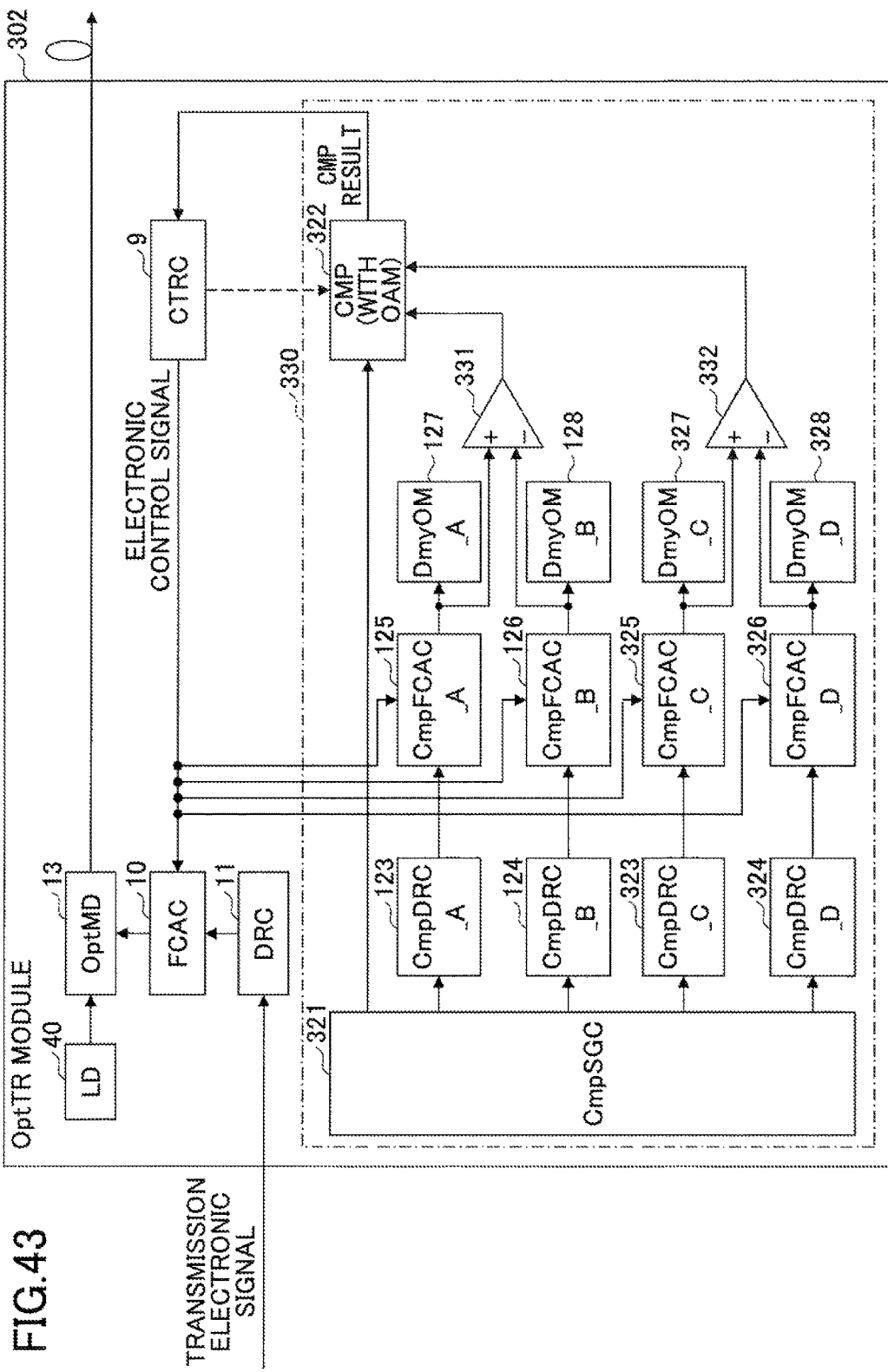
FIG. 43 is a diagram illustrating a configuration example of an optical transmission module using the frequency characteristic adjustment circuit, and the current condition monitoring circuit in a variation.

FIG. 43 is a diagram illustrating a configuration example of an optical transmission module (OptTR MODULE) 302 having the frequency characteristic adjustment circuit 10 and a current condition monitoring circuit 330. In the configuration example in FIG. 43, the current condition monitoring circuit 330A described in the first variation of the current control is used, but the current condition monitoring circuit 330B or 330C in the second variation of the current control may be used.

The optical transmission module 302 includes the light source 40, the optical modulator 13 as an example of the optical circuit element, the drive circuit 11, the frequency characteristic adjustment circuit 10, the control circuit 9, and a current condition monitoring circuit 330. An input electronic signal representing transmission data is converted into a high speed drive signal by the drive circuit 11, and is input to the optical modulator 13. Light incident on the optical modulator 13 from the light source 40 is modulated by a drive signal, and the modulated optical signal is output. Light incident on the optical modulator 13 from the light source 40 is modulated by a drive signal, and the modulated optical signal is output. The frequency characteristic adjustment circuit 10 inserted between the drive circuit 11 and the optical modulator 13 supplies the current $I_1$ or the current $I_2$ to the optical modulator 13 depending on the voltage level of the drive signal. The optical modulator 13 modulates flat frequency characteristics in which the jitter of data dependency is controlled.

The current value supplied from the frequency characteristic adjustment circuit 10 to the optical modulator 13 is controlled by the control circuit 9, based on the comparison result of the output of the current condition monitoring circuit 330, that is, the output of the differential amplifier 331 and the output of the differential amplifier 332. The configuration and the operation of the current condition monitoring circuit 330 are the same as those described with reference to FIG. 34 to FIG. 37. The configuration and the operation in the case of using the circuit of the second variation are the same as those described with reference to FIG. 38 to FIG. 42.

Since the current condition monitoring circuit 330 performs the comparison based on the differential amplified output, it is possible to accurately output the comparison result with high resolution. Based on the comparison result of the current condition monitoring circuit 330, the figure control circuit 9 controls values of the current supplied from the comparison frequency characteristic adjustment circuit_A 125, the comparison frequency characteristic adjustment circuit_B 126, the comparison frequency characteristic adjustment circuit_C 325, and the comparison frequency characteristic adjustment circuit_D 326 of the current condition monitoring circuit 330 in the same manner of the control to the frequency characteristic adjustment circuit 10. In a case of using a comparator with an offset adjustment mechanism as the comparator 322, the control circuit 9 may generate an offset adjustment signal based on the output of the comparator 122, and may supply the offset adjustment signal to the comparator 322. A known circuit configuration as the comparator with the offset adjusting mechanism may be applied.

Figure 44:
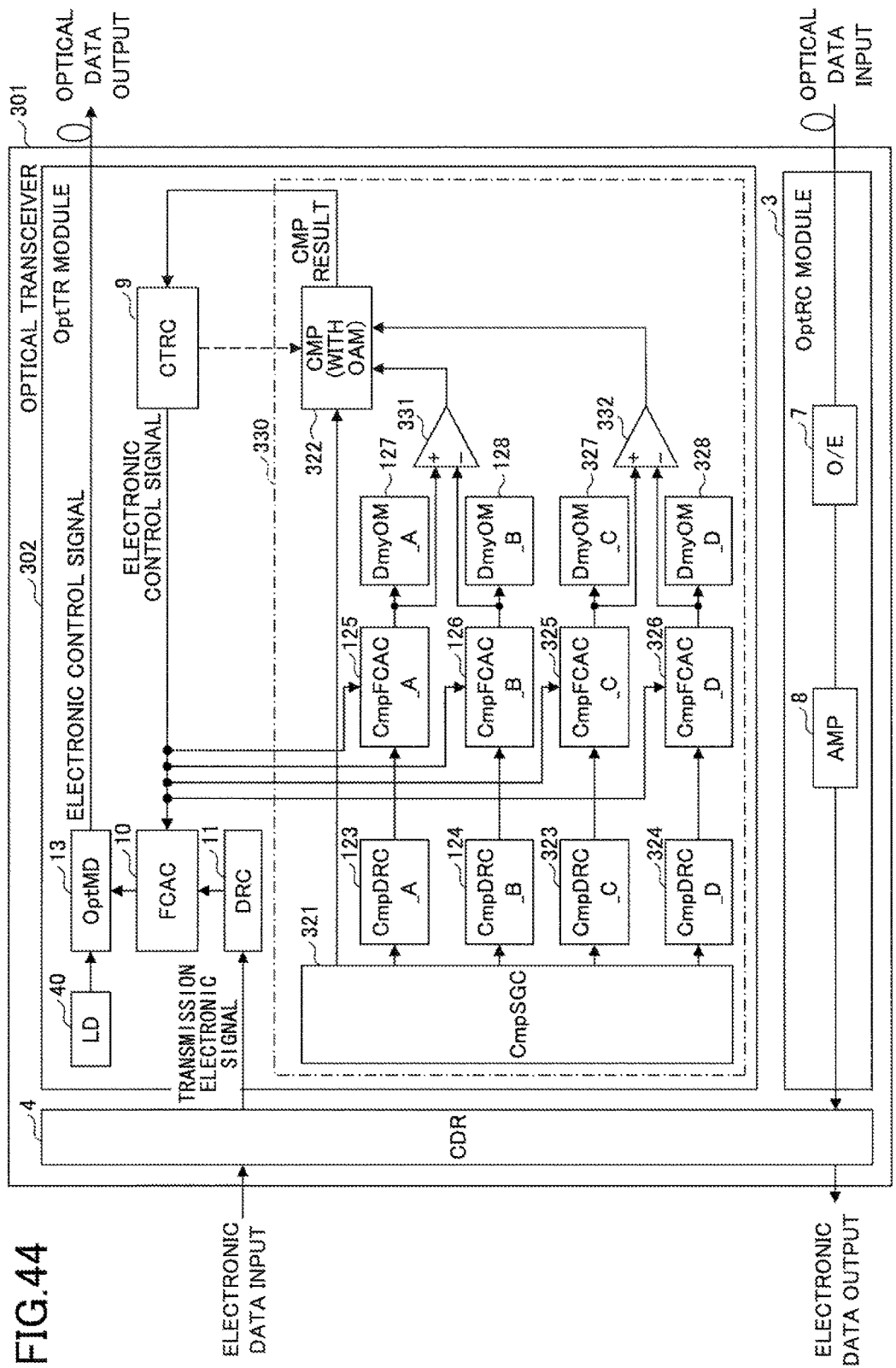
FIG. 44 is a schematic block diagram illustrating an optical transceiver using the optical transmission module in FIG. 43.

FIG. 44 is a schematic diagram illustrating an optical transceiver 301 using the optical transmission module 302 in FIG. 43. The optical transceiver 301 is the same as the optical transceiver 1A in FIG. 30, except that the optical transmission module 302 is used instead of the optical transmission module 2A. The optical transceiver 301 includes the optical transmission module 302, the optical receiver module 3, and the clock data recovery (CDR) 4, and the configurations and the operations of the optical receiver module 3 and the CDR 4 are as same as those described with reference to FIG. 30.

The optical transmission module 302 employs the configuration of the current condition monitoring circuit 330A in FIG. 35 as the current condition monitoring circuit 330. Alternatively, as described above, the current condition monitoring circuit 330B or 330C according to the second variation of the current control may be applied.

The frequency characteristic adjustment circuit 10, which is disposed between the drive circuit 11 and the optical modulator 13, includes the capacitor 12 and the current supply circuit 14 (refer to FIG. 6), and supplies the adjustment current $I_1$ or $I_2$ to the optical modulator 13 according to the drive signal level. By inserting the frequency characteristic adjustment circuit 10, the operating bandwidth is expanded. Hence, it is possible to realize the function of the equalizing circuit without generating additional power supply voltage or negative voltage. Moreover, by switching the amount of current supplied to the optical modulator 13 in accordance with the input data, the nonlinearity of the charge-voltage characteristic or the capacitance-voltage characteristic of the optical modulator 13 is compensated. Preferable response characteristics are obtained even in a case of driving at high speed with the low voltage. As a result of the control of the characteristic fluctuation from the medium frequency to the high frequency, it is possible to reduce the intersymbol interference.

The value of the current, which is supplied from the frequency characteristic adjustment circuit 10 to the optical modulator 13, is controlled by the control circuit 9 based on the output of the current condition monitoring circuit 330. The output of the current condition monitoring circuit 330 is the comparison result from comparing the output (differential amplification value of reference waveform and shift waveform) of the differential amplifier 331 with the output (the differential amplification value of inverted reference waveform and inverted shift waveform) of the differential amplifier 332. By comparing the outputs of the differential amplifier 331 and the differential amplifier 332, a small voltage difference is detected with high resolution. Hence, it is possible to accurately adjust the current values $I_1$ and $I_2$ based on the value of the input drive signal.

Figure 45:
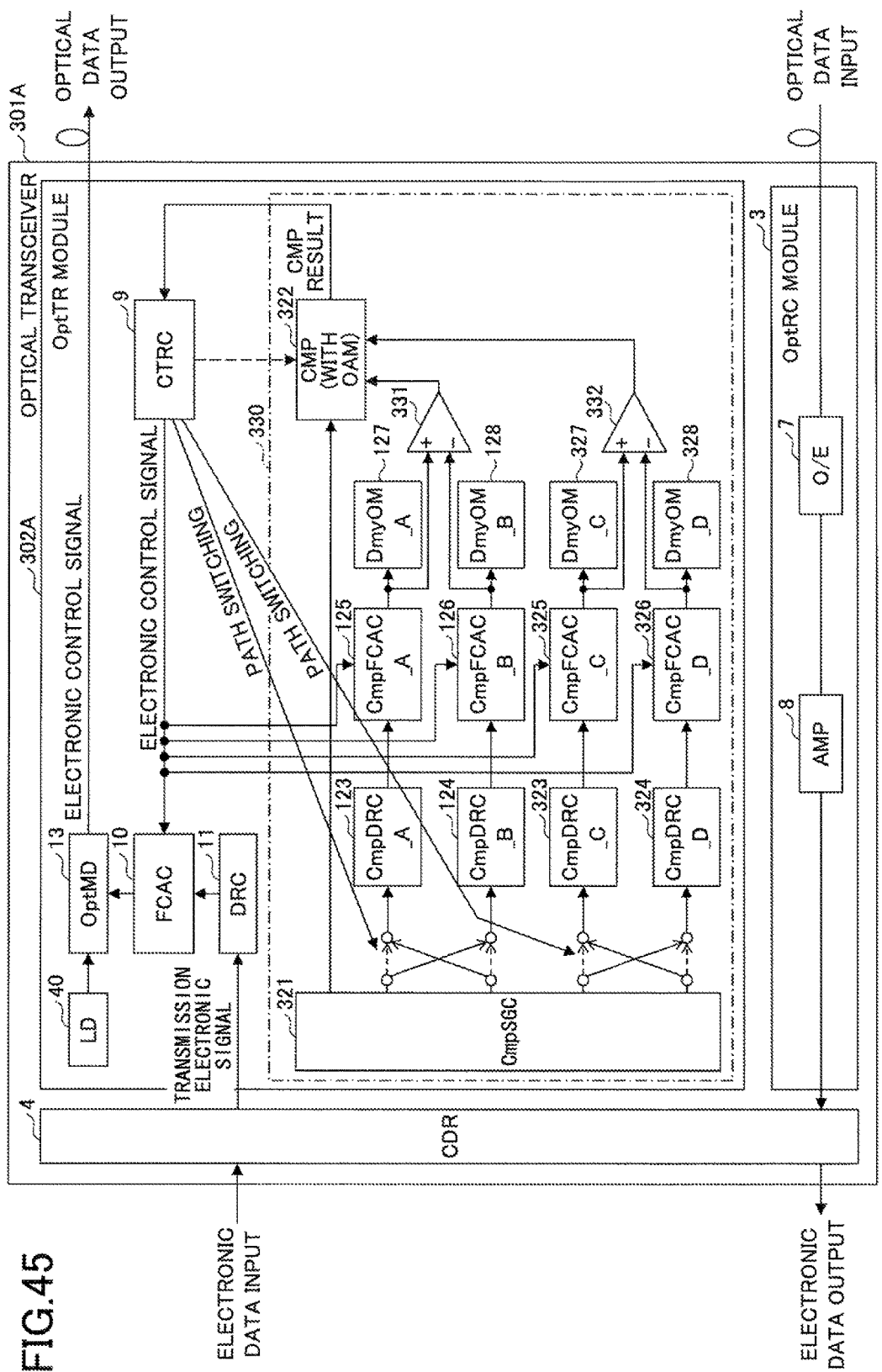
FIG. 45 is a diagram illustrating a measure for controlling the variation in the optical transceiver in FIG. 43.

FIG. 45 is a diagram illustrating an optical transceiver 301A as a variation of the optical transceiver 301 in FIG. 44. The configuration of the optical transceiver 301A corresponds to the configuration of the optical transceiver 1A in FIG. 31, and includes a configuration for controlling variations in the current condition monitoring circuit 330. In a case in which there is a variation between the dummy optical modulators 127 and 128 of the optical transmission module 302A and/or a variation between the dummy optical modulators 327 and 328, signals (the reference signal and the shift signal), which are input from the comparison signal generating circuit 121 to the comparison drive circuits 123 and 124, are switched. In addition, the signals (the inverted reference signal and the inverted shift signal), which are input from the comparison signal generating circuit 121 to the comparison drive circuits 323 and 324, are switched. Switching of the input path of the signal is performed by the control circuit 9. By taking an average of the current adjustment values before switching and after switching, it is possible to eliminate processing errors caused by manufacturing variations and the like between the dummy optical modulators 127 and 128 and/or between the dummy optical modulators 327 and 328.

Figure 46:
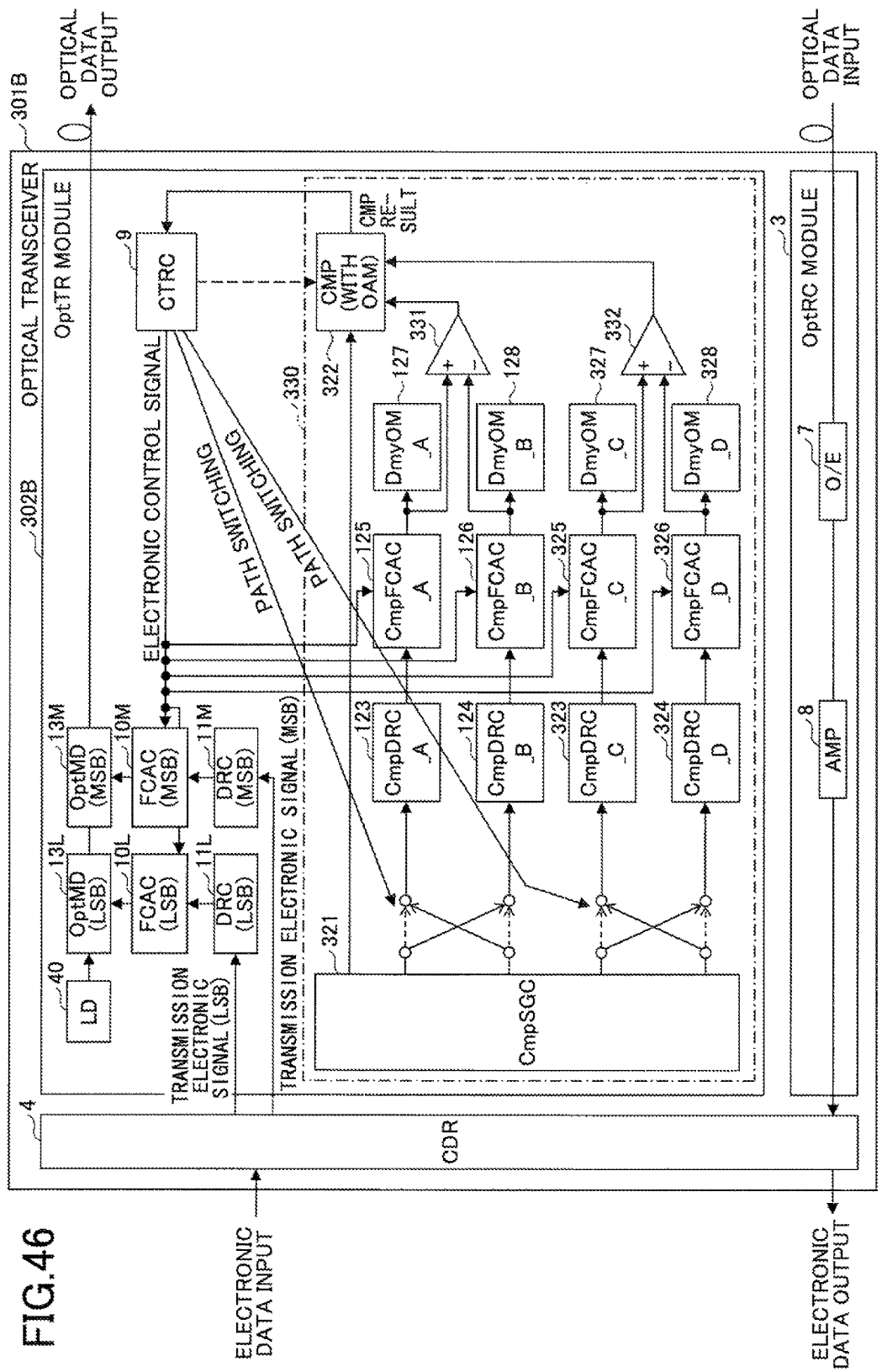
FIG. 46 is a schematic block diagram illustrating the PAM 4 optical transceiver using the optical transmission module in the variation.

FIG. 46 is a diagram illustrating an optical transceiver 301B as another variation of the optical transceiver 301 in FIG. 44. The configuration of the optical transceiver 301B corresponds to the configuration of the optical transceiver 1B in FIG. 32, and performs optical transmission in the PAM 4 (Power Amplitude Modulation-4: 4-level pulse amplitude modulation) method, which transmits 2 bits by one modulation. For instance, similar to the fourth embodiment (FIG. 15), the signal electrodes divided into the optical waveguides of the MZ type optical modulator are arranged in the optical transceiver 301B. This arrangement is applied to a configuration for individually modulating the lower bit (LSB) and the upper bit. Explanations of the optical modulation operation of the PAM 4 method in FIG. 46 are the same as the explanations with reference to FIG. 32.

Figure 47:
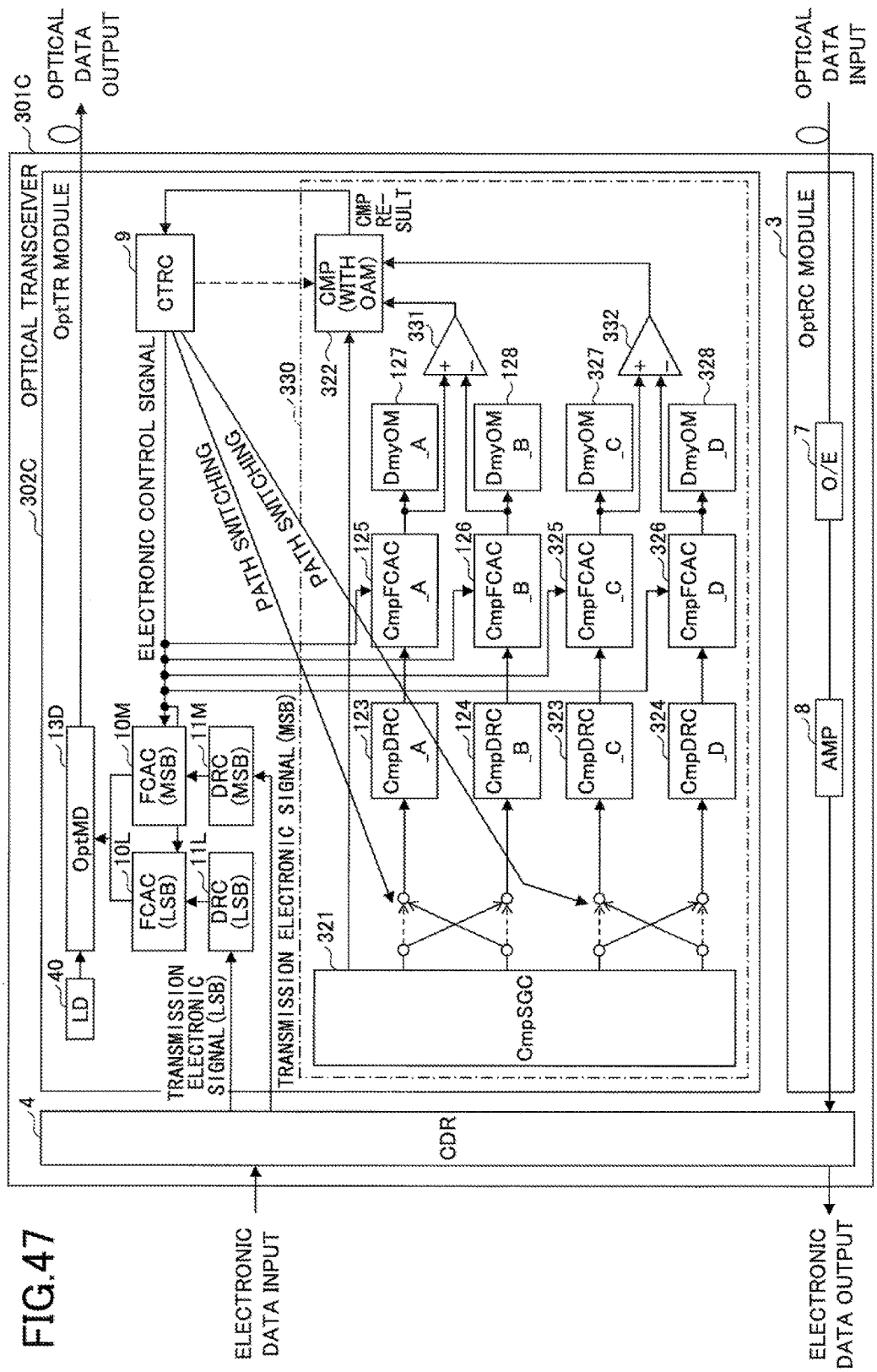
FIG. 47 is a diagram illustrating another configuration of the PAM 4 optical transceiver using the optical transmission module in the variation.

FIG. 47 is a diagram illustrating an optical transceiver 301C as another example of a PAM 4 optical transceiver. The configuration of the optical transceiver 301C corresponds to the configuration of the optical transceiver 1C in FIG. 33, and a pair of signal electrodes are arranged in the MZ type optical modulator 13D. The optical transceiver 301C generates a 2-bit modulation signal by the PAM 4 modulation method.

In the configurations illustrated in FIG. 46 and FIG. 47, based on the output of the current condition monitoring circuit 330, the control circuit 9 controls the current values $I_{M1}$ and $I_{M2}$ supplied from the frequency characteristic adjustment circuit 10M to the optical modulator 13M (or the optical modulator 13D), and controls the currents $I_{L1}$ and $I_{L2}$ supplied from the frequency characteristic adjustment circuit 10L to the optical modulator 13L (or the optical modulator 13D). The configurations of FIG. 46 and FIG. 47 are also applied to the data modulation of 3 bits or more. In a case of n-bit data modulation, by providing n frequency characteristic adjustment circuits 10 to n drive circuits 11, the current value to be supplied to the optical circuit element such as the optical modulator 13 is controlled in accordance with the input value ("0" or "1") of each bit, and the adjust frequency characteristics are adjusted.

As described above, by using the frequency characteristic adjustment circuit in any of the above described embodiments, it is possible to achieve a function equivalent to that of the equalizing circuit of a conventional configuration with a low voltage. That is, the operating bandwidth of the optical circuit element such as the optical modulator and the laser diode is expanded without using high voltage and negative voltage, and high speed driving is realized. Moreover, by changing the current supplied to the optical circuit element in accordance with the input data, even in a case in which the voltage dependence includes nonlinear elements such as the junction capacitance, it is possible to control the fluctuation of the frequency characteristic. As a secondary effect, it is possible to reduce the intersymbol interference, which represents the jitter of data dependency. Furthermore, by designing a plurality of pairs of the drive circuit and the capacitor $C_F$ so that the output state is selected between active and high-Z in all or a part of pairs, it is possible to realize the designed bandwidth characteristic.

In the above described embodiments, either one of the voltage supplied from the output node of the drive circuit and the voltage acquired from the intermediate node of the drive circuit is used, but a voltage acquired from the input node to the drive circuit may be used. A voltage from an arbitrarily selected node may also be used as long as the voltage reflects the value of the input data signal.

The current value, which is supplied from the frequency characteristic adjustment circuit 10 to the optical circuit element (the optical modulator, the surface emitting laser, or the like) according to the input drive signal value, is controlled by the configuration and the method of any current control in the examples, the first variation, and the second variation. Therefore, it is possible to maintain the optimum current condition and to control a fluctuation of the frequency characteristic.

The current controls in the examples, the first variation, and the second variation, are applicable to any of the frequency characteristic adjustment circuits 10A through 10B in the first to seventh embodiments.

By the above configuration, it is possible to obtain the preferable response characteristics by driving the optical circuit element at a high speed with a low voltage.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A frequency characteristic adjustment circuit, which is disposed between an optical circuit element and a drive circuit for driving the optical circuit element, the frequency characteristic adjustment circuit comprising:
    a current supply circuit controlled by a voltage generated by the drive circuit; and
    a capacitor connected in series between the drive circuit and the current supply circuit,
    the optical circuit element is operated in a forward bias, the current supply circuit includes:
        a first current source for generating a first current; and
        a second current source for generating a second current different from the first current,
    the first current source and the second current source are connected in series to an output of the capacitor, and
    the current supply circuit supplies the first current in response to a first level voltage applied from the drive circuit, and supplies the second current in response to a second level voltage applied from the drive circuit.

2. The frequency characteristic adjustment circuit as claimed in claim 1, wherein the current supply circuit includes:
    a first current source for generating a first current and
    a second current source for generating a difference current,
    wherein the current supply circuit supplies the first current upon receiving the first level voltage from the drive circuit, and supplies a second current obtained by adding the first current and the difference current upon receiving the second level voltage from the drive circuit.

3. The frequency characteristic adjustment circuit as claimed in claim 2, wherein the current supply circuit includes:
    a first switch connected between the first current source and the capacitor; and
    a second switch connected between the second current source and the capacitor,
    wherein the first switch and the second switch are connected to the output of the drive circuit.

4. An adjustor circuit, comprising n frequency characteristic adjustment circuits each as claimed in claim 1 corresponding to n drive circuits for driving respective optical circuit elements, wherein
    when $V_i$ denotes an output of the i-th drive circuit, $I_i$ denotes a current supplied by an i-th frequency characteristic adjustment circuit corresponding to the i-th drive circuit, $C_{Fi}$ denotes a capacitance of the capacitor of the i-th frequency characteristic adjustment circuit, and when $I_M(V_M)=\Sigma I_i$ where $I_M(V_M)$ denotes a current-voltage characteristic of an optical circuit element, and $Q_M(V_M)$ denotes the current-voltage characteristic of the optical circuit element, for each set of $V_i$ and $I_i$, an expression $$Q_M(V_M)-C_{Fi}(V_i-V_{Mi})$$

is set to be equivalent or to be approximated.

5. An optical transmission module comprising:
an optical circuit element that is operated in a forward bias and outputs an optical signal based on the electric signal;
a drive circuit that drives the optical circuit element; and
a frequency characteristic adjustment circuit that is disposed between the optical circuit element and the drive circuit, and includes
a current supply circuit controlled by a voltage generated by the drive circuit, and
a capacitor connected in series between the drive circuit and the current supply circuit,
the frequency characteristic adjustment circuit supplies a current of a different current value depending on the voltage to the optical circuit element,
the current supply circuit includes:
a first current source for generating a first current; and
a second current source for generating a second current different from the first current,
the first current source and the second current source are connected in series to an output of the capacitor, and
the current supply circuit supplies the first current in response to a first level voltage applied from the drive circuit, and supplies the second current in response to a second level voltage applied from the drive circuit.

6. The optical transmission module as claimed in claim 5, further comprising:
a monitor circuit that monitors a current condition of the frequency characteristic adjustment circuit; and
a control circuit that adjusts the current value supplied from the frequency characteristic adjusting circuit to the optical circuit element based on an output of the monitor circuit.

7. The optical transmission module as claimed in claim 6, wherein the monitor circuit includes:
a pair of dummy optical circuit elements having the same performance as the optical circuit element;
a comparator that compares an input driving waveform with the dummy optical circuit element;
a pair of comparison drive circuits that drives the dummy optical circuit elements; and
a signal generating circuit that generates
a timing signal supplied to the comparator,
a reference signal supplied to one of the comparison driving circuits, and
a shift signal which is supplied to the other of the comparison driving circuits and delayed by a predetermined time from the reference signal.

8. The optical transmission module as claimed in claim 6, wherein the control circuit adjusts the current value supplied from the frequency characteristic adjustment circuit to the optical circuit element in response to an output of the comparator indicating different results at two consecutive comparison timings.

9. The optical transmission module as claimed in claim 7, wherein the control circuit adjusts the input offset voltage of the comparator in response to the output of the comparator indicating the same result at two successive comparison timings.

10. The optical transmission module as claimed in claim 7, wherein the monitor circuit includes:
first to fourth dummy optical circuit elements having equivalent performance to the optical circuit element;
first to fourth comparison drive circuits that drive the first to fourth dummy optical circuit elements;
a first differential amplifier that differentially amplifies a voltage waveform input to a first dummy optical circuit element and a voltage waveform input to a second dummy optical circuit element; and
a second differential amplifier that differentially amplifies the voltage waveform input to a third dummy optical circuit element and the voltage waveform input to the fourth dummy optical circuit element,
wherein the signal generation circuit further generates an inverted reference signal obtained by inverting the reference signal and an inverted shift signal obtained by inverting the shift signal,
a drive waveform based on the reference signal is input to the first dummy optical circuit element, a drive waveform based on the shift signal is input to the second dummy optical circuit element, a drive waveform based on the inversion reference signal is input to the third dummy optical circuit element, and a driving waveform based on the inverted shift signal is input to the fourth dummy optical circuit element, and
the comparator outputs a comparison result from comparing an output of the first differential amplifier with the output of the second differential amplifier.

11. The optical transmission module as claimed in claim 10, wherein
the reference signal is a first fixed potential signal, the inverted reference signal is a second fixed potential signal different from the first fixed potential signal,
the monitor circuit further includes a third differential amplifier and a fourth differential amplifier,
the first differential amplifier differentially amplifies an input waveform of the first dummy optical circuit element driven by the first fixed potential signal and an input waveform of the second dummy optical circuit element driven by the shift signal,
the second differential amplifier differentially amplifies an input waveform of the third dummy optical circuit element driven by the second fixed potential signal and an input waveform of the fourth dummy optical circuit element driven by the inversed shift signal,
the third differential amplifier differentially amplifies the input waveform of the third dummy optical circuit element driven by the second fixed potential signal and the input waveform of the second dummy optical circuit element driven by the shift signal,
the fourth differential amplifier differentially amplifies the input waveform of the fourth dummy optical circuit element driven by the first fixed potential signal and the input waveform of the fourth dummy optical circuit element driven by the inversed shift signal, and
the comparator outputs the comparison result from comparing the output of the first differential amplifier with an output of the second differential amplifier at a first time, and outputs the comparison result from comparing an output of the third differential amplifier with an output of the fourth differential amplifier at a second time.

12. The optical transmission module as claimed in claim 11, wherein the comparator includes:

a first comparator that compares the output of the first differential amplifier with the output of the second differential amplifier, and outputs a first comparison result at the first time; and a second comparator that compares the output of the third differential amplifier with the output of the fourth differential amplifier, and outputs a first comparison result at the second time.

13. The optical transmission module as claimed in claim 11, wherein the comparator includes a switch section that selects the output of the first differential amplifier and the output of the second differential amplifier at the first time, and selects the output of the third differential amplifier and the output of the fourth differential amplifier at the second time.

14. The optical transmission module as claimed in claim 5, further comprising a plurality of sets of a driving circuit and a capacitor connected to an output of the driving circuit, in at least one of the sets, the output of the drive circuit is selectable between active and a high impedance.

15. The optical transmission module as claimed in claim 14, wherein a data signal and a control signal are connected to an input of the drive circuit, and according to the value of the control signal, the drive circuit outputs a value of the input data signal or the output state becomes the high impedance.

16. An optical transceiver comprising:
the optical transmission module as claimed in claim 5; and
an optical receiver module.

* * * * *